(12) United States Patent
Kondo et al.

(10) Patent No.: US 7,277,894 B2
(45) Date of Patent: Oct. 2, 2007

(54) CONTROL SYSTEM, CONTROL APPARATUS, CONTROL METHOD, STORAGE MEDIUM, AND PROGRAM

(75) Inventors: Tetsujiro Kondo, Tokyo (JP); Yuji Okumura, Kanagawa (JP); Tetsuya Murakami, Tokyo (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 10/625,106

(22) Filed: Jul. 22, 2003

(65) Prior Publication Data
US 2004/0107207 A1  Jun. 3, 2004

(30) Foreign Application Priority Data
Jul. 23, 2002  (JP)  ............................ P2002-213821

(51) Int. Cl.
*G06F 7/00* (2006.01)
*G06F 3/00* (2006.01)
(52) U.S. Cl. ......................................... 707/102; 725/58
(58) Field of Classification Search ................ 707/102, 707/103; 725/53
See application file for complete search history.

(56) References Cited
U.S. PATENT DOCUMENTS

| | | | |
|---|---|---|---|
| 6,169,543 B1* | 1/2001 | Wehmeyer ..................... 725/47 |
| 6,215,951 B1* | 4/2001 | Hailey ........................... 386/83 |
| 6,342,925 B1 | 1/2002 | Akhavan et al. |
| 6,642,939 B1* | 11/2003 | Vallone et al. ............... 715/721 |
| 6,832,385 B2* | 12/2004 | Young et al. .................. 725/39 |
| 7,096,486 B1* | 8/2006 | Ukai et al. ..................... 725/58 |
| 2002/0135594 A1 | 9/2002 | Kondo et al. |
| 2002/0184636 A1* | 12/2002 | Vogel ............................ 725/51 |
| 2002/0188947 A1* | 12/2002 | Wang et al. ................... 725/45 |

(Continued)

FOREIGN PATENT DOCUMENTS

JP  7 222078  8/1995

(Continued)

OTHER PUBLICATIONS

Patent Abstracts of Japan, Publication No. 2003-224830, Publication Date Aug. 8, 2003.

(Continued)

*Primary Examiner*—Apu Mofiz
*Assistant Examiner*—Cindy Nguyen
(74) *Attorney, Agent, or Firm*—Frommer Lawrence & Haug LLP; William S. Frommer; Thomas F. Presson

(57) ABSTRACT

A remote controller for controlling a television receiver can be set such that each of users can enjoy viewing television programs in a viewing environment optimized for each user. In an operation history registration mode, data indicating an operation performed by a user and data indicating a timing of the operation are stored as operation history in the remote controller. For example, in a case in which the operation history includes information indicating that a channel was switched by a user during a commercial break, if a commercial break occurs in the middle of a program being viewed by the user in an operation history usage mode, a selection screen is displayed to prompt the user to select whether to switch the channel. The user can easily switch the channel in the same manner as the user performed in the past simply by responding the selection screen.

22 Claims, 37 Drawing Sheets

U.S. PATENT DOCUMENTS

| | | | |
|---|---|---|---|
| 2003/0050058 A1* | 3/2003 | Walsh et al. | 455/426 |
| 2003/0051247 A1* | 3/2003 | Klopfenstein | 725/53 |
| 2003/0092017 A1* | 5/2003 | Finger | 435/6 |
| 2004/0003413 A1* | 1/2004 | Boston et al. | 725/133 |

FOREIGN PATENT DOCUMENTS

| | | |
|---|---|---|
| JP | 8 123385 | 5/1996 |
| JP | 8 298627 | 11/1996 |
| JP | 9 37174 | 2/1997 |
| JP | 9-261549 | 10/1997 |
| JP | 11-232726 | 8/1999 |
| JP | 11-345446 | 12/1999 |
| JP | 2001-103406 | 4/2001 |
| JP | 2002-159077 | 5/2002 |
| JP | 2002-185912 | 6/2002 |
| JP | 2003 196970 | 7/2003 |
| WO | WO 01 17250 | 3/2001 |
| WO | WO 01 63921 | 8/2001 |
| WO | WO 02 03682 | 1/2002 |

OTHER PUBLICATIONS

Patent Abstracts of Japan, Publication No. 2003-339063, Publication Date Nov. 28, 2003.

Patent Abstracts of Japan, Publication No. 2004-040498, Publication Date Feb. 5, 2004.

Patent Abstracts of Japan, Publication No. 056630, Publication Date Feb. 19, 2004.

Patent Abstracts of Japan, Publication No. 2003-224797, Publication Date Aug. 8, 2003.

Patent Abstracts of Japan, Publication No. 2003-224798, Publication Date Aug. 8, 2003.

* cited by examiner

FIG. 14

| GENRE | COUNT | NAME | COUNT | TITLE | COUNT |
|---|---|---|---|---|---|
| ROMANCE | 1 | UTADA | 5 | NEWS AA | 5 |
| MUSIC | 7 | HAMAZAKI | 1 | NEWS BB | 1 |
| SF | 3 | SUZUKI | 1 | LET'S DO CC | 1 |
| HISTORY | 1 | NISHIDA | 2 | DD MUSIC | 6 |
| NEWS | 6 | TANGE | 3 | EE SCREEN | 2 |
| VARIETY | 2 | YUKAWA | 2 | FF STAGE | 2 |
| COMEDY | 1 | SASAKI | 1 | MUSIC GG | 1 |
| ACTION | 1 | KONDO | 4 | STORY OF HH | 4 |
|  |  | OHE | 2 |  |  |

FIG. 15

| TITLE | GENRE | PERFORMER | DATE/TIME | CHANNEL |
|---|---|---|---|---|
| DD MUSIC | MUSIC | UTADA AND HAMAZAKI | 4/12 21:00-22:00 | M |

FIG. 32

SELECT A TIME AT WHICH TO
EXECUTE A ROUTINE OPERATION

1. DATE/TIME — 261

2. IN COMMERCIAL BREAKS

3. IN A SPECIFIC GENRE

FIG. 33

SELECT A ROUTINE OPERATION

1. SWITCH THE CHANNEL — 271

2. TURN ON OR OFF THE POWER

3. ZAPPING

FIG. 38

```
                                            214
┌─────────────────────────────────────────┐
│                                         │
│  OPERATIONS PERFORMED DURING            │
│  COMMERCIAL BREAKS IN THE PAST          │
│                                         │
│       ┌──────────────────────┐          │
│   1.  │ ZAPPING              │──── 291  │
│       └──────────────────────┘          │
│                                         │
│   2.   REDUCING OF VOLUME               │
│                                         │
└─────────────────────────────────────────┘
```

CONTROL SYSTEM, CONTROL APPARATUS, CONTROL METHOD, STORAGE MEDIUM, AND PROGRAM

BACKGROUND OF THE INVENTION

1. Field of the Invention

The present invention relates to a control system, a control apparatus, a control method, a storage medium, and a program, and more particularly, to a control system, a control apparatus, a control method, a storage medium, and a program, which allow each of users to view a television program in an environment optimized for each user.

2. Description of the Related Art

Some users have their own television set such as a liquid crystal television. However, in many cases, a single television set is used by a plurality of users such as family members.

However, in the case in which a single television set is used by a plurality of users, setting of the television set made by a previous user can remain unchanged when another user turns on the television set. In this case, the user has to make resetting of the television set in accordance with his/her preference.

For example, if a previous user turns off the power of the television set without reducing the volume from a very high level employed in viewing a program, a next user has to reduce the volume by operating a remote controller or the like when the next user turns on the power.

Some users tend to perform zapping (quick channel-to-channel switching) when a commercial break occurs in the middle of a broadcast program to know what kinds of programs are being broadcast on other channels. However, it is troublesome for a user to perform zapping by operating the remote controller each time a commercial break occurs.

If a television set or a remote controller can be set so as to automatically perform zapping each time a commercial break occurs, a user can enjoy viewing programs in a more comfortable viewing environment without having to perform troublesome operations.

SUMMARY OF THE INVENTION

In view of the above, an object of the present invention is to make it possible for each of users to enjoy viewing programs in a comfortable viewing environment optimized for each user.

The present invention provides a control apparatus for use as a component of a control system, comprising receiving means for receiving electronic program guide information transmitted from an information processing apparatus, storage means for storing the electronic program guide information received by the receiving means, acquisition means for, on the basis of the electronic program guide information stored in the storage means, acquiring supplemental information which is associated with a program processed by the information processing apparatus and which indicates a feature of the program, selection means for selecting a particular program on the basis of the supplemental information acquired by the acquisition means, and control means for controlling the information processing apparatus so as to record or play back the program selected by the selection means.

The present invention also provides an information processing apparatus for use as a component of the control system, comprising transmission means for transmitting electronic program guide information to a control apparatus, and record/playback means for recording or playing back a program under the control of the control apparatus.

The present invention also provides a first control apparatus, comprising receiving means for receiving electronic program guide information transmitted from an information processing apparatus, storage means for storing the received electronic program guide information, acquisition means for, on the basis of the stored electronic program guide information, acquiring supplemental information which is associated with a program processed by the information processing apparatus and which indicates a feature of the program, selection means for selecting a particular program on the basis of the acquired supplemental information, and control means for controlling the information processing apparatus so as to record or play back the selected program.

The acquisition means may acquire, as the supplemental information associated with a program processed by the information processing apparatus, supplemental information associated with a program recorded or played back by the information processing apparatus.

The first control apparatus according to the present invention may further comprise management means for managing the occurrence count of each item in the supplemental information, wherein the selection means may select a program regarded by the management means as having a high occurrence count.

In the management of the occurrence count of each item in the supplemental information, the management means may weight an occurrence count depending on a process performed by the information processing apparatus.

The present invention also provides a first control method for a control apparatus, comprising the steps of receiving electronic program guide information transmitted from an information processing apparatus, storing the received electronic program guide information, on the basis of the stored electronic program guide information, acquiring supplemental information which is associated with a program processed by the information processing apparatus and which indicates a feature of the program, selecting a particular program on the basis of the acquired supplemental information, and controlling the information processing apparatus so as to record or play back the selected program.

The present invention also provides a first storage medium of a control apparatus including a program stored therein comprising a procedure of controlling a process including the steps of receiving electronic program guide information transmitted from an information processing apparatus, storing the received electronic program guide information, on the basis of the stored electronic program guide information, acquiring supplemental information which is associated with a program processed by the information processing apparatus and which indicates a feature of the program, selecting a particular program on the basis of the acquired supplemental information, and controlling the information processing apparatus so as to record or play back the selected program.

The present invention also provides a first program executed by a computer to control a control apparatus for controlling an information processing apparatus, the program comprising a procedure of controlling a process including the steps of receiving electronic program guide information transmitted from an information processing apparatus, storing the received electronic program guide information, on the basis of the stored electronic program guide information, acquiring supplemental information which is associated with a program processed by the information processing apparatus and which indicates a feature of the program, selecting a particular program on the basis of the acquired supplemental information, and controlling the information processing apparatus so as to record or play back the selected program.

The present invention also provides a second control apparatus comprising storage means for storing data indicating a timing of controlling an information processing apparatus to perform a particular process and data indicating the particular process to be performed, in relation to identification information, input acceptance means for accepting input of the identification information, and control means for controlling the information processing apparatus to perform the particular process when the timing condition stored in the storage means in relation to the accepted identification information is met.

The second control apparatus according to the present invention may further comprise presentation means for presenting the timing and the content of the process stored in the storage means, when the input of the identification information is accepted by the input acceptance means, wherein the control means controls the information processing apparatus to perform a process selected from processes presented by the presentation means when a selected timing condition is met.

The second control apparatus according to the present invention may further comprise setting acceptance means for accepting setting of a timing and a content of the process, wherein the storage means stores data indicating the timing and the content of the process accepted by the setting acceptance means.

The present invention also provides a second controlling method for a control apparatus, comprising the steps of storing data indicating a timing of controlling an information processing apparatus to perform a particular process and data indicating the particular process to be performed, in relation to identification information, and controlling the information processing apparatus to perform the process when the timing condition indicated by the data stored in the storage step in relation to the identification information accepted in the input acceptance step is met.

The present invention also provides a second storage medium of a control apparatus including a program stored therein comprising a procedure of controlling a process including the steps of storing data indicating a timing of controlling an information processing apparatus to perform a particular process and data indicating the particular process to be performed, in relation to identification information, accepting input of the identification information, and controlling the information processing apparatus to perform the process when the timing condition indicated by the data stored in relation to the accepted identification information is met.

The present invention also provides a second program executed by a computer to control a control apparatus for controlling an information processing apparatus, the program comprising a procedure of controlling a process including the steps of storing data indicating a timing of controlling an information processing apparatus to perform a particular process and data indicating the particular process to be performed, in relation to identification information, accepting input of the identification information, and controlling the information processing apparatus to perform the process when the timing condition indicated by the data stored in relation to the accepted identification information is met.

The present invention also provides a third control apparatus comprising storage means for storing operation history indicating an operation performed by controlling an information processing apparatus at a particular timing, presentation means for presenting information to a user to prompt a user to select whether the same process as the process described in the stored operation history is performed by the information processing apparatus when the timing condition described in the operation history is met, and control means for, in the case in which the process is selected to be performed on the basis of the presented information, controlling the information processing apparatus to perform the process.

In the third control apparatus according to the present invention, the storage means may store the operation history in relation to identification information, and the control apparatus may further comprise input acceptance means for accepting input of the identification information, wherein the presentation means may present the information when the timing condition, described in the operation history stored in relation to the accepted identification information, is met.

Preferably, when an operation history registration mode is selected, the storage means stores, as the operation history, data indicating a process performed by the information processing apparatus and a timing of the process.

The present invention also provides a third controlling method for a control apparatus, comprising the steps of storing operation history indicating an operation performed by controlling an information processing apparatus at a particular timing, presenting information to a user to prompt a user to select whether the same process as the process described in the stored operation history is performed by the information processing apparatus when the timing condition described in the operation history is met, and in the case in which the process is selected to be performed on the basis of the presented information, controlling the information processing apparatus to perform the process.

The present invention also provides a third storage medium of a control apparatus including a program stored therein comprising a procedure of controlling a process including the steps of storing operation history indicating an operation performed by controlling an information processing apparatus at a particular timing, presenting information to a user to prompt a user to select whether the same process as the process described in the stored operation history is performed by the information processing apparatus when the timing condition described in the operation history is met, and in the case in which the process is selected to be performed on the basis of the presented information, controlling the information processing apparatus to perform the process.

The present invention also provides a third program executed by a computer to control a control apparatus for controlling an information processing apparatus, the program comprising a procedure of controlling a process including the steps of storing operation history indicating an operation performed by controlling an information processing apparatus at a particular timing, presenting information to a user to prompt the user to select whether the same process as the process described in the stored operation history is performed by the information processing apparatus when the timing condition described in the operation history is met, and in the case in which the process is selected to be performed on the basis of the presented information, controlling the information processing apparatus to perform the process.

In the control apparatus of the control system according to the present invention, electronic program guide information transmitted from the information processing apparatus is received, the received electronic program guide information is stored, and supplemental information associated with a program processed by the information processing apparatus and indicating the feature of the program is acquired on the basis of the stored electronic program guide information. A particular program is selected on the basis of the acquired supplemental information, and the information processing apparatus is controlled so as to record or play back the selected program.

In the information processing apparatus of the control system according to the present invention, electronic program guide information is transmitted to the control apparatus, and a program is recorded or played back under the control of the control apparatus.

In the first control apparatus, method, and program according to the present invention, electronic program guide information transmitted from the information processing apparatus is received, the received electronic program guide information is stored, and supplemental information associated with a program processed by the information processing apparatus and indicating the feature of the program is acquired on the basis of the stored electronic program guide information. A particular program is selected on the basis of the acquired supplemental information, and the information processing apparatus is controlled so as to record or play back the selected program.

In the second control apparatus, method, and program according to the present invention, data indicating a timing of controlling an information processing apparatus to perform a particular process and data indicating the particular process to be performed are stored in relation to identification information, and an input of identification information is accepted. The information processing apparatus is controlled so as to perform the particular process when the timing condition stored in relation to the identification information is met.

In the third control apparatus, method, and program according to the present invention, operation history indicating operations performed by controlling an information processing apparatus at a particular timing is stored, and, when the particular timing described in the stored operation history is met, information is presented to a user to prompt the user to select whether to control the information processing apparatus to perform the same operation as that described in the operation history. If it is determined to perform the same operation on the basis of the presented information, the information processing apparatus is controlled so as to perform the same operation.

BRIEF DESCRIPTION OF THE DRAWINGS

FIG. 14 is a diagram showing an example of occurrence count information;

FIG. 15 is a diagram showing an example of a program retrieved on the basis of occurrence count information;

FIG. 32 is a diagram showing an example of a screen displayed in step S335 shown in FIG. 31;

FIG. 33 is a diagram showing an example of a screen displayed in step S337 shown in FIG. 31;

FIG. 38 is a diagram showing an example of a screen displayed in step S398 shown in FIG. 37;

DESCRIPTION OF THE PREFERRED EMBODIMENTS

Figure 1:
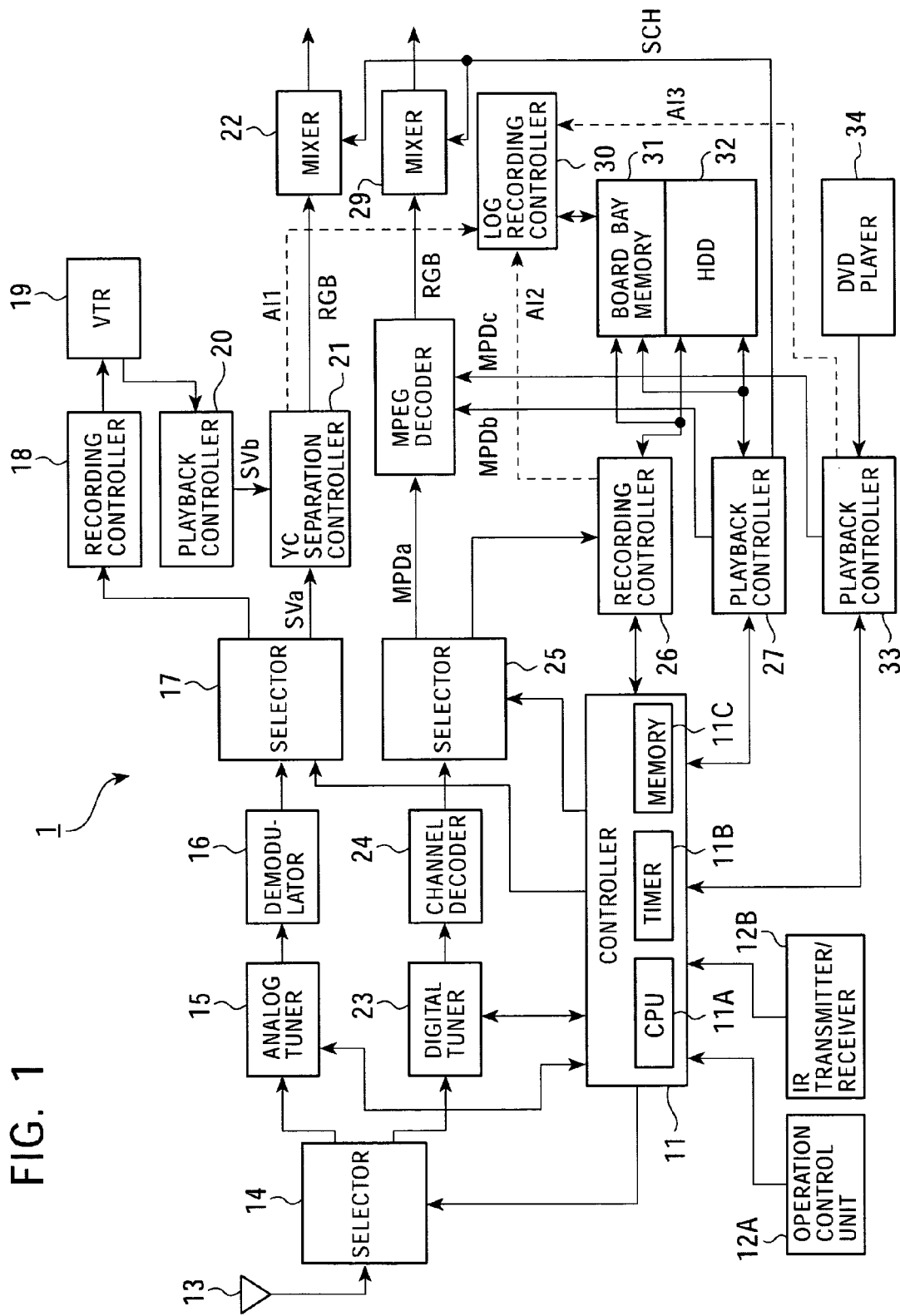
FIG. 1 is a block diagram showing an example of a construction of a television receiver according to the present invention.

FIG. 1 is a block diagram showing an example of a construction of a television receiver 1 according to the present invention.

A CPU (Central Processing Unit) 11A of a controller 11 controls the whole operation of the television receiver 1 in accordance with a preinstalled control program. The controller 11 includes a timer 11B and a memory 11C.

Under the control of the CPU 11A, the timer 11B measures the elapsed time since the last channel switching (that is, the period of time during which the same program is viewed). The memory 11C stores the program executed by the CPU 11A, parameters used in the execution of the program, and other data such as data which is read from the HDD 32 and which indicates conditions under which a broadcast program is to be recorded in a programmed-recording mode.

An operation control unit 12A includes, for example, ten numeric keys and four arrow keys disposed on the front panel of the television receiver 1. In accordance with an operation performed by a user on the operation control unit 12A, the operation control unit 12A outputs a control signal associated with channel selection, recording, programming of automatic recording, or playback operation to the controller 11.

The operation of the television receiver 1 can be controlled by using not only the operation control unit 12A but also a remote controller. If an infrared ray carrying a command is emitted from the remote controller toward the television receiver 1, the infrared ray is received by an IR transmitter/receiver 12B of the television receiver 1. The IR receiver 12B extracts the command from the infrared ray and outputs it to the controller 11. In accordance with the command, the controller 11 controls the television receiver 1.

As will be described later, various kinds of information are also transmitted via an infrared ray from the IR transmitter/receiver 12B to the remote controller.

An antenna 13 receives analog broadcast waves and digital broadcast waves and supplies obtained electric signals to a selector 14. Under the control of the controller 11, the selector 14 outputs electric signals received from the antenna 13 to an analog tuner 15 or a digital tuner 23.

The analog tuner 15 selects a signal of a particular channel specified by a user from the analog broadcast signals received from the selector 14 and converts it into an intermediate-frequency signal. The intermediate-frequency signal generated by the analog tuner 15 is output to a demodulator 16.

The demodulator 16 demodulates the received intermediate-frequency signal into a video signal. The obtained video signal is output to a selector 17.

The video signal output from the demodulator 16 includes supplemental information AI1 associated with a broadcast program described in vertical blanking periods of the video signal. The supplemental information AI1 includes information indicating a feature of the program such as the title, performer's names, and genre of the program.

The supplemental information AI1 is extracted from the video signal by a YC separation controller 21 and stored in a log recording controller 30. The supplemental information AI1 stored in the log recording controller 30 is used, as will be described later, when a program to be recorded is selected or when a program to be recommended to a user is selected.

Under the control of the controller 11, the selector 17 supplies the video signal output from the demodulator 16 to a recording controller 18 or the YC separation controller 21. More specifically, in the case in which the video signal is recorded, the selector 17 supplies the video signal output from the demodulator 16 to the recording controller 18. On the other hand, when an image (program) is displayed on a display such as a CRT (Cathode Ray Tube) or an LCD (Liquid Crystal Display) in accordance with the video signal, the video signal output from the demodulator 16 is supplied to the YC separation controller 21.

The recording controller 18 controls the operation of a VTR (Video Tape Recorder) 19 to record the video signal. A playback controller 20 controls the VTR to play back the recorded video signal.

If the YC separation controller 21 receives the video signal from the selector 17 or playback controller 20, the YC separation controller 21 separates the received video signal into a luminance signal Y and a color signal C and demodulates the color signal C into a red color difference signal R-Y and a blue color difference signal B-Y. Furthermore, the YC separation controller 21 performs a matrix process on the luminance signal Y, the red color difference signal R-Y, and the blue color difference signal B-Y thereby generating a RGB signal. Meanwhile, the YC separation controller 21 extracts the supplemental information AI1 and outputs it to the log recording controller 30.

A mixer 22 mixes the RGB signal supplied from the YC separation controller 21 with a display signal SCH which is supplied from the playback controller 27 and which represents a character string or a graphics image to be displayed on the screen. The RGB signal mixed by the mixer 22 with the display signal SCH is supplied to a display disposed in the outside. The display displays an image in accordance with the video signal SVa or SVb.

The digital tuner 23 selects a signal of a particular channel specified by a user from the digital broadcast signals supplied from the selector 14 thereby acquiring digital data of a broadcast program specified by the user. The digital data acquired by the digital tuner 23 is supplied to a channel decoder 24.

The channel decoder 24 decodes the supplied digital data into MPEG (Moving Picture Expert Group) data (in the form of a transport stream).

The MPEG data output from the channel decoder 24 includes supplemental information AI2 associated with the program. The supplemental information AI2 includes, as with the supplemental information AI1 described above, information indicating a feature of the program such as the title, performer's names, and genre of the program.

Under the control of the controller 11, the selector 25 outputs the supplied MPEG data to the recording controller 26 when the MPEG data output by the channel decoder 24 is recorded. In the case in which an image is displayed on the display according to the MPEG data, the selector 25 outputs the supplied MPEG data to the MPEG decoder 28. The selector 25 extracts supplemental information AI2 from the MPEG data and supplies the extracted supplemental information AI2 to the log recording controller 30 via the recording controller 26.

The recording controller 26 controls a recording operation such that the MPEG data supplied from the selector 25 is recorded on an HDD (Hard Disk Drive) 32. The playback controller 27 controls playback of MPEG data stored on the HDD 32 and outputs the MPEG data read from the HDD 32 to the MPEG decoder 28. The MPEG decoder 28 decodes the supplied MPEG data and performs descrambling to obtain a RGB signal. The obtained RGB signal is output to the mixer 29.

In addition to the MPEG data of programs output from the channel decoder 24, other data such as program table data (EPG (Electronic Program Guide) data) included in digital broadcast waves is also stored on the HDD 32. The EPG data includes information associated with programs of several days, in terms of the broadcast date/time, channel number, title, performer's names, genre, outline, and the like.

The EPG data is extracted by the digital tuner 23 and stored on the HDD 32 via the controller 11 and the recording controller 26. The EPG data stored on the HDD 32 is updated at scheduled times. The updated EPG data is transmitted from the IR transmission/reception controller 12B to the remote controller.

The mixer 29 combines the RGB signal supplied from the MPEG decoder 28 with a display signal SCH which is supplied from the playback controller 27 and which represents a character string or a graphics image to be displayed on the screen. The mixer 29 outputs the resultant combined signal to the external display. The display displays an image in accordance with the supplied signal.

That is, the display displays an image in accordance with the MPEG data MPDa supplied from the channel decoder 24 via the selector 25, the MPEG data MPDb supplied from the HDD 32 via the playback controller 27, or the MPEG data MPDc supplied from the DVD (Digital Video Disc) player 34 via the playback controller 33.

A display signal SCH is generated by the controller 11 not only to display a channel number of a selected program or to display a screen for setting programmed-recording of a broadcast program but also to display a program table on the basis of EPG data stored on the HDD 32 or to display a program which is extracted from the program table for the purpose of recommendation to a user, as will be described later. In any case, the generated display signal SCH is supplied to the mixers 22 and 29.

The board bay memory 31 is formed so as to be removable from the television receiver 1 and is used to store occurrence count information which is generated by the log recording controller 30 in terms of items included in the supplemental information such as the broadcast date/time, channel number, title, performer's names, genre, and the like. The occurrence count information stored in the board bay memory 31 is used, for example, when a program to be recommended to a user is selected.

Under the control of the playback controller 33, a DVD player 34 plays back content data recorded on a DVD mounted on the DVD player 34. For example, content data played back by the DVD player 34 includes supplemental information AI3 including information indicating the title of the played-back content, performer's name, director's name, composer's name, songwriter's name, and/or genre of the content. The supplemental information AI3 is supplied from the playback controller 33 to the log recording controller 30.

Although not shown in FIG. 1, the recording controller 18, the playback controller 20, the YC separation controller 21, the mixer 22, the MPEG decoder 28 and the mixer 29 are also connected to the controller 11 via control lines, and their operations are controlled by the controller 11. Data of an analog broadcast program is also stored on the HDD 32 as required.

Figure 2:
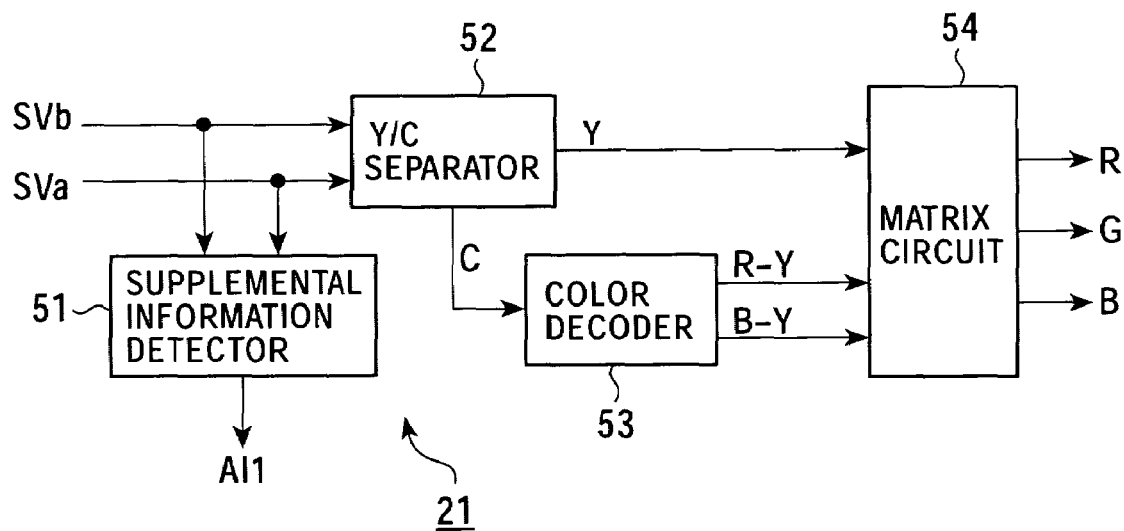
FIG. 2 is a block diagram showing an example of a construction of a YC separation controller shown in FIG. 1.

FIG. 2 is a block diagram showing an example of a construction of the YC separation controller 21 shown in FIG. 1.

The video signal SVa output from the selector 17 and the video signal SVb output from the VTR 19 via the playback controller 20 are supplied to a supplemental information detector 51 and a Y/C separator 52.

The supplemental information detector 51 detects supplemental information AI1 (indicating the title of a program, performer's name, genre of the program, and the like) superimposed, in vertical blanking periods, on the video signal SVa or the video signal SVb. The detected supplemental information AI1 is output to the log recording controller 30.

The Y/C separator 52 separates the video signal SVa or SVb into a luminance signal Y and a color signal C. The color signal C is output to a color decoder 53, and the luminance signal Y is output to a matrix circuit 54.

The color decoder 53 decodes the color signal C into a red color difference signal R-Y and a blue color difference signal B-Y. The resultant red color difference signal R-Y and the blue color difference signal B-Y are output to a matrix circuit 54. The matrix circuit 54 performs a matrix process on the luminance signal Y, a color signals R-Y and B-Y, thereby generating a RGB signal. The generated RGB signal is supplied to the mixer 22.

Figure 3:
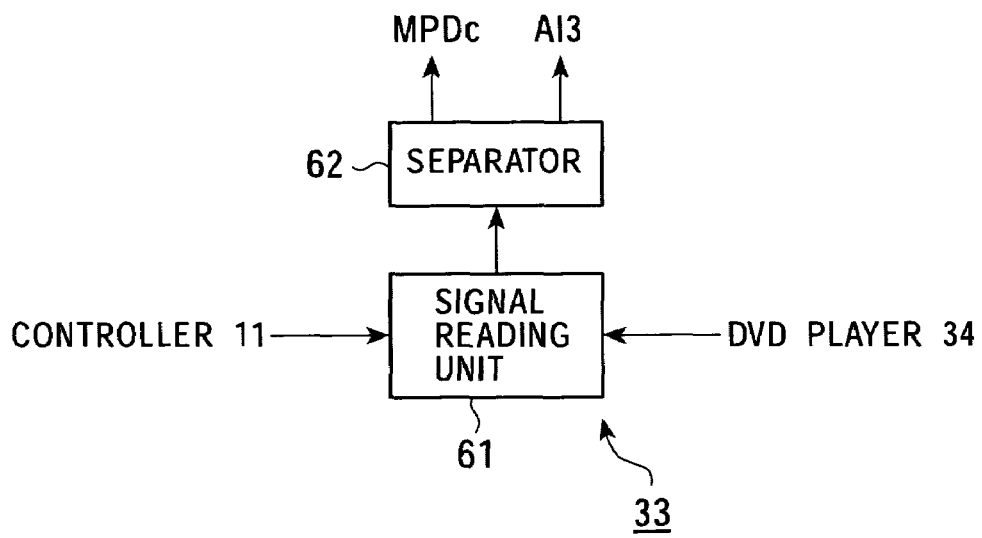
FIG. 3 is a block diagram showing an example of a construction of a playback controller shown in FIG. 1.

FIG. 3 is a block diagram showing an example of a construction of the playback controller 33.

Under the control of the controller 11, a signal reader 61 transfers content data received from the DVD player 34 to a separator 62. The separator 62 separates the supplied content data into MPEG data MPDc and supplemental information AI3 (indicating the title of the played-back content, performer's name, director's name, composer's name, songwriter's name, and/or genre of the content). The supplemental information AI3 is output to the log recording controller 30 and the MPEG data MPDC is output to the MPEG decoder 28.

Figure 4:
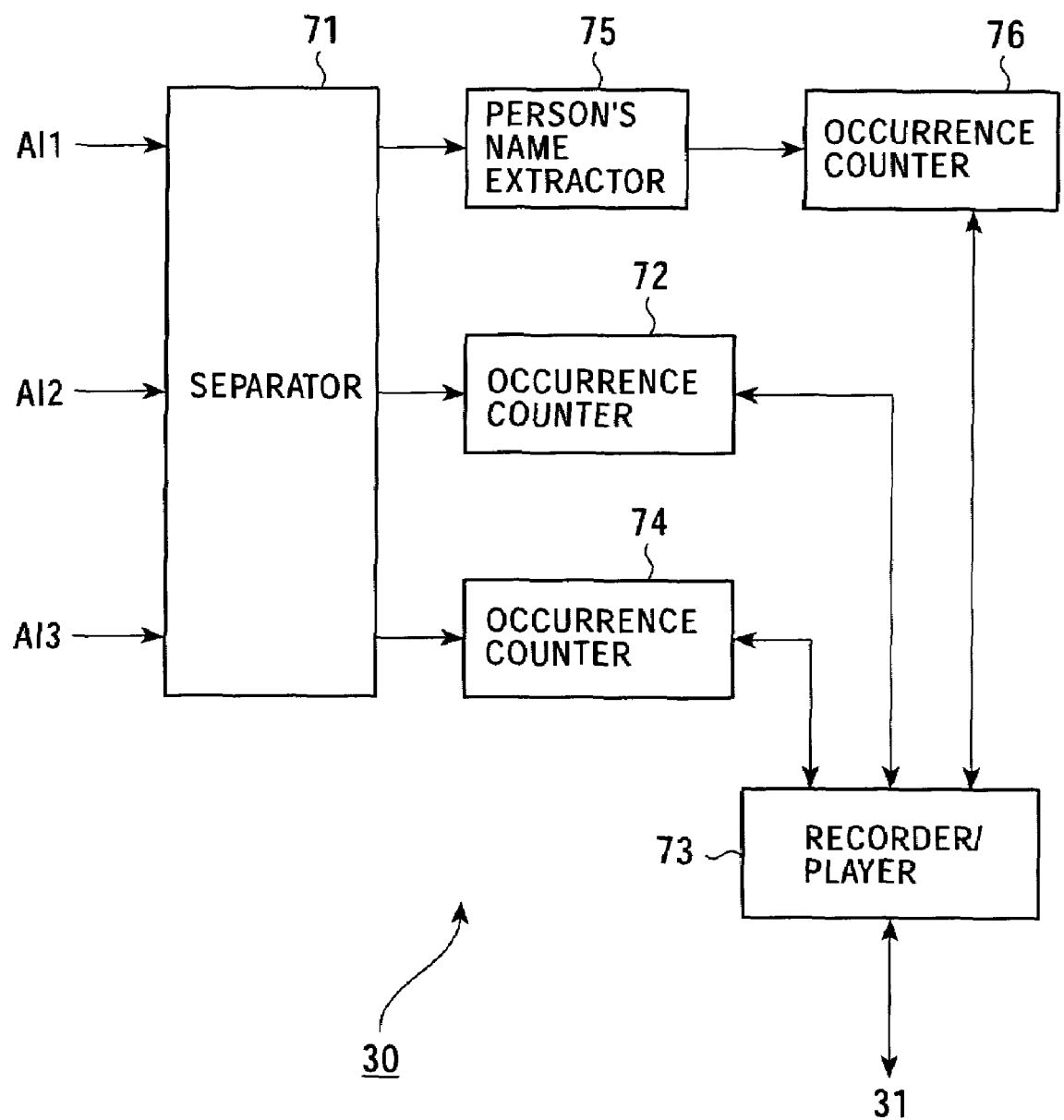
FIG. 4 is a block diagram showing an example of a construction of the log recording controller shown in FIG. 1.

FIG. 4 is a block diagram showing an example of a construction of the log recording controller 30.

As shown in FIG. 4, the supplemental information AI1 supplied from the YC separation controller 21, the supplemental information AI2 supplied from the recording controller 26, and the supplemental information AI3 supplied from the playback controller 33 are supplied to a separator 71.

If the separator 71 receives one of the supplemental information AI1 to AI3, the separator 71 separates it into, for example, information indicating the title of a program, information indicating the performer's name of the program, and information indicating the genre of the program. The resultant information indicating the title is output from the separator 71 to an occurrence counter 72, and the information indicating the genre is output to an occurrence counter 74. The information indicating the person's names is output to a person's name extractor 75.

Occurrence count information in terms of program tiles read from the board bay memory 31 via the recorder/player 73 is also supplied to the occurrence counter 72. On the basis of the information indicating the title supplied from the separator 71, the occurrence counter 72 updates the occurrence count information in terms of program titles supplied from the recorder/player 73. More specifically, the occurrence counter 72 increases the occurrence count in the present occurrence count information of the same title as that indicated by the information supplied from the separator 71.

Similarly, occurrence count information in terms of genres read from the board bay memory 31 via the recorder/player 73 is also supplied to the occurrence counter 74, and the occurrence counter 74 updates the occurrence count information in terms of genres on the basis of the information indicating the genre supplied from the separator 71.

Unlike the title information or the genre information, the person's name information supplied to the person's name extractor 75 generally includes plural pieces of information (each indicating a person's name). The person's name extractor 75 extracts each person's name from the person's name information supplied from the separator 71 and outputs extracted each piece of person's name information to an occurrence counter 76.

Occurrence count information in terms of person's names read from the board bay memory 31 via the recorder/player 73 is also supplied to the occurrence counter 76, and the occurrence counter 76 updates the occurrence count information in terms of person's names on the basis of the information indicating person's names supplied from the person's name extractor 75.

The occurrence count information updated by the occurrence counter 72, the occurrence count information updated by the occurrence counter 74, and the occurrence count information updated by the occurrence counter 76 are written into the board bay memory 31 via the recorder/player 73. As a result, the occurrence count information stored in the board bay memory 31 is updated.

The operation of the television receiver 1 constructed in the above-described manner is described below.

Figure 5:
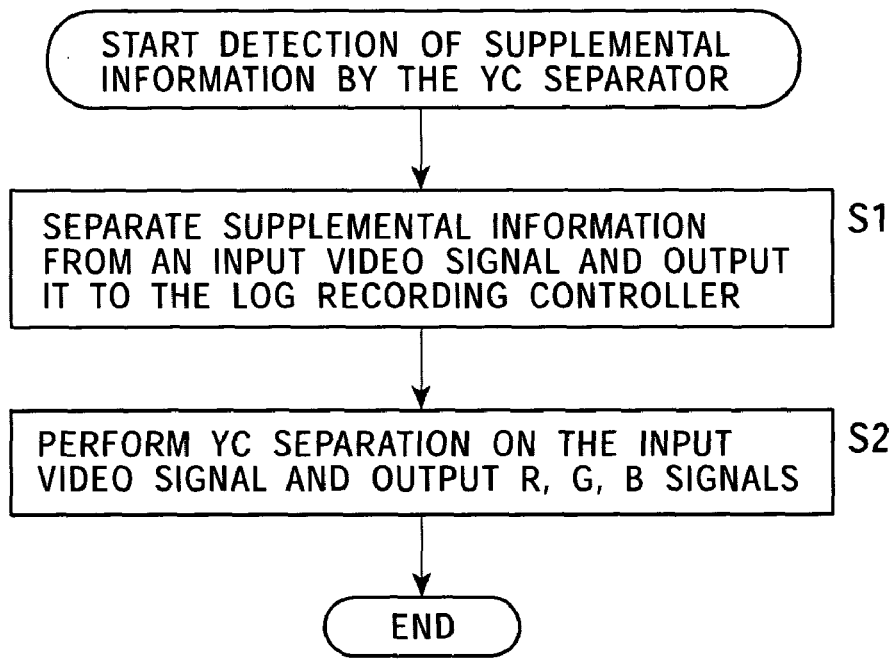
FIG. 5 is a flow chart showing a supplemental information detection process performed by the YC separation controller.

First, referring to a flow chart shown in FIG. 5, a process performed by the YC separation controller 21 to detect supplemental information when a program is viewed (played back) is described below.

In step S1, the supplemental information detector 51 (FIG. 2) separates supplemental information AI1 from a video signal supplied from the selector 17 or the playback controller 20 and supplies the obtained supplemental information AI1 to the log recording controller 30. As described above, the supplemental information AI1 detected by the supplemental information detector 51 includes information indicating a feature of the program such as the title, performer's names, and genre of a program being viewed by a user.

In step S2, the RGB signal generated by the Y/C separator 52, the color decoder 53, and the matrix circuit 54 is supplied to the mixer 22.

More specifically, the Y/C separator 52 extracts a luminance signal Y and a color signal C from the received video signal and supplies the luminance signal Y to the matrix circuit 54 and the color signal C to the color decoder 53. The color decoder 53 extracts a red color difference signal R-Y and a blue color difference signal B-Y by demodulating the supplied color signal C and outputs the obtained color difference signals R-Y and B-Y to the matrix circuit 54. The matrix circuit 54 performs a matrix operation on the luminance signal Y and the color difference signals R-Y and B-Y thereby generating a RGB signal. The generated RGB signal is output to the mixer 22.

For example, when a command is issued by a user by operating the operation control unit 12A of the user to play back a program recorded on the VTR 19, a video signal SVb output from the VTR 19 is supplied to the YC separation controller 21 via the process described above, and an image is displayed on the display such as a CRT or an LCD in accordance with the video signal SVb.

Meanwhile, the YC separation controller 21 detects supplemental information AI1 from the video signal SVb and outputs the detected supplemental information AI1 to the log recording controller 30.

Figure 6:
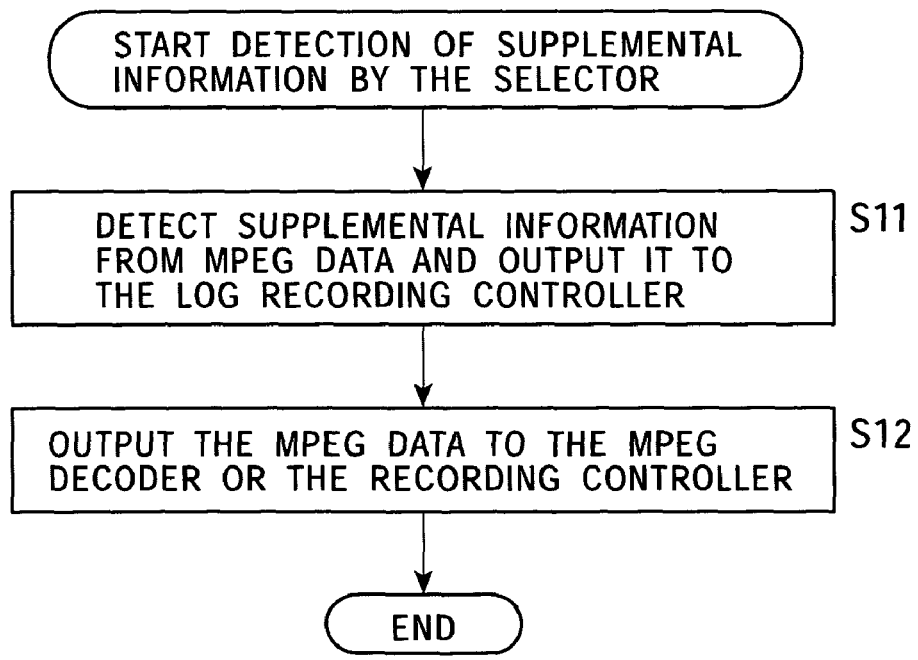
FIG. 6 is a flow chart showing a supplemental information detection process performed by a selector.

Referring to a flow chart shown in FIG. 6, the operation performed by the selector 25 to detect supplemental information when a program is played back is described below.

In step S11, the selector 25 detects supplemental information AI2 from MPEG data supplied from the channel decoder 24. The detected supplemental information AI2 is supplied to the log recording controller 30 via the recording controller 26.

That is, in the case in which a user operates the operation control unit 12A so as to view a particular program broadcast on a digital broadcast channel, electric signals obtained by receiving broadcast waves by the receiving antenna 13 are supplied to the digital tuner 23 via the selector 14, and the digital tuner 23 selects digital data of the specified program from the electric signals and supplies the resultant digital data to the channel decoder 24.

The channel decoder 24 decodes the digital data into MPEG data of the specified program. The obtained MPEG data is supplied to the selector 25.

In step S12, if a program is specified to be viewed (that is, if an image of the program is specified to be displayed), the selector 25 supplies the received MPEG data MPDa to the MPEG decoder 28. However, if data of the program is specified to be recorded on the HDD 32, the selector 25 supplies the received MPEG data MPDa to the HDD 32 via the recording controller 26.

The MPEG data MPDa is decoded by the MPEG decoder 28 into a RGB signal, and the resultant RGB signal is output to the mixer 29. The mixer 29 mixes the RGB signal with a display signal SCH. In accordance with the resultant mixed signal, the display displays an image.

The MPEG data supplied to the HDD 32 from the selector via the recording controller 26 is stored, in a scrambled form, on the HDD 32.

Figure 7:
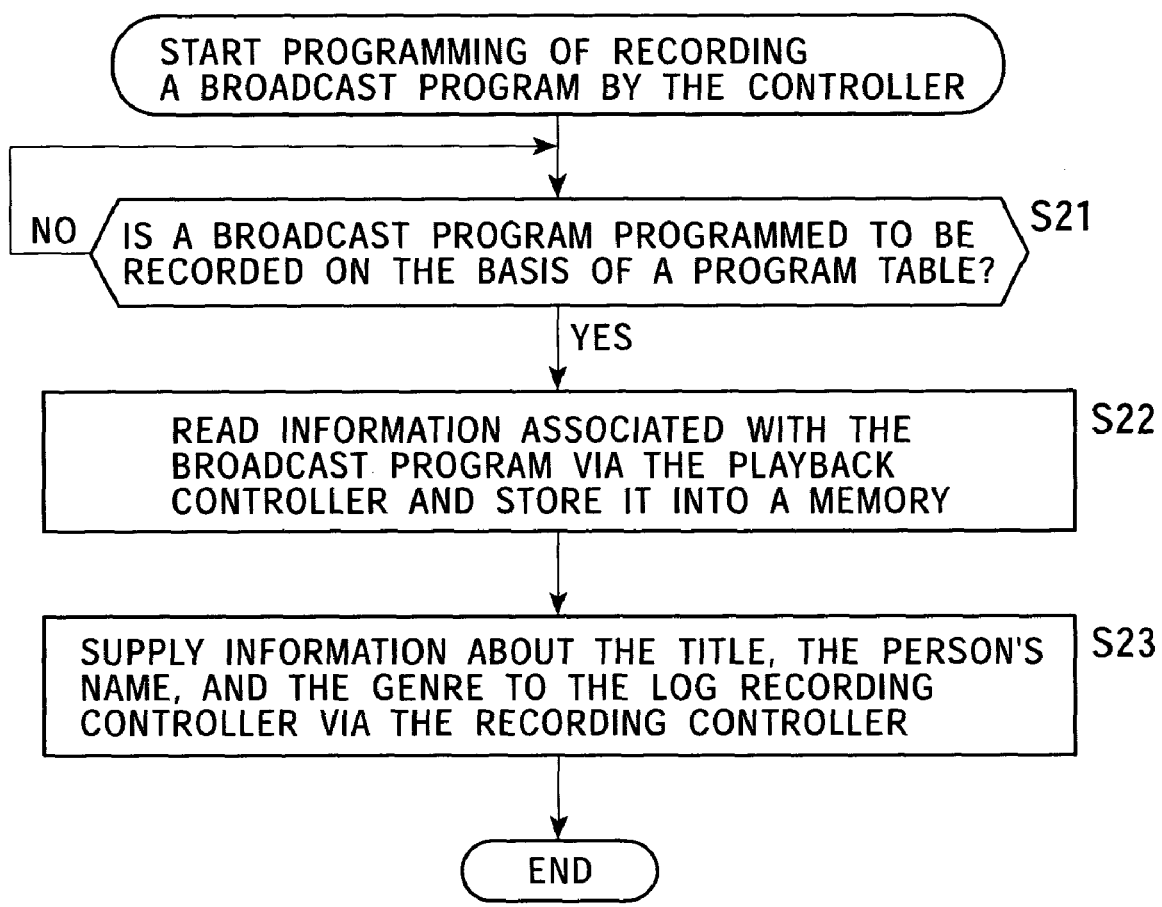
FIG. 7 is a flow chart showing a process performed by a controller to make setting of automatic recording.

Referring to a flow chart shown in FIG. 7, an operation performed by the controller 11 to set automatic recording conditions in accordance with an input given by a user is described below.

In step S21, on the basis of an output from the operation control unit 12A or the IR transmitter/receiver 12B, the controller 11 (CPU 11A) determines whether programmed-recording of a particular program is set on a program table screen. If it is determined that the programmed-recording is not set, the process waits in step S21 until the programmed-recording is set.

If the controller 11 determines in step S21 that the programmed-recording is set, the process proceeds to step S22. In step S22, the controller 11 reads information associated with the program to be recorded, such as the broadcast date/time, channel number, title, performer's names, and genre, from the HDD 32 (more strictly, from the EPG data stored on the HDD 32) via the playback controller 27. The information read from the HDD 32 is stored in the memory 11C.

In step S23, the controller 11 supplies the information about the broadcast date/time, channel number, title, performer's names, and genre acquired from the EPG data stored on the HDD 32, as supplemental information AI2 associated with the program specified to be automatically recorded, to the log recording controller 30 via the recording controller 26.

Furthermore, in accordance with the information about the broadcast date/time and the channel number, the controller 11 sets programmed-recording such that the program specified by the user is to be recorded (more strictly, such that MPEG image data of the program is to be recorded on the HDD 32 or such that the video signal of the program is to be recorded on the VTR 19).

If the broadcast start time of the specified program is reached, the controller 11 controls the analog tuner 15 or the digital tuner 23 so as to receive a broadcast signal on a channel on which the specified program is broadcast, and controls the VTR 19 so as to record the received video signal of the program or controls the HDD 32 so as to record the MPEG data of the program on the HDD 32.

Referring to a flow chart shown in FIG. 8, a process performed by the playback controller 33 to play back a DVD is described below.

In step S31, on the basis of an output from the controller 11, the playback controller 33 determines whether a user has issued a command to play back (content of) a DVD. If it is determined that the playback command has not issued, the process waits in step S31 until the playback command is issued.

If the playback controller 33 determines in step S31 that the playback command has been issued, the playback controller 33 controls the DVD player 34 to play back a content recorded on the DVD. That is, in step S32, the playback controller 33 reads the content data via the signal reader 61 (FIG. 3) and supplies the obtained content data to the separator 62.

In step S33, the playback controller 33 separates the data acquired via the signal reader 61 into MPEG data MPDc and supplemental information AI3 using the separator 62. In the next step S24, the separated MPEG data MPDc is output to the MPEG decoder 28, and the supplemental information AI3 is output to the log recording controller 30.

The image of the content recorded on the DVD is displayed on the display via a process performed by the MPEG decoder 28 and the mixer 29.

Figure 8:
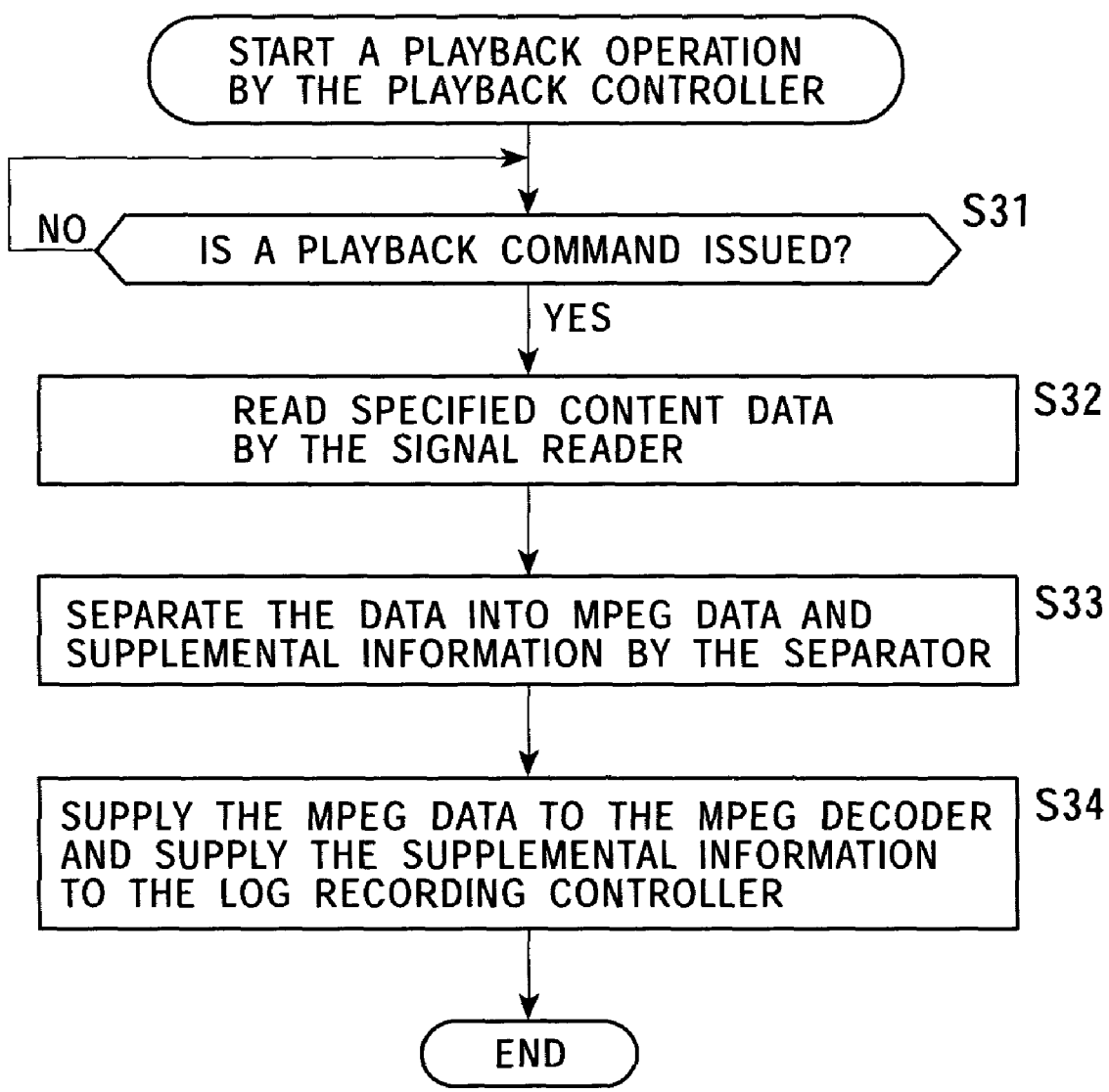
FIG. 8 is a flow chart showing a playback process performed by a playback controller.

Thus, to the log recording controller 30, the supplemental information AI1 is supplied from the YC separation controller 21 (step S1 in FIG. 5), the supplemental information AI2 is supplied from the recording controller 26 (step S11 in FIG. 6), and the supplemental information AI3 is supplied from the playback controller 33 (step S34 in FIG. 8).

Each time the log recording controller 30 receives one of supplemental information AI1 to AI3, the log recording controller 30 updates occurrence count information stored in the board bay memory 31.

Now, referring to a flow chart shown in FIG. 9, a process performed by the log recording controller 30 to update the occurrence count information is described below.

If the log recording controller 30 receives one of supplemental information AI1 to AI3 (hereinafter, supplemental information AI1 to AI3 will be generically referred to as supplemental information AI unless it is needed to describe specific one), the log recording controller 30 separates, in step S41, the supplemental information AI into information indicating a title, person's name, and genre using the separator 71.

In step S42, the log recording controller 30 determines whether the information separated by the separator 71 includes information indicating a person's name.

If the log recording controller 30 determines in step S42 that the separated information includes information indicating a person's name, the log recording controller 30 output the information indicating the person's name to the person's name extractor 75. In the next step S43, the person's name extractor 75 extracts individual person's names from the information separated by the separator 71. Information indicating each person's name extracted by the person's name extractor 75 is output to the occurrence counter 76.

On the other hand, if it is determined in step S42 that there is no information indicating a person's name or if information indicating individual person's names is extracted in step S43, the occurrence count information is updated in step S44.

More specifically, in accordance with the title information separated by the separator 71 and supplied to the occurrence counter 72, the occurrence counter 72 updates the occurrence count information read from the board bay memory 31 such that the count of the title of interest is increased. Similarly, in accordance with the genre information separated by the separator 71 and supplied to the occurrence counter 74, the occurrence counter 74 updates the occurrence count information read from the board bay memory 31 such that the count of the genre of interest is increased.

Furthermore, in accordance with the person's name information extracted by the person's name extractor 75, the occurrence counter 76 updates the occurrence count information read from the board bay memory 31 such that the count of each person's name of interest is increased.

In step S45, the recorder/player 73 writes the updated occurrence count information into the board bay memory 31. Thus, the occurrence count information (occurrence count information of titles, genres, and person's names) stored in the board bay memory 31 is updated.

In the above-described updating of the occurrence counts of titles, person's names, and genres, each occurrence count of the title, person's name and genre separated by the separator 71 is increased simply by one. Alternatively, each occurrence count may be increased by a value weighted by a factor determined depending on the operation performed by a user. The information indicating the weighting factor is supplied from the controller 11 to the log recording controller 30 via a line (not shown).

Figure 10:
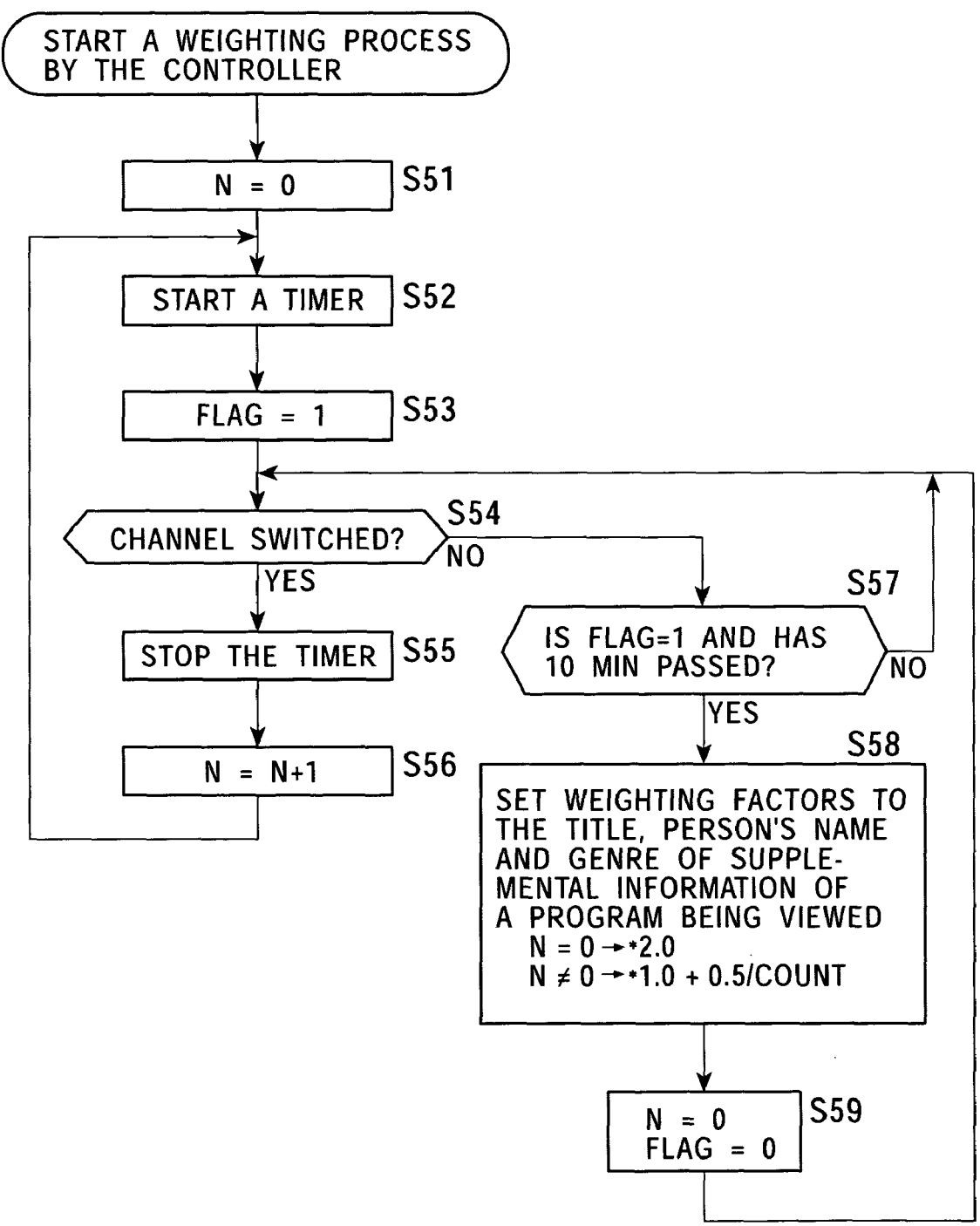
FIG. 10 is a flow chart showing a weighting process performed by the controller.

Referring to a flow chart shown in FIG. 10, a process performed by the controller 11 to determine the weighting factors by which the occurrence count information is updated when a program is viewed (played back) is described below.

As described above, when an image of a program is displayed in accordance with a signal obtained from a broadcast wave received via the antenna 13, supplemental information AI1 or AI2 is supplied to the log recording controller 30, and occurrence counts are increased by factors weighted in accordance with the supplied supplemental information.

In step S51, the controller 11 initializes the count value N to 0, wherein the count value N indicates the number of times the channel is switched. In step S52, the timer 11B is started to measure the time during which a currently selected program is viewed.

In step S53, the controller 11 sets a flag to "1".

In step S54, on the basis of the output from the operation control unit 12A or the IR transmitter/receiver 12B, the controller 11 determines whether a channel switch command is issued.

If the controller 11 determines in step S54 that the channel switch command is issued, the process proceeds to step S55. In step S55, the controller 11 stops the view time measurement being performed by the timer 11B. In step S56, the controller 11 increments the count value N by 1 (N=N+1). Thereafter, the flow returns to step S52 to repeat the process described above.

In the case in which the controller 11 determines in step S54 that the channel switch command is not issued, the controller 11 advances the flow to step S57. In step S57, the controller 11 determines whether the flag is set to "1" and whether the time measured by the timer 11B is equal to or longer than 10 min.

If the controller 11 determines in step S57 that the flag is not set to "1" (that is, the flag is set to "0") or that the time measured by the timer 11B is shorter than 10 min, the controller 11 returns the flow to step S54 to repeat step S54 and following steps. However if the controller 11 determines that the flag is set to "1" and the time measured by the timer 11B is equal to or longer than 10 min, the controller 11 advances the flow to step S58.

In step S58, the controller 11 determines the weighting factor to be used in updating of occurrence counts associated with the supplemental information of the program being viewed, for example, such that the weighting factor is set to 2.0 when N=0 or (1.0+0.5/N) when N≠0.

As a result, if the channel is not switched for 10 min or longer, the occurrence counts of the supplemental information of the program are increased by a factor weighted depending on the number of times the channel is switched until the program is finally selected (that is, depending on the count value N). That is, the weighting factor is increased with decreasing number of times the channel is switched. This is because users generally switches the channel a small number of times before users finally select a program when the program is important to users.

The manner of determining the weighting factor is not limited to that described above, but the weighting factor may be determined in another manner.

In step S59, the controller 11 initializes the count value N to "0" and resets the flag to "0". Thereafter, the controller 11 returns the flow to step S54 to repeat the process described above.

Figure 9:
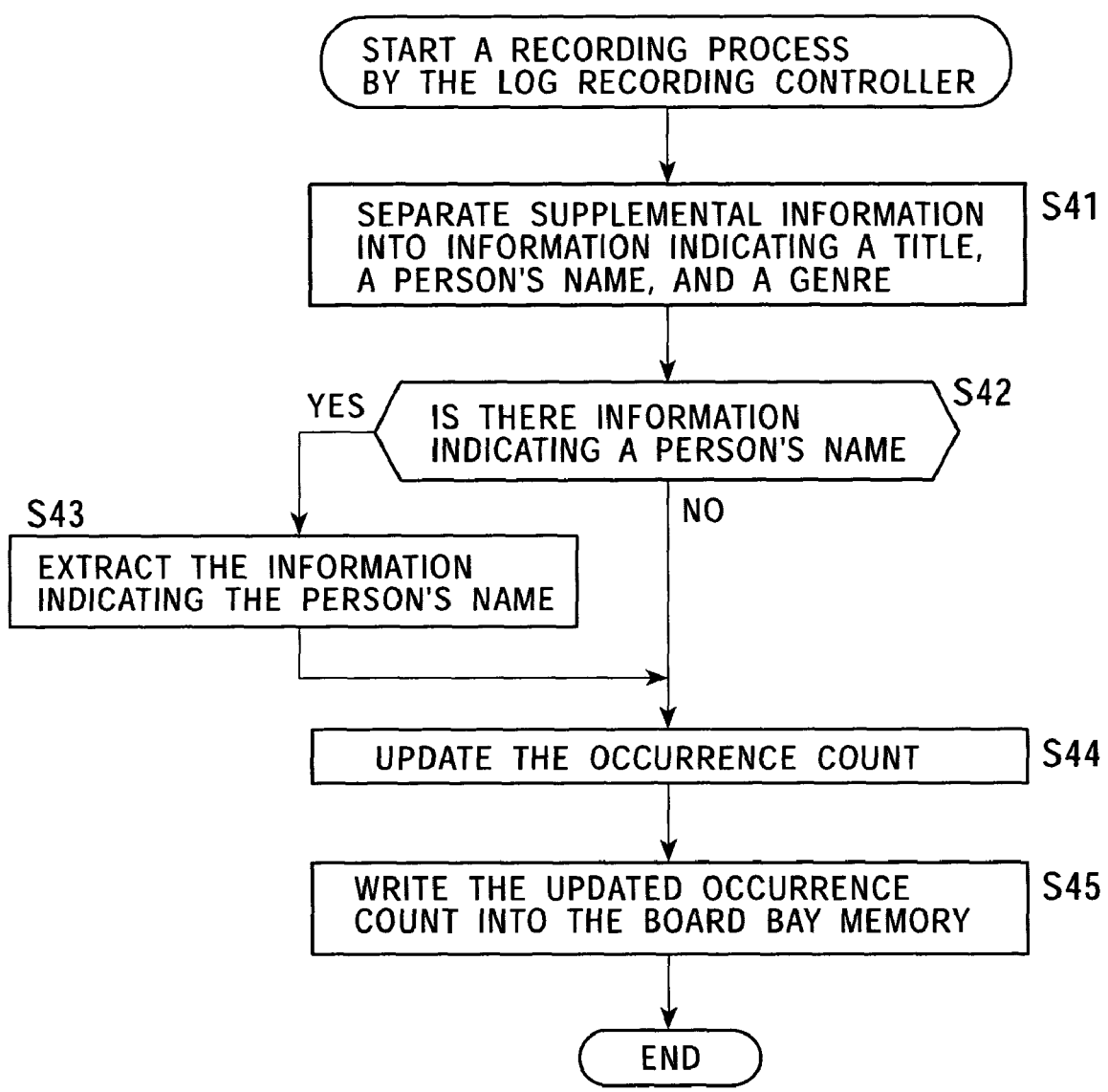
FIG. 9 is a flow chart showing a recording process performed by a log recording controller.

Via the process described above, the weighting factor is determined depending on the operation performed by the user when the program is viewed, and the occurrence count information is updated in step S44 in FIG. 9 in accordance with the determined weighting factor.

Figure 11:
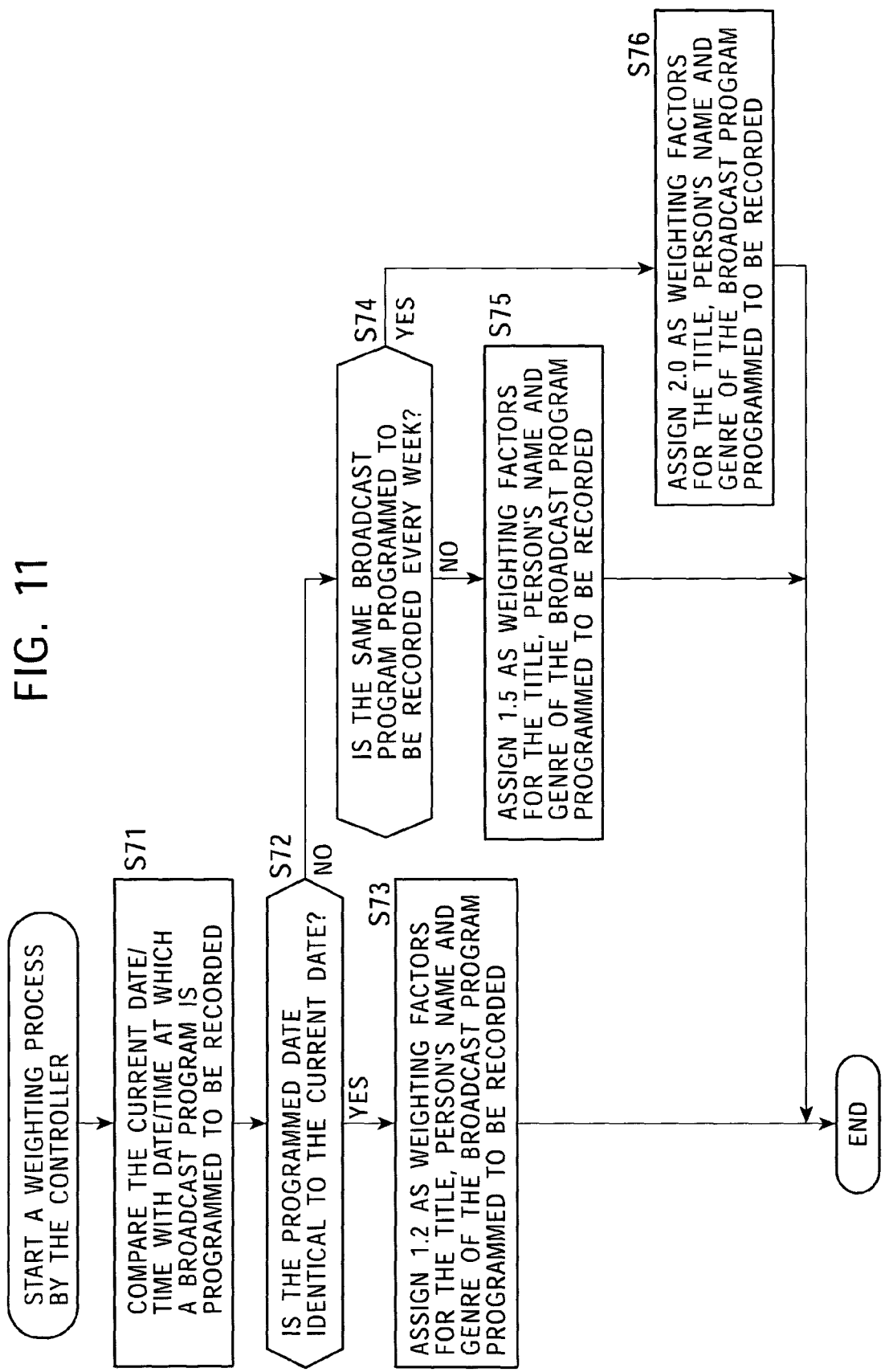
FIG. 11 is a flow chart showing another weighting process performed by the controller.

Now, referring to a flow chart shown in FIG. 11, a process performed by the controller 11 to determine the weighting factor when programmed-recording of a broadcast program is set is described below.

In this process, the occurrence count information of a title, a person's name, and genre is updated in accordance with a weighting factor determined on the basis of the supplemental information AI2 supplied from the recording controller 26 to the log recording controller 30 when a program record command is issued.

For example, if a user sets programmed-recording conditions via the program table screen such that a particular program is to be recorded, then, in step S71, the controller 11 compares the present date/time with the broadcast date/time of the program set to be recorded. In the next step S72, the controller 11 determines whether the present day on which the setting of programmed-recording is performed is identical to the broadcast date.

If the controller 11 determines in step S72 that the present day on which the setting of programmed-recording is performed is identical to the broadcast date, the controller 11 advances the process to step S73. In step S73, the controller 11 determines the weighting factor as 1.2 by which to increase the occurrence counts of the title, the person's name, and the genre of the program set to be recorded.

On the other hand, if the controller 11 determines in step S72 that the present day on which the setting of programmed-recording is performed is not identical to the broadcast date, the controller 11 advances the process to step S74.

In step S74, the controller 11 determines whether the programmed-recording is set such that the same program is to be recorded every week (in an every-week mode). If it is determined the programmed-recording is not set such that the same program is to be recorded every week (that is, if it is determined that the setting of programmed-recording is performed on a day preceding the broadcast day and that the broadcast program is to be recorded only once), the process proceeds to step S75. In step S75, the controller 11 determines the weighting factor as 1.5 by which to increase the occurrence counts of the title, the person's name, and the genre of the program set to be recorded.

If the controller 11 determines in step S74 that the programmed-recording is set such that the same program is to be recorded every week, the controller 11 advances the process to step S76. In step S76, the controller 11 determines the weighting factor as 2.0 by which to increase the occurrence counts of the title, the person's name, and the genre of the program set to be recorded.

As described above, for a program set to be recorded in the programmed-recording mode, a weighting factor is determined depending on a date/time at which setting of programmed-recording is performed (and more strictly, depending on the length of the period from a time at which setting of programmed-recording is performed to a time at which the automatic recording of the program is started).

In the above example, a greater weighting factor is given when setting of programmed-recording is performed on a day before a broadcast date or when the same program is set to be recorded every week than is given when setting of programmed-recording is performed on the same day as the broadcast date, because users generally perform setting of programmed-recording of a broadcast program several days before a broadcast date, if the program is important to the users, while users generally perform setting on the same day as a broadcast date when the program is not important to users.

The values of the weighting factor are not limited to those described above, but other values may also be employed.

Figure 12:
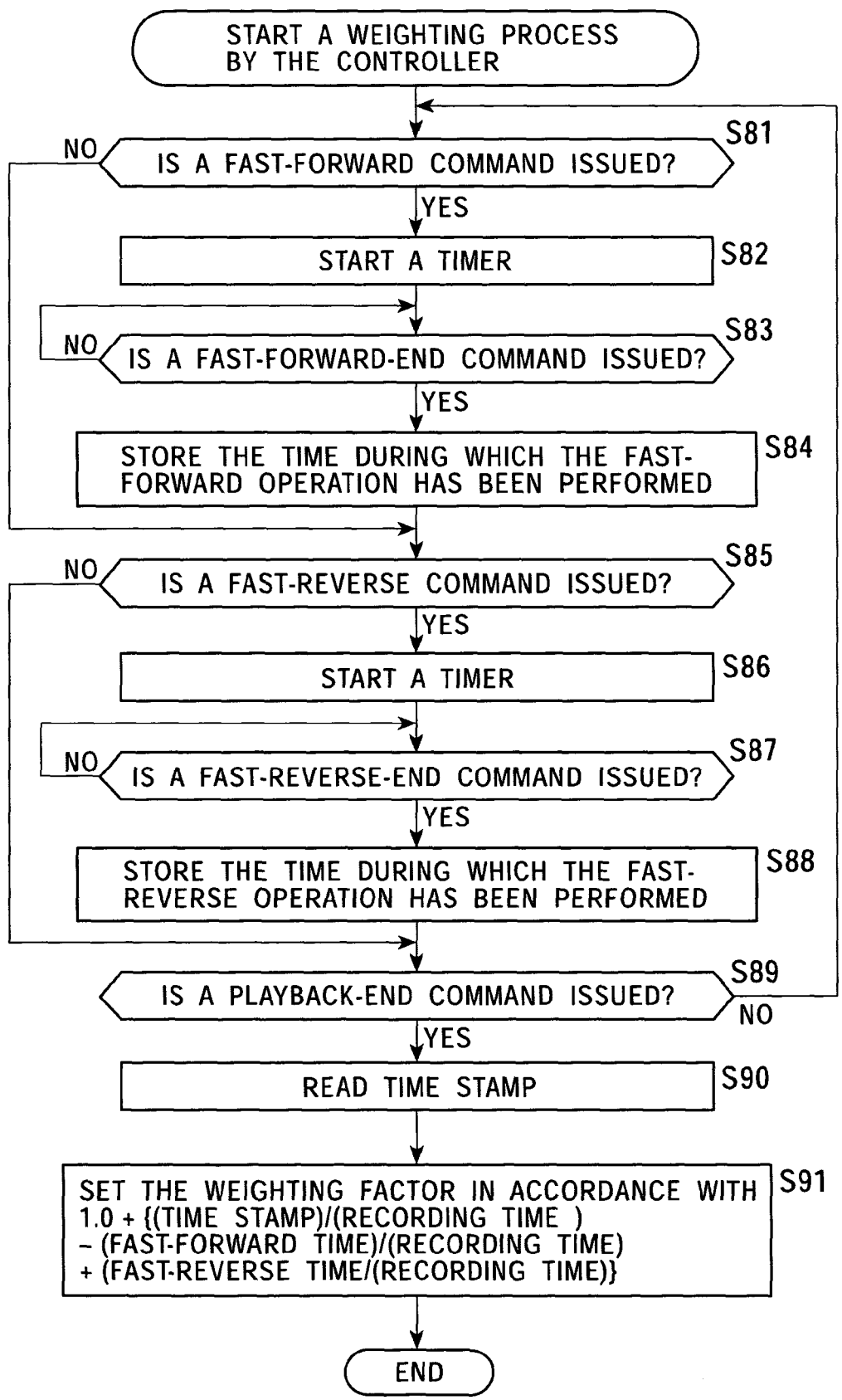
FIG. 12 is a flow chart showing still another weighting process performed by the controller.

Referring to a flow chart shown in FIG. 12, a process performed by the controller 11 to determine the weighting factor by which to update occurrence counts when a DVD is played back is described below.

That is, when a DVD playback command is issued, the weighting factor by which to increase the occurrence counts of a title, a person's name, and a genre is determined on the basis of supplemental information AI3 acquired by the playback controller 33.

In step S81, the controller 11 determines whether a fast-forward command is issued for a content being played back. If the fast-forward command is not issued, the process jumps to step S85 without performing steps S82 to S84 which will be described later. On the other hand, if the controller 11 determines in step S81 that the fast-forward command is issued, the controller 11 advances the process to step S82. In step S82, the controller 11 starts the timer 11B to measure the time during which the fast-forward operation is performed.

In step S83, the controller 11 determines whether a fast-forward end command is issued. If the fast-forward end command is not issued, the process waits in step S83 until the fast-forward end command is issued.

If the controller 11 determines in step S83 that the fast-forward end command is issued (to return the operation into a normal playback mode), the controller 11 advances the process to step S84. In step S84, the controller 11 acquires, from the timer 11B, the time during which the fast-forward operation has been performed, and the controller 11 stores the time into the memory 11C.

In step S85, the controller 11 determines whether a fast-rewind command is issued. If the fast-rewind command is not issued, steps S86 to S88 which will be descried later are skipped.

On the other hand, if the controller 11 determines in step S85 that the fast-rewind command is issued, the controller 11 starts in step S86 the timer 11B to measure the time during which the fast-rewind operation is performed.

In step S87, the controller 11 determines whether a fast-rewind end command is issued. If the fast-rewind end command is not issued, the process waits in step S87 until the fast-rewind end command is issued. If the controller 11 determines in step S87 that the fast-rewind end command is issued (to return the operation into the normal playback mode), the controller 11 advances the process to step S88. In step S88, the controller 11 acquires, from the timer 11B, the time during which the fast-rewind operation has been performed, and the controller 11 stores the time into the memory 11C.

In step S89, on the basis of the output from the operation control unit 12A or the IR transmitter/receiver 12B, the controller 11 determines whether a playback end command is issued. If it is determined that the playback end command is not issued, the controller 11 returns the flow to step S81 to repeat step S81 and following steps.

If the controller 11 determines in step S89 that the playback stop command is issued, the controller 11 advances the process to step S90. In step S90, the controller 11 reads a position (time stamp) at which the playback of the content was stopped.

In step S91, the controller 11 substitutes the time stamp read in step S90, the length in time of the content being played back, and the times (the fast-forward time and the fast-rewind time) stored in the memory 11C into an equation 1.0+(time stamp)/(content length)−(fast-forward time)/(content length)+(fast-rewind time)/(content length). The controller 11 employs the resultant value obtained by this equation as the weighting fact by which to increase the occurrence counts of the title, the person's name, and the genre of the content.

As described above, the weighting factor is determined depending on the fast-forward time and/or the fast rewind time during the playback operation. More specifically, the weighting factor is increased with decreasing fast-forward time or increasing fast-rewind time. This is because when a content is important to users, the users generally spend a short time on fast-forward operation and long time on fast-rewind operation.

The calculation of the weighting factor is not limited to that using the above equation, but the weighting factor may be calculated differently.

In the television receiver 1 shown in FIG. 1, weighting factors are determined in the above-described manner, and the occurrence counts of titles, person's names, and genres are updated in accordance with the determined weighting factors. Furthermore, a program which is likely to be preferred by the user is selected on the basis of the occurrence count information, and the selected program is automatically recorded (without requiring the user to perform a setting operation for recording).

Referring to a flow chart shown in FIG. 13, a process (automatic recording setting process) performed by the controller 11 to make setting of automatic recording of a program is described below.

In step S101, the controller 11 determines whether it is a time to make setting for automatic recording of a program. If it is not a time to make setting for automatic recording, the process waits in step S101 until it becomes a time to make setting for automatic recording. For example, automatic setting of recording may be performed in response to a command issued by a user or may be automatically performed when a particular time specified by the user is reached. That is, if the user simply issues a setting start command or if the user specifies only a time at which setting of recording is to be performed, a broadcast program which is very likely to be preferred by the user is set to be automatically recorded without requiring the user to select the program.

If the controller 11 determines in step S101 that it is a time to make setting for automatic recording, the controller 11 advances the process to step S102. In step S102, the controller 11 reads the occurrence count information in terms of titles, person's name, and genres from the board bay memory 31 via the playback controller 27 and extracts a title, a person's name, and a genre having the greatest occurrence counts. That is, controller 11 extracts the title of a program having the greatest occurrence count (that is, the title of a program which has been viewed the greatest number of times), the name of a person who has appeared most often in programs viewed by the user, and the genre which has been viewed the greatest number of times.

In step S103, the controller 11 searches EPG data stored on the HDD 32 for a program which matches the title, the person's name, and the genre extracted in step S102.

Herein, a program which matches all of the title, the person's name, and the genre extracted in step S102 may be retrieved or a program which matches some of the title, the person's name, and the genre extracted in step S102 may be retrieved.

If a program is retrieved, the controller 11 writes, in step S104, the information associated with the retrieved program such as the broadcast start time and the broadcast channel number into the memory 11C.

Figure 13:
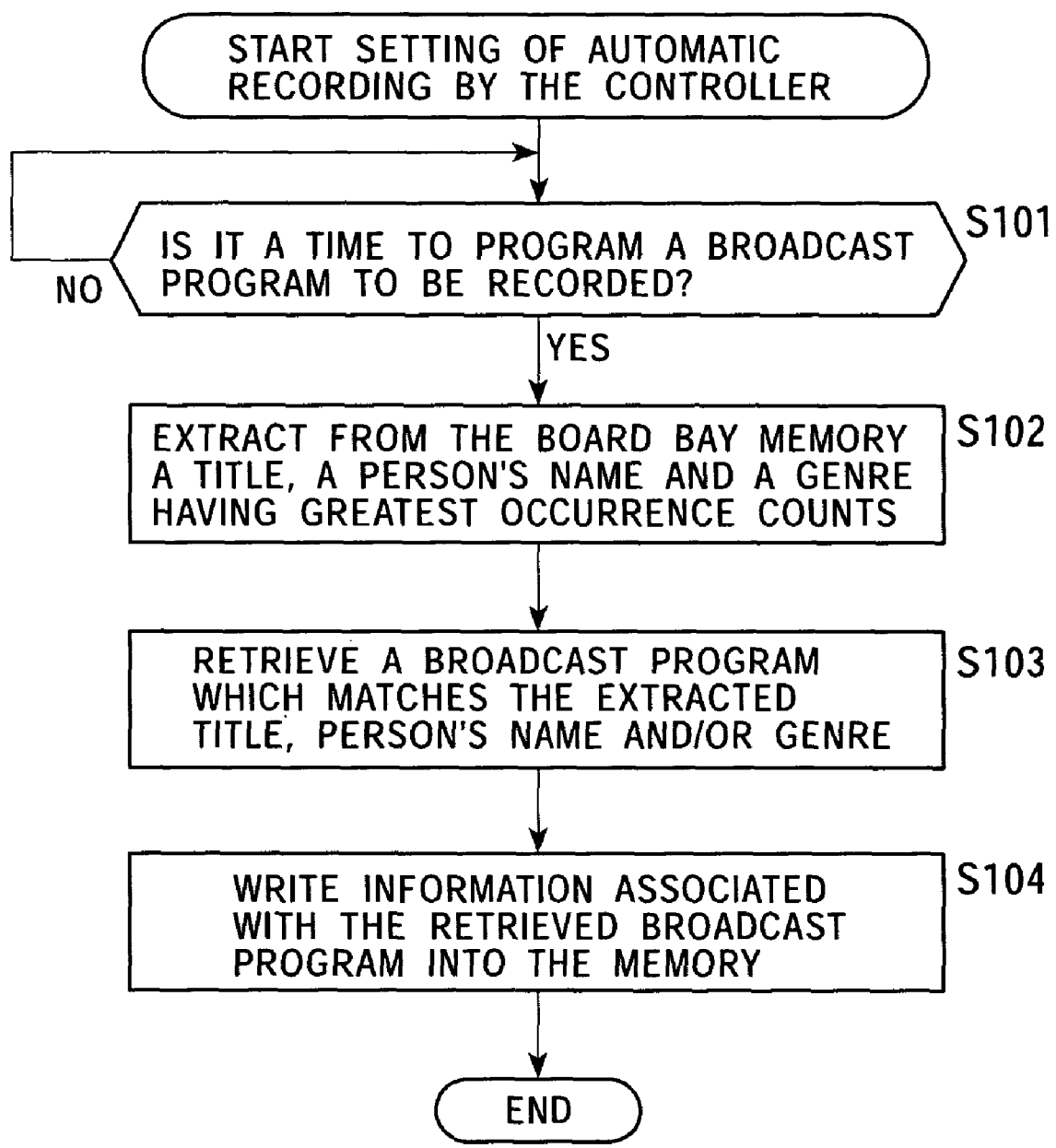
FIG. 13 is a flow chart showing a process performed by a controller to automatically make setting of recording.

In a case in which no program which matches the occurrence count information is found in step S103, the process shown in FIG. 13 is terminated.

FIG. 14 is a diagram showing an example of occurrence count information in terms of titles, person's names, and genres stored in the board bay memory 31.

In the example shown in FIG. 14, of all genres, "music" has a greatest occurrence count (that is, the number of programs belonging to genre of "music" is greatest, and seven programs are included in genre of "music"). On the other hand, of all names of persons who have appeared in programs recorded or viewed, "Utada" has a greatest occurrence count (5). Of all titles of programs recorded or viewed, "DD music" has a greatest occurrence count (6).

Thus, in the case in which the occurrence count information shown in FIG. 14 is stored in the board bay memory 31, "DD music", "Utada", and "music" are extracted as the title, the person's name, and the genre (having greatest occurrence counts), respectively, in step S102 shown in FIG. 13.

In accordance with the extracted entries ("DD music", "Utada", and "music"), retrieval is performed in step S103 in FIG. 13, and a retrieved program is selected as a program to be recorded. Information associated with the selected program ("DD music"), such as the broadcast date/time and the broadcast channel, is stored in the memory 11C (step S104 in FIG. 13), for example, as shown in FIG. 15.

In the example shown in FIG. 15, a music program "DD music" in which "Utada" and "Hamazaki" are performers is retrieved in accordance with the occurrence count information as a program which matches the preference of the user, and the information associated with the retrieved program indicating that the program is to be broadcasted at "21:00 to 22:00" of "April 12" on channel "M" is written into the memory 11C.

As described above, in accordance with the operation history (view history), a program which is very likely to be preferred by the user is set to be automatically recorded without requiring the user to examine a program table and set recording conditions such as a record start time.

Figure 16:
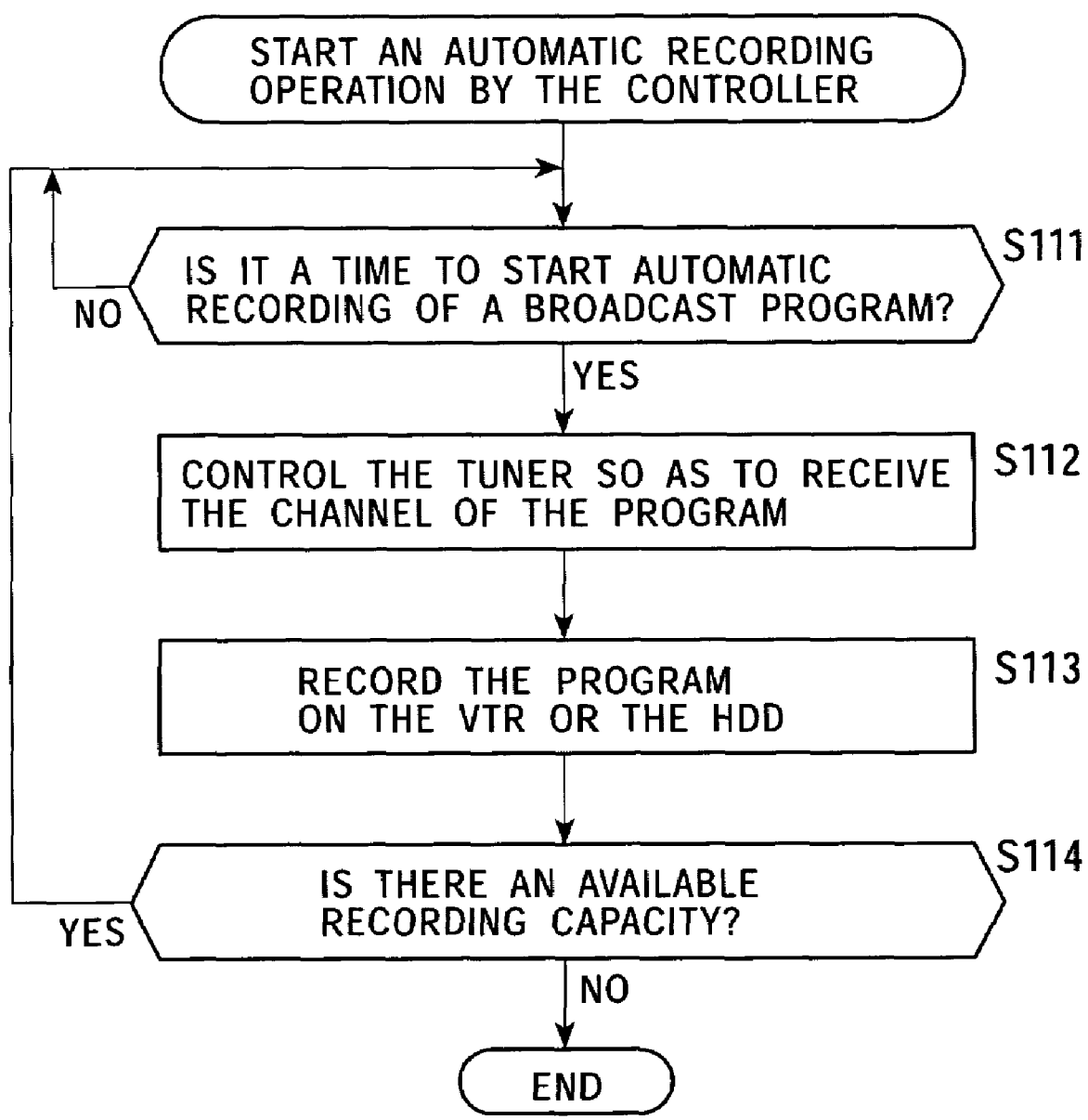
FIG. 16 is a flow chart showing an automatic recording process performed by the controller.

Referring to a flow chart shown in FIG. 16, a process performed by the controller 11 to record a program in accordance with the setting performed in the process shown in FIG. 13 is described below.

In step S111, the controller 11 examines the program information (indicating the broadcast start time and the channel number) stored in the memory 11C to determine whether the broadcast start time of the program set to be recorded is reached. If the broadcast start time is not reached, the process waits in step S111 until the broadcast start time is reached.

If the controller 11 determines in step S111 that the broadcast start time of the program set to be recorded is reached, the controller 11 advances the process to step S112. In step S112, the controller 11 controls the analog tuner 15 or the digital tuner 23 to receive the program to be recorded on the specified channel.

In the case in which an analog television broadcast wave is received, the controller 11 records, in step S113, the video signal of the program on the VTR 19 by controlling the recording controller 18. In the case in which a digital broadcast wave is received, the controller 11 records the program data on the HDD 32 by controlling the recording controller 26.

After completion of recording the program, the controller 11 determines, in step S114, whether the VTR 19 or the HDD 32 has a storage space available for further recording a program. If it is determined that the VTR 19 or the HDD 32 has an available storage space, the controller 11 returns the flow to step S111 to repeat the process described above. On the other hand, if the VTR 19 or the HDD 32 has no more available storage space, the process is ended.

Thus, the program specified in the automatic setting process is recorded on the VTR 19 or the HDD 32.

Figure 17:
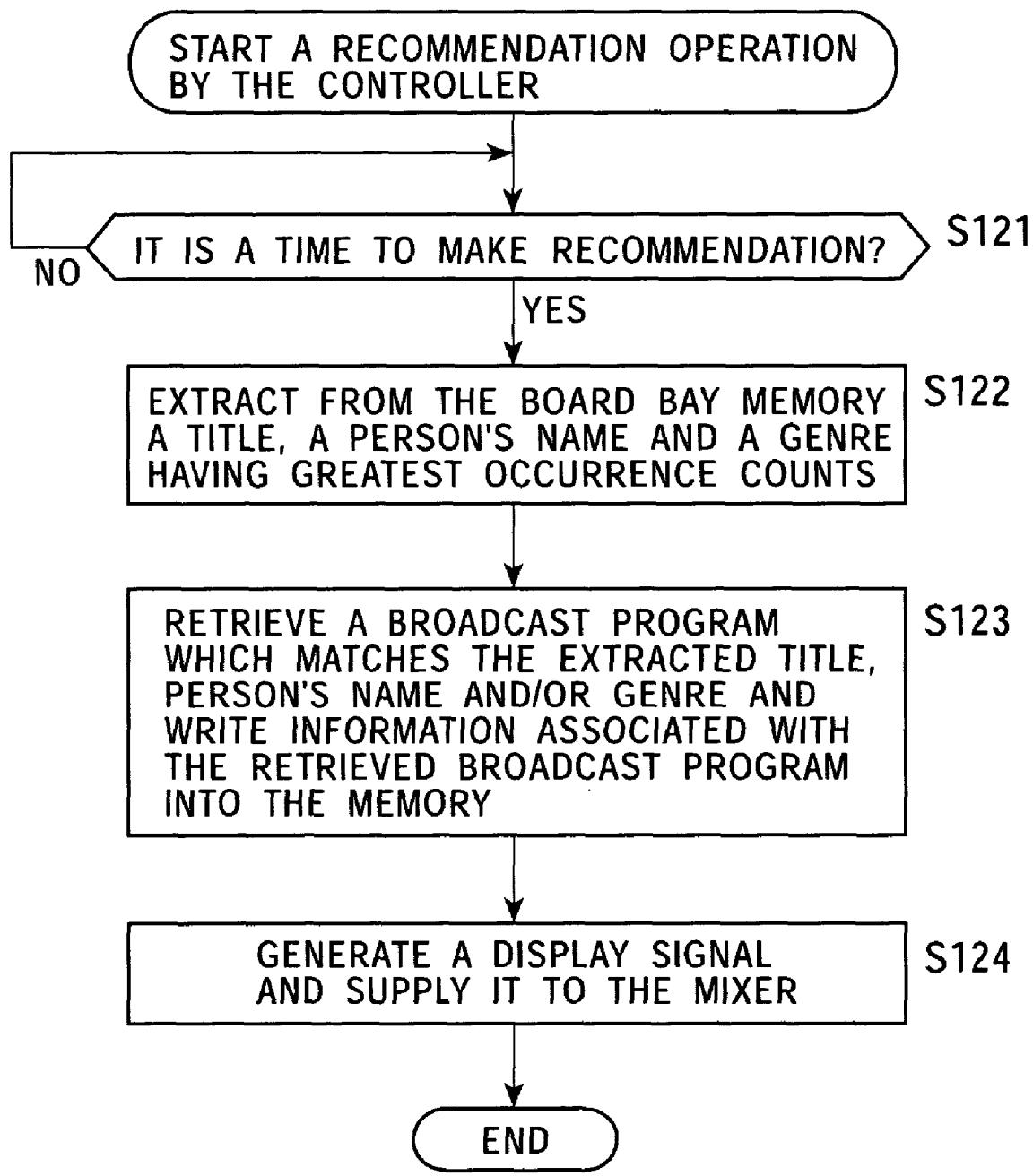
FIG. 17 is a flow chart showing an automatic recommendation process performed by the controller.

Now, referring to a flow chart shown in FIG. 17, a process performed by the controller 11 to recommend a program to a user on the basis of the occurrence count information stored in the board bay memory 31 is described below.

In step S121, the controller 11 determines whether it is a time to make a recommendation. If it is not a time to make a recommendation, the process waits in step S121 until it becomes a time to make a recommendation. The program recommendation process is started when a time specified by a user is reached or when a command is issued by the user.

If the controller 11 determines in step S121 that it has become a time to make a recommendation, the controller 11 advances the process to step S122. In step S122, the controller 11 reads the occurrence count information in terms of titles, person's name, and genres from the board bay memory 31 via the playback controller 27 and extracts a title, a person's name, and a genre having greatest occurrence counts.

In step S123, the controller 11 searches EPG data stored on the HDD 32 for a program which matches the extracted title, person's name, and genre, and the controller 11 writes information associated with the retrieved program such as the broadcast start time and the broadcast channel (such information shown in FIG. 15) into the memory 11C.

Herein, on the basis of supplemental information of programs, a program which matches all or some of the extracted title, person's name, and genre is retrieved.

In step S124, the controller 11 generates a display signal SCH for presenting information associated with the program retrieved in step S123 to a user. The controller 11 supplies the generated display signal SCH to the mixer 22 or the mixer 29 via the playback controller 27.

In accordance with the output from the mixer 22 or the mixer 29, information associated with the program selected for recommendation, such as the broadcast date/time, tile, and names of persons such as performers, is displayed on the display such as a CRT or an LCD. In a case in which a plurality of programs which match the user's preference are selected for recommendation, information is displayed for all programs.

The user may select a program from recommended programs via the screen and may set the selected program to be recorded.

Although in the example described above, only one title, one person's name, and one genre each having the greatest occurrence counts are extracted, and programs are retrieved on the basis of the extracted one title, one person's name, and one genre, a predetermined number of titles, person's names, and genres may be extracted in the order of decreasing occurrence count starting from the greatest occurrence count, and programs may be retrieved on the basis of the extracted titles, person's names, and genres.

The board bay memory 31 of the television receiver 1 shown in FIG. 1 may store not only the occurrence count information written by the log recording controller 30 but also occurrence count information based on occurrence count information written in a board bay memory of another similar television receiver (hereinafter, such a board bay memory will be referred to simply as another board bay memory) so that a program to be automatically recorded may be selected or recommended on the basis of such occurrence count information.

Figure 18:
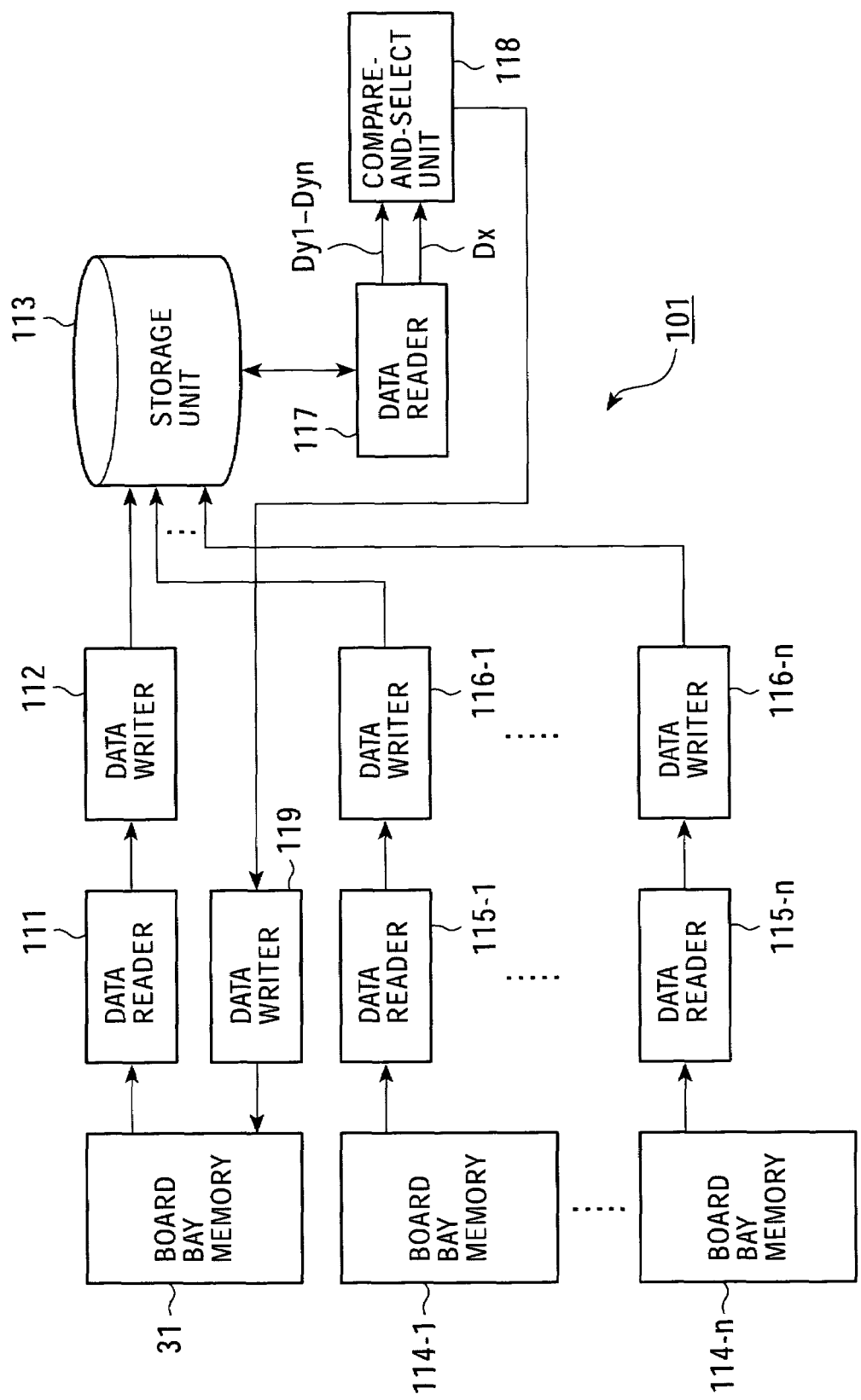
FIG. 18 is a block diagram showing an example of a construction of a data acquisition apparatus.

FIG. 18 is a diagram showing an example of a construction of a data acquisition apparatus 101 for acquiring other occurrence count information and storing it in the board bay memory 31 shown in FIG. 1.

The data acquisition apparatus 101 includes a data reader 111 for reading occurrence count information in terms of titles, person's names, and genres from the board bay memory 31, and a data writer 112 for writing the occurrence count information read by the data reader 111 into a storage unit 113. The occurrence count information read from the board bay memory 31 is managed in relation to the production number x of the board bay memory 31.

The data acquisition apparatus 101 also includes data readers 115-1 to 115-*n* for reading occurrence count information from respective other board bay memories 114-1 to 114-*n*, and data writers 116-1 to 116-*n* for writing the occurrence count information read by the data readers 115-1 to 115-*n* into the storage unit 113.

The occurrence count information read from the board bay memories 114-1 to 114-*n* are managed by the storage unit 113 in relation to the respective production numbers y1 to yn.

The data reader 117 repeatedly reads occurrence count information Dx stored in relation to the production number x from the storage unit 113 and supplies the occurrence count information Dx to the compare-and-select unit 118. The data reader 117 also reads sequentially occurrence count information Dy1 to Dyn from the storage unit 113 and supplies them to the compare-and-select unit 118.

The compare-and-select unit 118 calculates the matching degree of each of occurrence count information Dy1 to Dyn supplied from the data reader 117 with respect to the occurrence count information Dx and determines which one of the occurrence count information Dy1 to Dyn has a greatest matching degree. The occurrence count information determined by the compare-and-select unit 118 as having the greatest matching degree with respect to the occurrence count information Dx is written as other occurrence count information into the board bay memory 31 by the data writer 119.

Figure 19:
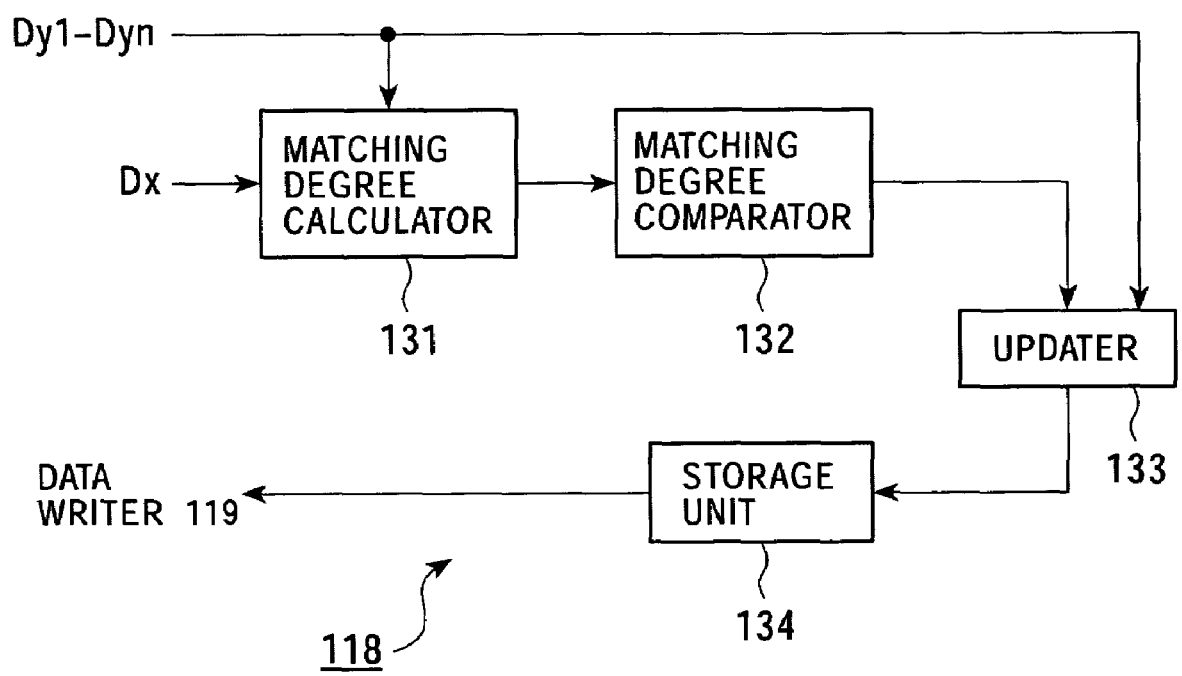
FIG. 19 is a block diagram showing an example of a construction of a compare-and-select unit shown in FIG. 18.

FIG. 19 is a block diagram showing an example of a construction of the compare-and-select unit 118 shown in FIG. 18.

A matching degree calculator 131 calculates the matching degree of each of occurrence count information Dy1 to Dyn with respect to the occurrence count information Dx. More specifically, the matching degree calculator 131 calculates the matching degree of each of the information Dy1 to Dyn with respect to the information Dx in terms of each item of the title, person's name and genre, calculates the sum of the matching degrees in terms of respective items for each of the information Dy1 to Dyn, and employs the resultant sum of each of the information Dy1 to Dyn as the matching degree thereof.

The matching degree is calculated by normalizing each occurrence count information with respect to maximum and minimum values of occurrence counts and then calculating the correlation. For example, in calculation of the matching degree in terms of genre, if normalized occurrence counts of respective entries K1, K2, K3, K4, and K5 are a1, a2, a3, a4, and a5 in the present occurrence count information and b1, b2, b3, b4, and b5 in other occurrence count information, then the matching degree calculator 131 calculates the matching degree in accordance with an equation $MCH = a1 \cdot b1 + a2 \cdot b2 + a3 \cdot b3 + a4 \cdot b4 + a5 \cdot b5$. The matching degree is calculated in a similar manner for the other items "title" and "person's name".

The matching degrees calculated by the matching degree calculator 131 are supplied one by one to the matching degree comparator (greatest matching degree memory) 132.

The matching degree comparator 132 stores the greatest matching degree of the supplied matching degrees. More specifically, at the beginning of the matching degree comparison process, the first one of the matching degrees calculated for occurrence count information Dy1 to Dyn is supplied to the matching degree comparator 132. The matching degree comparator 132 stores this first one of the matching degrees as the current greatest matching degree. If the second one of the matching degrees is supplied to the matching degree comparator 132, the matching degree comparator 132 compares it with the stored current greatest matching degree. If and only if the newly supplied matching degree is greater than the current greatest matching degree, the newly supplied matching degree is employed as a new greatest matching degree (that is, the current greatest matching degree is replaced with the newly supplied matching degree).

Thus, at the end of the comparison process, the matching degree stored in the matching degree comparator 132 is the greatest matching degree of all matching degrees of the occurrence count information Dy1 to Dyn.

Each time a newly supplied matching degree is regarded as a new greatest matching degree and stored in the matching degree comparator 132, an updater 133 stores occurrence count information corresponding to the new greatest matching degree into a storage unit 134.

Thus, at the end of the comparison process, occurrence count information having the greatest matching degree of all occurrence count information Dy1 to Dyn is stored in the storage unit 134, and this finally obtained occurrence count information (having the greatest matching degree) is written as the other occurrence count information into the board bay memory 31 via the data writer 119 (FIG. 18).

Now, referring to a flow chart shown in FIG. 20, a process performed by the controller 11 to make setting of automatic recording in the situation in which not only the occurrence count information Dx but also occurrence count information Dy acquired by the data acquisition apparatus 101 having the construction described above (from the occurrence count information stored in the other board bay memories) are stored in the board bay memory 31 is described below.

In step S131, it is determined whether it is a time to make setting of automatic recording. If it is not a time to make setting, the process waits in step S131 until it becomes a time to make setting. The automatic setting for recording (automatic recording setting process) may be started, for example, in response to a command issued by a user.

If the controller 11 determines in step S131 that it has become a time to make setting of automatic recording, the controller 11 advances the process to step S132. In step S132, the controller 11 extracts, via the playback controller 27, entries Tx in terms of the title, person's name and genre having greatest occurrence counts from the occurrence count information Dx stored in relation to the production number x in the board bay memory 31.

In step S133, the controller 11 further extracts entries Ty in terms of the title, person's name and genre, which are not included in the occurrence count information Dx processed in step S132 and which have greatest occurrence counts, from the occurrence count information Dy stored in the board bay memory 31.

Figure 21:
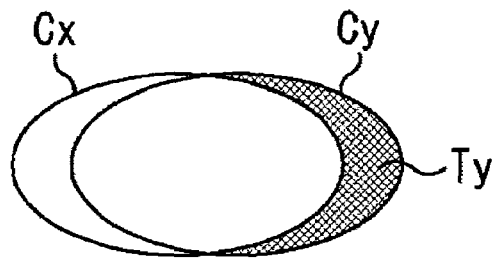
FIG. 21 is a diagram showing an example of a range in which programs are selected.

FIG. 21 shows an example of a range from which entries Ty are selected.

An ellipse Cx denotes a range of entries included in the occurrence count information Dx, and an ellipse Cy denotes a range of entries included in the occurrence count information Dy. Thus, entries Ty is extracted from a range (denoted by a shaded area) of entries included only in the occurrence count information Dy.

Referring again to FIG. 20, in step S134, the controller 11 retrieves programs which match the extracted entries Tx and Ty, respectively, from programs described in the EPG data stored on the HDD 32. For example, programs having supplemental information including all extracted entries in terms of the title, person's name and genre or programs having supplemental information including some of the extracted entries in terms of the title, person's name and genre are retrieved.

In step S135, the controller 11 writes information (broadcast time, channel number, and the like) associated with the programs retrieved in step S134 into the memory 11C.

Thus, programs are selected taking into account not only the occurrence count information stored in the board bay memory 31 but also the occurrence count information stored in the other board bay memory, and the selected broadcast programs are automatically set to be recorded in the programmed-recording mode.

Figure 20:
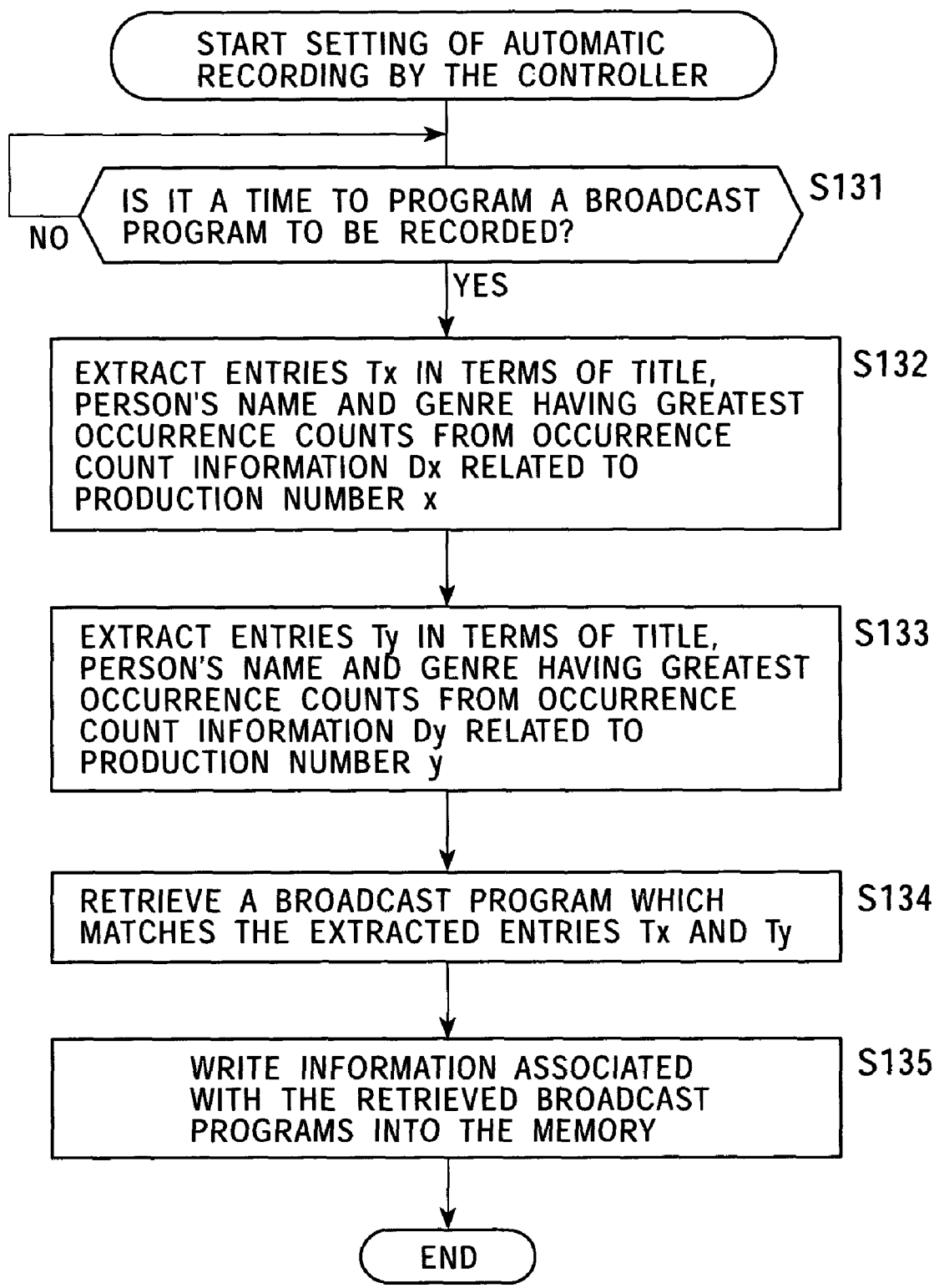
FIG. 20 is a flow chart showing a process performed by a controller to automatically make setting of recording.
Figure 22:
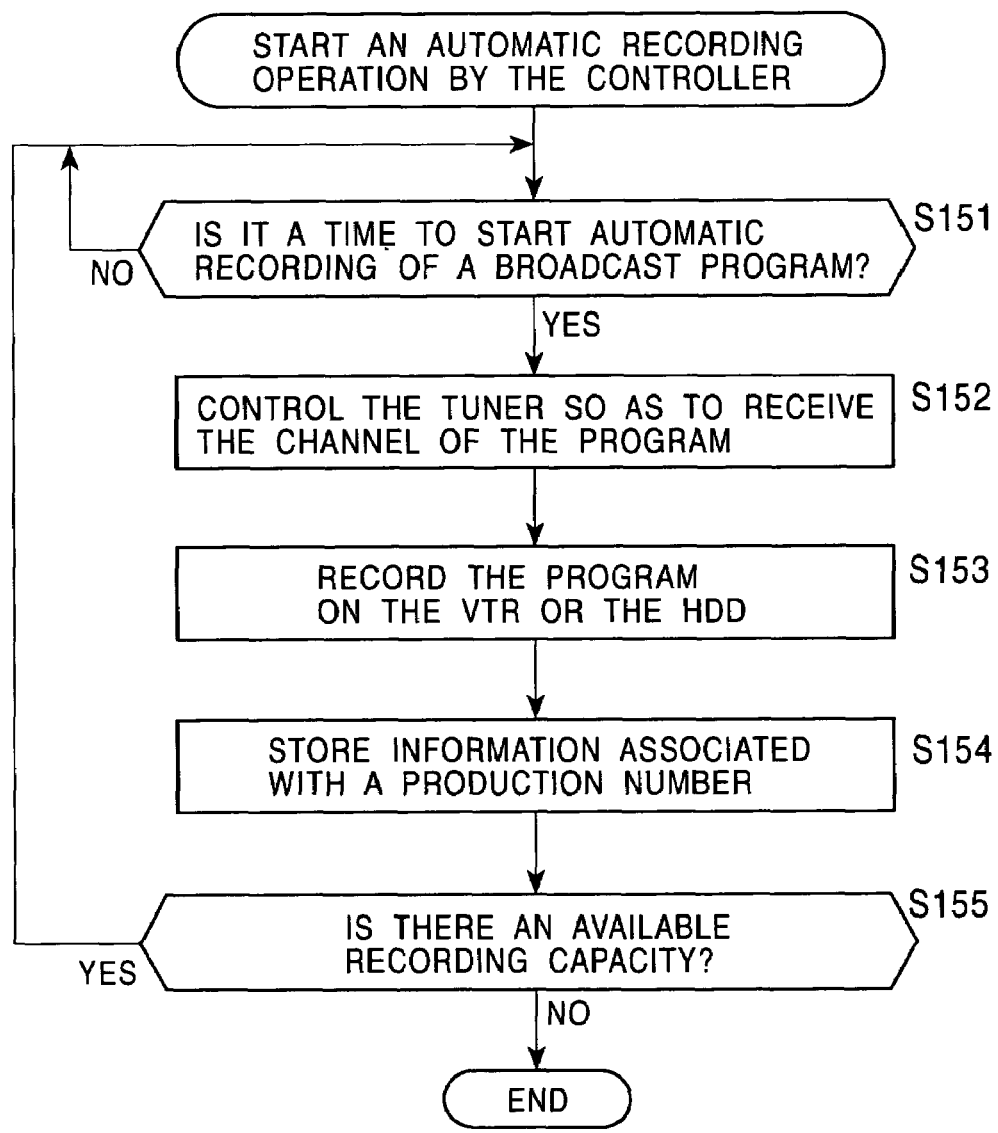
FIG. 22 is a flow chart showing an automatic recording process performed by the controller.

Referring to a flow chart shown in FIG. 22, a process performed by the controller 11 to record the program in accordance with the setting made in the process shown in FIG. 20 is described below.

In step S151, on the basis of the program information (indicating the broadcast start time and the channel number) written, in step S135 in FIG. 20, in the memory 11C, it is determined whether the broadcast start time of the program to be recorded is reached. If the broadcast start time is not reached, the process waits in step S151 until the broadcast start time is reached.

If the controller 11 determines in step S151 that the broadcast start time of the program is reached, the controller 11 advances the process to step S152. In step S152, the controller 11 controls the analog tuner 15 or the digital tuner 23 to receive the program on the specified channel to record it.

In the case in which an analog television broadcast wave is received, the controller 11 records, in step S153, the video signal of the program on the VTR 19 by controlling the recording controller 18. In the case in which a digital broadcast wave is received, the controller 11 records MPEG data of the program data on the HDD 32 by controlling the recording controller 26.

In step S154, the controller 11 stores identification information such as a production number in relation to the video signal or the MPEG data of the program. For example, if the recorded program is associated with an entry Tx, a production number x is stored in relation to the program information. On the other hand, if the recorded program is associated with an entry Ty, a production number y is stored in relation to the program information.

In step S155, it is determined whether the VTR 19 or the HDD 32 has a storage space available for further storing a program. If it is determined that the VTR 19 or the HDD 32 has an available storage space, the controller 11 returns the flow to step S151 to repeat the process described above. On the other hand, if the VTR 19 or the HDD 32 has no more available storage space, the process is ended.

Thus, as described above, a program which is very likely to be preferred by a user is automatically recorded without requiring the user to set the broadcast start time and the channel number on the basis of a program table or the like.

If a program recorded in relation to a production number y is viewed (played back) by the user, merging of occurrence count information stored in the board bay memory 31 is performed.

Figure 23:
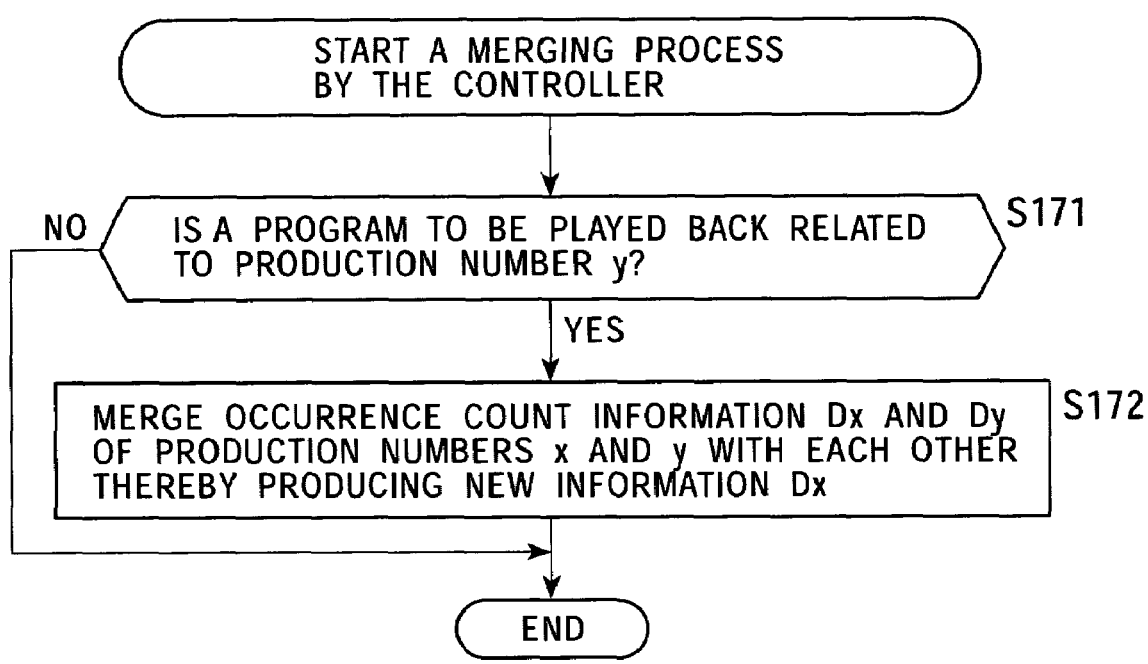
FIG. 23 is a flow chart showing a merging process performed by the controller.

Now, referring to a flow chart shown in FIG. 23, a process performed by the controller 11 to merge occurrence count information Dx and occurrence count information Dy in response to playback of a program is described below.

The controller 11 acquires information indicating the production number related to a program to be played back, via the playback controller 20 or 27. In step S171, the controller 11 determines whether the program to be played back is related to the production number y (that is, whether the program is recorded in relation to the production number Y).

If the controller 11 determines in step S171 that the program to be played back is not related to the production number y, the controller 11 terminates the merging process. On the other hand, if the controller 11 determines in step S171 that the program to be played back is related to the production number y, the controller 11 advances the process to step S172.

In step S172, the controller 11 controls the board bay memory 31 via the recording controller 26 so as to merge the occurrence count information Dx stored in relation to the production number x and the occurrence count information Dy stored in relation to the production number y. More specifically, the controller 11 calculates the sum of occurrence counts of occurrence count information Dx and Dy for each entry (thereby merging the occurrence count information) and writes the resultant occurrence count information as new occurrence count information Dx related to the production number x into the board bay memory 31.

As a result, the board bay memory 31 has only the occurrence count information Dx related to the production number x stored therein.

Merging of the occurrence count information Dx and the occurrence count information Dy is performed when a program related to the production number y is played back, because the fact that the program retrieved on the basis of the occurrence count information Dy has been played back indicates that the occurrence count information Dy obtained from the apparatus having production number y is useful for the television receiver 1 (having production number x) to retrieve a program. Note that programs related to the production number y are associated with entries Ty extracted from entries which are included in the occurrence count information Dy but are not included in the occurrence count information Dx.

By merging occurrence count information in the above-described manner when a program is played back, it becomes possible for the board bay memory 31 to have newest occurrence count information, thereby making it possible to perform the automatic recording process and the recommendation process in accordance with the newest information in which the user's preference is reflected.

Figure 24:
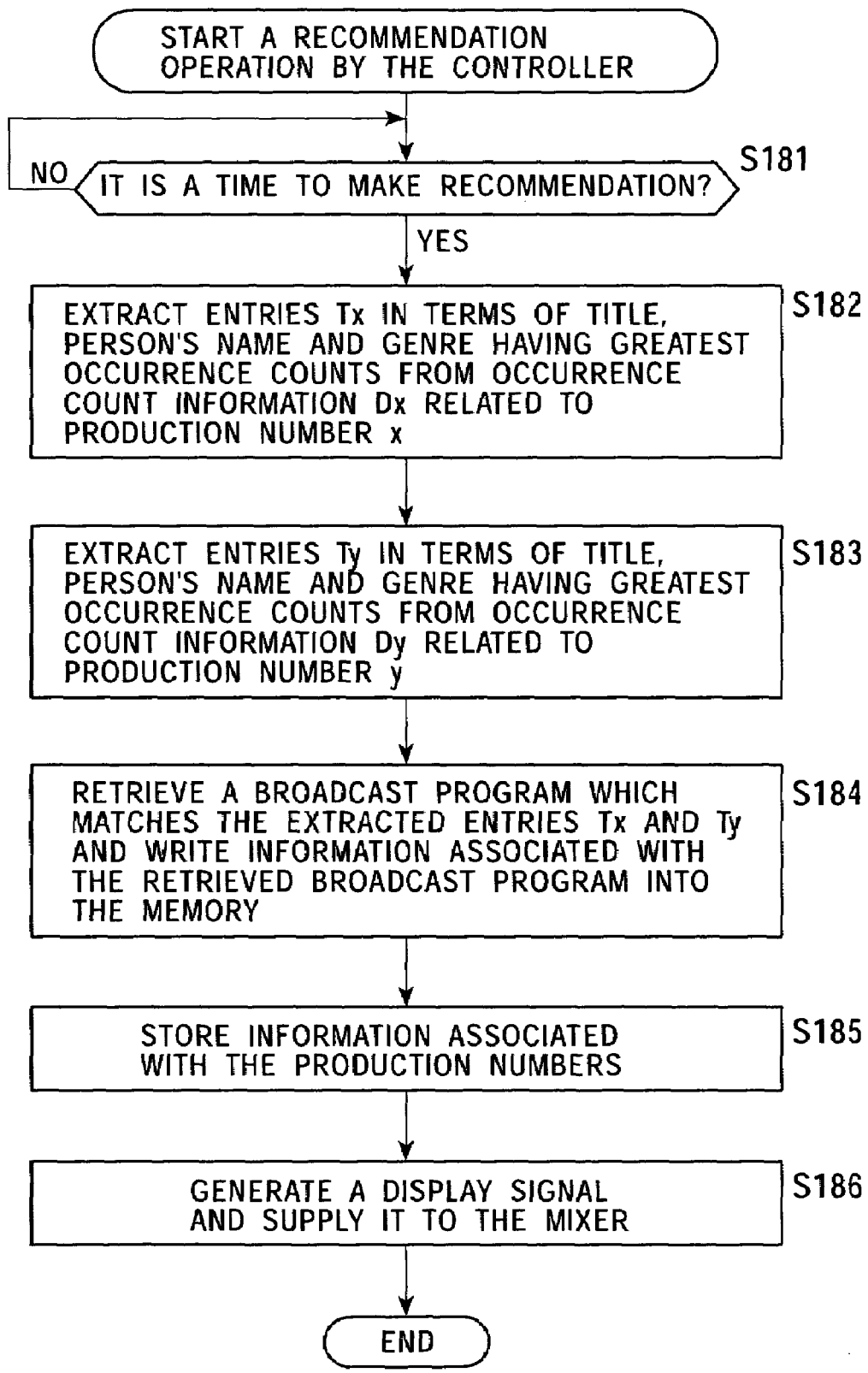
FIG. 24 is a flow chart showing an automatic recommendation process performed by the controller.

Referring to a flow chart shown in FIG. 24, a process performed by the controller 11 to recommend a program on the basis of the occurrence count information obtained via the merging process described above with reference to FIG. 23 is described below.

In step S181, the controller 11 determines whether it is a time to make a recommendation. If it is not a time to make a recommendation, the process waits in step S181 until it becomes a time to make a recommendation. For example, the program recommendation process is started in response to a command issued by a user.

If the controller 11 determines in step S181 that it has become a time to make a recommendation, the controller 11 advances the process to step S182. In step S182, the controller 11 extracts, via the playback controller 27, entries Tx in terms of the title, person's name and genre, respectively, having greatest occurrence counts from the occurrence count information Dx (obtained via the merging process) stored in relation to the production number x in the board bay memory 31.

In step S183, the controller 11 further extracts, from the occurrence count information Dy, entries Ty in terms of the title, person's name and genre, respectively, having greatest occurrence counts, which are not included in the entries Tx in terms of the title, person's name and genre extracted in step S182 from the occurrence count information Dx.

After the entries Tx and Ty are extracted, the controller 11 retrieves, in step S184, programs which match the extracted entries Tx and Ty, respectively, from programs described in the EPG data stored on the HDD 32, and the controller 11 stores information (such as that shown in FIG. 15) associated with the retrieved programs into the memory 11C.

When the controller 11 stores the information associated with a program into the memory 11C, the controller 11 stores, in step S185, identification information such as a production number in relation to the information associated with the program. For example, when a retrieved program matches an entry Tx, information associated with the program is stored in relation to the production number x into the memory 11C. On the other hand, if the retrieved program matches an entry Ty, information associated with the program is stored in relation to the production number y into to the memory 11C.

In step S186, the controller 11 generates a display signal SCH for displaying information associated with the retrieved program and supplies it to the mixer 22 or 29 via the playback controller 27. In accordance with the supplied display signal SCH, the display such as a CRT or an LCD displays a screen to present information about recommended programs to a user.

The user may select a program from recommended programs displayed on the screen and may specify the selected program to be recorded in the programmed-recording mode.

Instead of extracting a program to be recommended on the basis of only one entry having a greatest occurrence count, the extraction may be performed on the basis of a predetermined number of entries in the order of decreasing occurrence count starting from the greatest occurrence count.

In the television receiver 1 shown in FIG. 1, if a program related to the production number y is selected from recommended programs as a program to be automatically recorded, merging of the occurrence count information Dx and occurrence count information Dy is performed.

Figure 25:
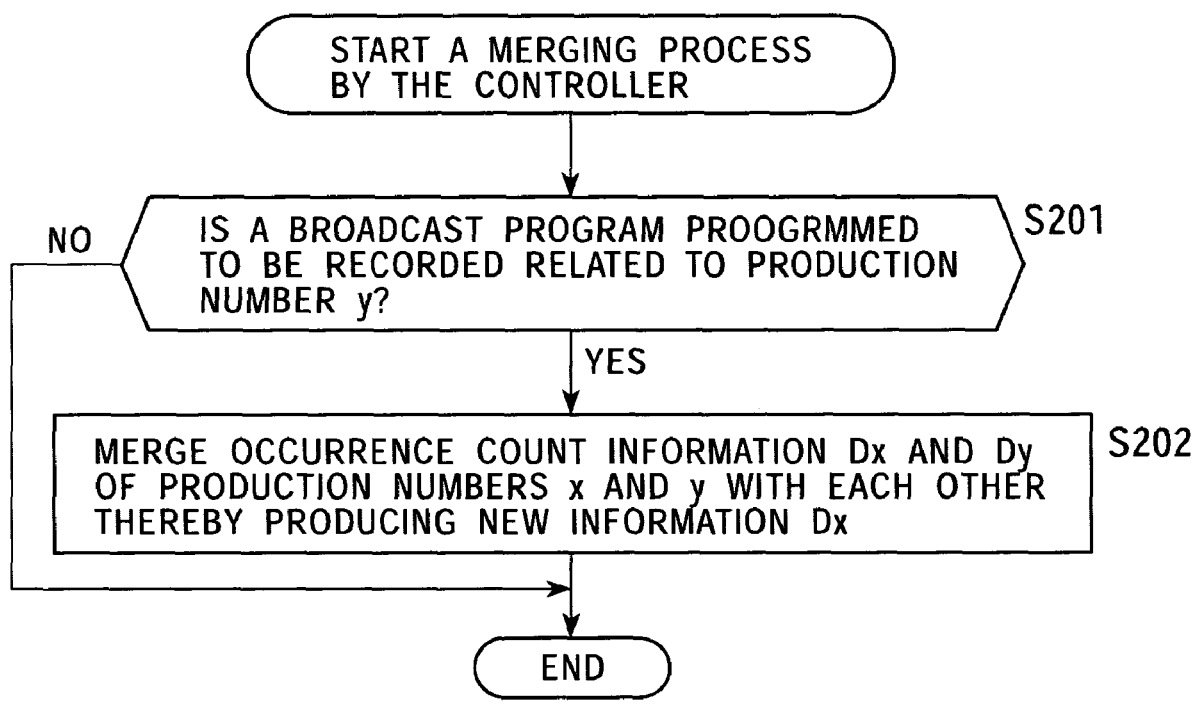
FIG. 25 is a flow chart showing a merging process performed by the controller.

Referring to a flow chart shown in FIG. 25, a process performed by the controller 11 to merge occurrence count information in response to setting of automatic recording is described below.

In step S201, the controller 11 determines whether a program set to be automatically recorded is related to the production number y. If it is determined that the program is not related to the production number y, the process is terminated.

If the controller 11 determines in step S201 that the program set to be automatically recorded is related to the production number y, the controller 11 advances the process to step S202. In step S202, the controller 11 controls the board bay memory 31 via the recording controller 26 so as to add together occurrence counts of occurrence count information Dx and Dy for each entry (thereby merging the occurrence count information), and the controller 11 writes the resultant occurrence count information as new occurrence count information Dx into the board bay memory 31.

As a result, the board bay memory 31 has only the occurrence count information Dx related to the production number x stored therein.

Merging of occurrence count information is performed when a program related to the production number y is selected as a program to be automatically recorded, because the fact that the program retrieved on the basis of the occurrence count information Dy is determined to be recorded indicates that the occurrence count information Dy obtained from the apparatus having production number y is useful for the television receiver 1 (having production number x) to retrieve a program. That is, because programs related to the production number y are associated with entries Ty extracted from entries which are included in the occurrence count information Dy but are not included in the occurrence count information Dx, the merging of occurrence count information is useful.

By merging occurrence count information in the above-described manner when a program is specified to be automatically recorded, as in the case in which merging is performed when a program is played back, it becomes possible for the board bay memory 31 to have newest occurrence count information, thereby making it possible to perform setting of automatic recording or make a recommendation of a program in accordance with the newest information in which the user's preference is reflected.

Although in the embodiment described above, merging of information is performed when setting of programmed recording is performed, merging of information may also be performed when a program is set to be automatically received (viewed).

Furthermore, although in the embodiment described above, recommendation of a program or setting of automatic recording is performed on the basis of occurrence count information in terms of title, person's name and genre of programs, recommendation of a program or setting of automatic recording may be performed on the basis of information in terms of another item of programs such as channel number, broadcast start time, or theme song. A user may specify a particular item or entry as information on the basis of which a program to be recommended or automatically recorded is selected.

In the embodiment described above, selection of a program to be recorded or recommended is performed on the television receiver 1. Alternatively, selection may be performed on a remote controller for controlling the television receiver 1, and the television receiver 1 may record the selected program in accordance with a command issued by the remote controller. In this case, the processes described above, such as acquisition of occurrence count information and selection of a program on the basis of the occurrence count information, are performed on the remote controller.

In addition to selection of a program, an environment may be automatically optimized (that is, setting of the television receive may be automatically optimized) for each user of the television set under the control of the remote controller on the basis of the operation history or other information set by each user.

More specifically, when a commercial break occurs in the middle of a broadcast program, if the channel is quickly switched many times (that is, if zapping is performed), information indicating that zapping was performed is described in the operation history. When the television set is being used by a user who tends to perform zapping to know what kinds of programs are being broadcast on other channels, a screen for prompting the user to determine whether to perform zapping is displayed on the basis of the stored operation history when a predetermined timing condition is met thereby allowing the user to easily perform zapping simply by responding to the displayed screen.

When the television set is being used by a user who tends to reduce the volume during commercial breaks, a screen for prompting the user to determine whether to reduce the volume is displayed each time a commercial break starts, thereby allowing the user to easily reduce the volume only during the commercial breaks simply by responding to the screen.

As described above, a screen is displayed to prompt a user to select whether to operate the television set thereby allowing the user to easily operate the television set simply by responding to the screen without having to directly operating the television set, and thus providing an optimal viewing environment.

When a single television set is used by a plurality of users (such as family members), each user can easily change a setting optimized for another user to a setting optimized for him/her without having to make setting by operating the remote controller.

Figure 26:
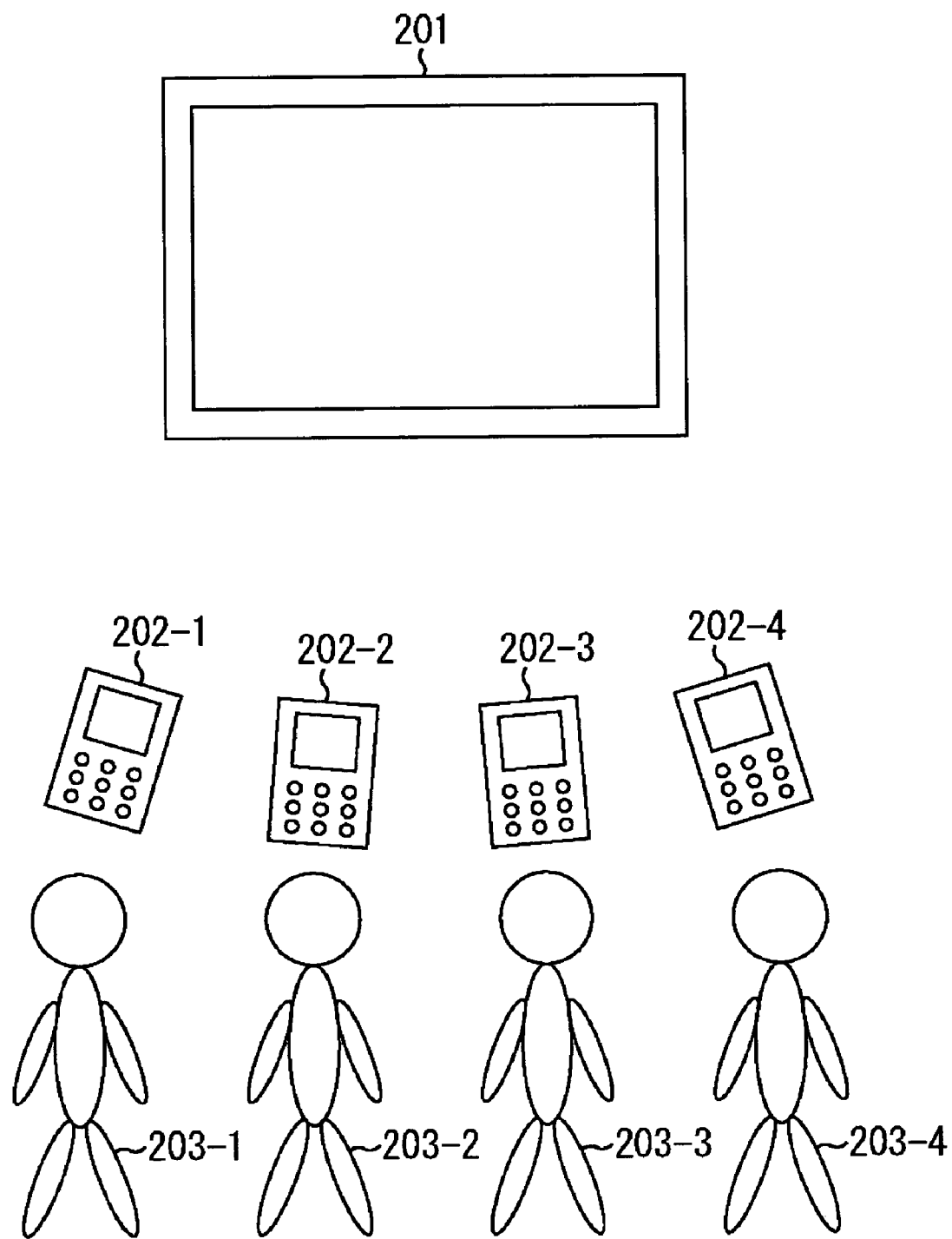
FIG. 26 is a block diagram showing an example of a construction of a control system according to the present invention.

FIG. 26 is a diagram showing an example of a construction of a control system according to the present invention, which allows each user to easily change the setting of the television set without requiring the user to perform a setting operation.

The television set 201 includes a television receiver such as the television receiver 1 shown in FIG. 1. An image is displayed on the screen of the television set 201 in accordance with a video signal output from the mixer 22 or 29 of the television receiver. The television receiver 1 may be disposed in the outside of the television set 201 and the television receiver 1 may be connected to the television set 201 via a cable.

Remote controllers 202-1 to 202-4 are used by respective users 203-1 to 203-4. In response to an operation performed by a user, each remote controller emits an infrared ray carrying a corresponding command to control the television set. In the following description, a generic expression "remote controller 202" is used unless it is needed to specify a particular one of remote controllers 202-1 to 202-4.

Each remote controller 202 (201-1 to 202-4) has the capability of controlling the television set 201 in accordance with user's operation history or setting of a routine operation (set to be performed when a predetermined timing condition is met). For example, when a commercial message is started, the remote controller 202 controls the television set 201 in accordance with setting made by a user so as to, for example, switch channels sequentially at short intervals or turn down the volume.

Figure 27:
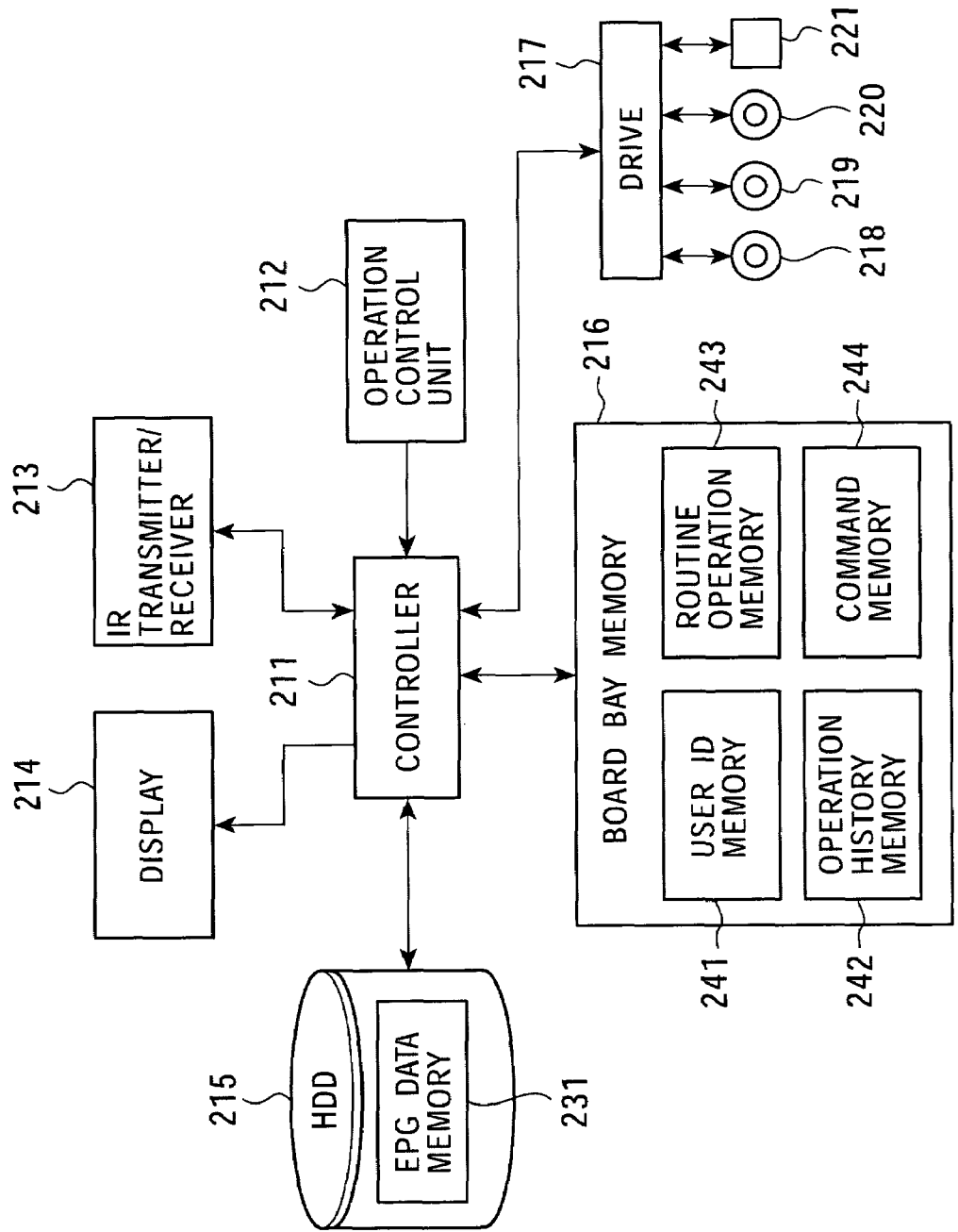
FIG. 27 is a block diagram showing an example of a construction of a remote controller shown in FIG. 26.

FIG. 27 is a block diagram showing an example of a construction of a remote controller 202.

A controller 211 controls the whole operation of the remote controller 202 in accordance with a preinstalled control program. For example, when a command is issued by a user by operating an operation control unit 212, the controller 211 controls an IR transmitter/receiver 213 so as to output an infrared ray carrying the command to the television set 201. The infrared ray emitted from the remote controller 202 (IR transmitter/receiver 213) is received by the IR transmitter/receiver 12B of the television set 201 (television receiver 1).

The operation control unit 212 includes ten numeric keys and four arrow keys. When one of the ten numeric keys or four arrow keys is operated by the user, the operation control unit 212 outputs a signal corresponding to the operated key to the controller 211. The IR transmitter/receiver 213 is responsible for communication with the television set 201 via the infrared ray. For example, the IR transmitter/receiver 12B of the television set 201 transmits EPG data at predetermined constant intervals. If the IR transmitter/receiver 213 receives the EPG data transmitted from the television set 201, the IR transmitter/receiver 213 transfers the received EPG data to the controller 211. The EPG data supplied to the controller 211 is stored in an EPG data storage area 231 of an HDD 215.

A display 214 is formed of an LCD or the like and serves to display, for example, a screen for setting a routine operation under the control of the controller 211.

The HDD 215 stores various kinds of information. For example, EPG data supplied from the controller 211 is stored in the EPG data storage area 231 of the HDD 215. A board bay memory 216 is formed so as to be removable from the remote controller 202. The board bay memory 216 includes a user ID storage area 241 for storing a user ID set by a user of the remote controller 202, an operation history storage area 242 for storing information associated with history of operations performed by the user, a routine operation storage area 243 for storing the setting associated with routine operations, and a command storage area 244 for storing commands for controlling the television set 201.

As required, a drive 217 is connected to the remote controller 202. A storage medium such as a magnetic disk 218, an optical disk 219, a magnetooptical disk 220, or a semiconductor memory 221 is mounted on the drive 217, and a computer program is read from the storage medium and installed into the HDD 215.

The operation of the control system shown in FIG. 26 is described below with reference to flow charts.

Figure 28:
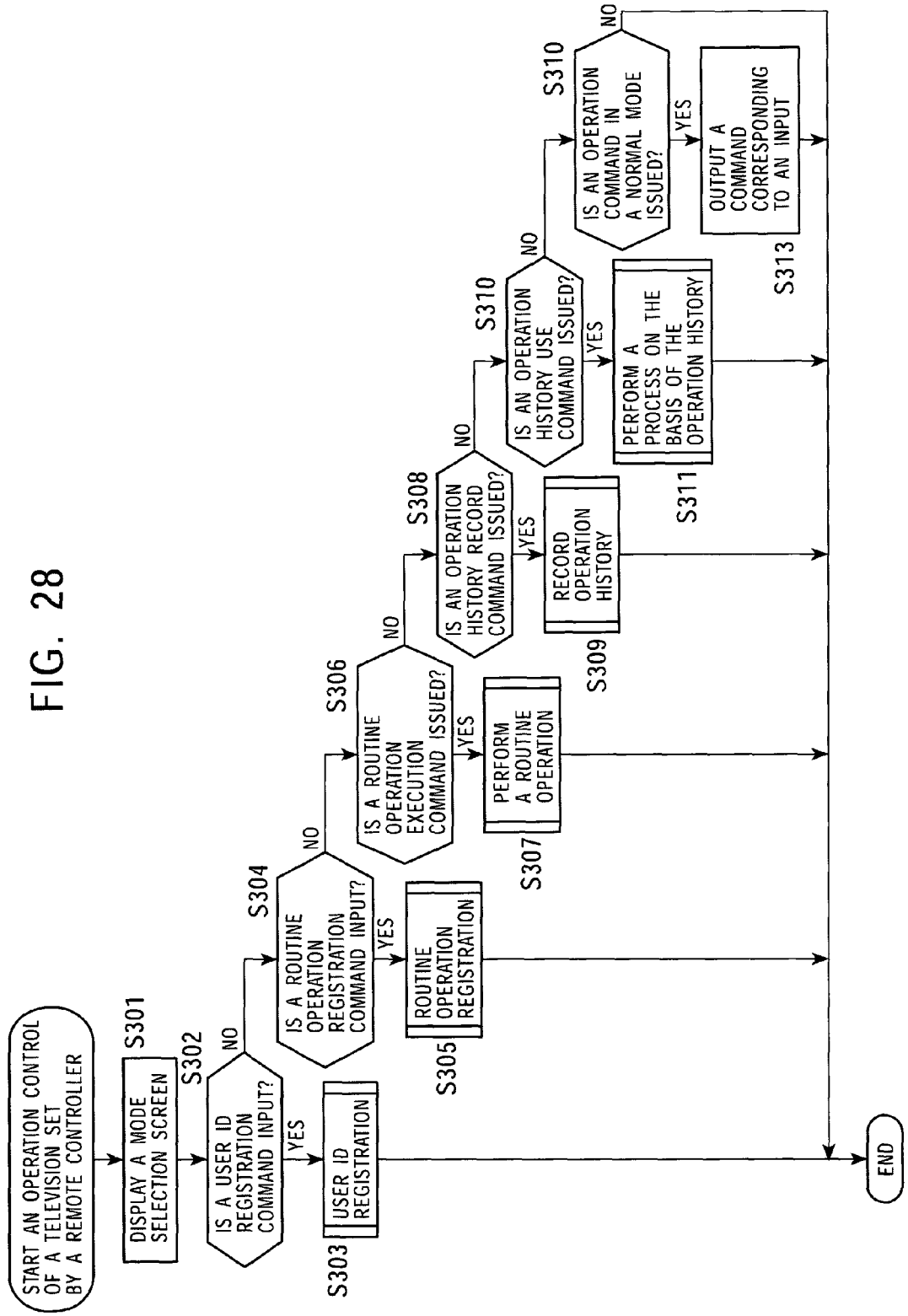
FIG. 28 is a flow chart showing a control process performed by a controller shown in FIG. 27.

First, referring to a flow chart shown in FIG. 28, the general operation of the remote controller 202 (controller 211) performed to control the television set 201 is described.

For example, when the power is turned on, the controller 211 displays, in step S301, a mode selection screen on the display 214. On this screen, one of operation modes of the remote controller 202 can be selected.

Figure 29:
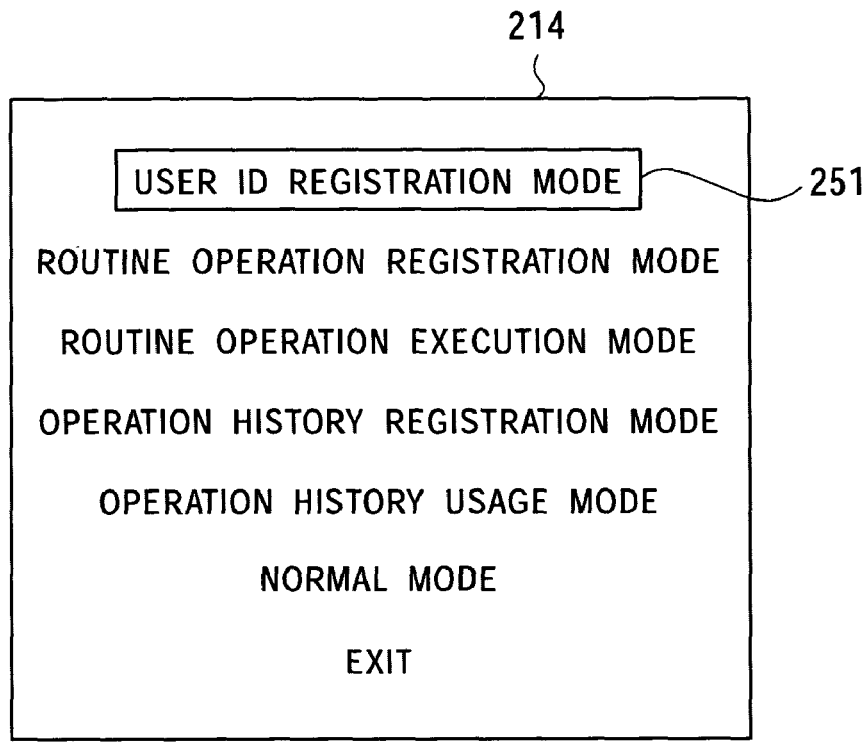
FIG. 29 is a diagram showing an example of a screen displayed in step S301 shown in FIG. 28.

FIG. 29 is a diagram showing an example of a mode selection screen displayed on the display 214.

As shown in FIG. 29, the remote controller 202 has, for example, a "user ID registration mode" used to register a user ID, a "routine operation registration mode" used to register a routine operation, a "routine operation execution mode" used to execute a registered routine operation, an "operation history registration mode" used to register an operation history, and an "operation history usage mode" in which an operation is performed on the basis of registered operation history.

The remote controller 202 also has a normal mode in which the remote controller 202 functions as a usual remote controller (for controlling the television set 201 by emitting an infrared ray in response to an input given by a user).

The user can select a desired mode by moving a cursor 251 displayed on the mode selection screen by operating the operation control unit 212.

If an "exit" button on the bottom of the mode selection screen is selected using the cursor 251, the mode selection is ended.

Referring again to FIG. 28, in step S302, the controller 211 determines whether a user ID registration command is issued, that is, whether the "user ID registration mode" is selected on the screen shown in FIG. 29. If it is determined that the "user ID registration mode" is selected, the process proceeds to step S303 to execute the user ID registration process.

A registered user ID is used to authenticate a user who uses the remote controller 202 or to identify a user when a single remote controller 202 is used by a plurality of users. The user ID registration process performed in step S303 will be described in detail later with reference to a flow chart shown in FIG. 30.

In the case in which it is determined in step S302 that the user ID registration mode is not selected, the process proceeds to step S304. In step S304, the controller 211 determines whether a routine operation registration process is selected, that is, whether the "routine operation registration mode" is selected on the screen shown in FIG. 29.

If it is determined in step S304 that the routine operation registration mode is selected, the controller 211 advances the process to step S305. In step S305, the controller 211 registers a content of a routine operation and a timing of executing the routine operation in accordance with an input given by the user.

For example, if turning down of the volume is selected as a routine operation and the start of a commercial message is selected as the timing of executing the turning down of the volume, then, in the operation in the "routine operation execution mode", a turn-down command is transmitted from the remote controller 202 in response to starting of a commercial message without requiring an operation by the user, and the volume of the television set 201 is turned down.

The details of the routine operation registration performed in step S305 will be described later with reference to a flow chart shown in FIG. 31.

If it is determined in step S304 that the routine operation registration mode is not selected, the controller 211 advances the process to step S306. In step S306, the controller 211 determines whether execution of a routine operation is selected, that is, whether the "routine operation execution mode" is selected on the selection screen shown in FIG. 29.

If the controller 211 determines in step S306 that the routine operation execution mode is selected, the controller 211 advances the process to step S307. In step S307, the controller 211 executes a routine operation at a specified timing in accordance with information associated with the setting of the routine operation. The details of the routine operation execution in step S307 will be described later with reference to a flow chart shown in FIG. 34.

If the controller 211 determines in step S306 that the routine operation execution mode is not selected, the controller 211 advances the process to step S308. In step S308, the controller 211 determines whether registration of operation history is selected, that is, whether the "operation history registration mode" is selected on the mode selection screen.

If it is determined that the operation history registration mode is selected, the controller 211 advances the process to step S309. In step S309, the controller 211 registers a content of an operation performed by the user and the timing of the operation as the operation history.

More specifically, for example, each time a user switches the channel, information indicating the time at which the channel is switched, information associated with a program broadcast on the channel, and information indicating the setting of the television set 201, such as the volume level and/or the brightness level employed in viewing the program, are stored. The stored information is used when the television set 201 is operated in the "operation history usage mode". The details of the operation history registration in step S309 will be described later with reference to a flow chart shown in FIG. 36.

If it is determined in step S308 that the operation history registration mode is not selected, the controller 211 advances the process to step S310. In step S310, the controller 211 determines whether usage of the operation history (operation in accordance with the operation history) is selected, that is, whether the "operation history usage mode" is selected on the mode selection screen.

If the controller 211 determines that the operation history usage mode is selected, the controller 211 advances the process to step S311. In step S311, the controller 211 controls the television set 201 in accordance with the operation history.

For example, when the television set 201 is used in the "operation history usage mode" by a user who has registered operation history including information indicating that zapping was performed during a commercial break, if a commercial break occurs, a selection screen is displayed to prompt the user to select whether to perform zapping. The user can easily perform zapping simply by responding to the screen. The details of the process performed by the controller 211 in step S311 will be described later with reference to a flow chart shown in FIG. 37.

On the other hand if it is determined in step S310 that the operation history usage mode is not selected, the controller 211 advances the process to step S312. In step S312, the controller 211 determines whether an operation in the "normal mode" is selected. If it is determined in step S312 that the operation in the normal mode is selected, the controller 211 advances the process to step S313. In step S313, the controller 211 output a command in response to an input given by the user thereby controlling the television set 201.

For example, if the user presses a button to switch the channel, the controller 211 reads a corresponding command from the command storage area 244 and transmits an infrared ray carrying the command from the IR transmitter/receiver 213.

If the controller 211 determines in step S312 that the operation in the "normal mode" is not selected, the controller 211 determines that a mode selection end command is issued (that is, the "exit" button is selected with the cursor 251), and the controller 211 ends the mode selection process. After completion of any one of steps S303, S305, S307, S309, S311, and S313, the controller 211 ends the mode selection process.

Figure 30:
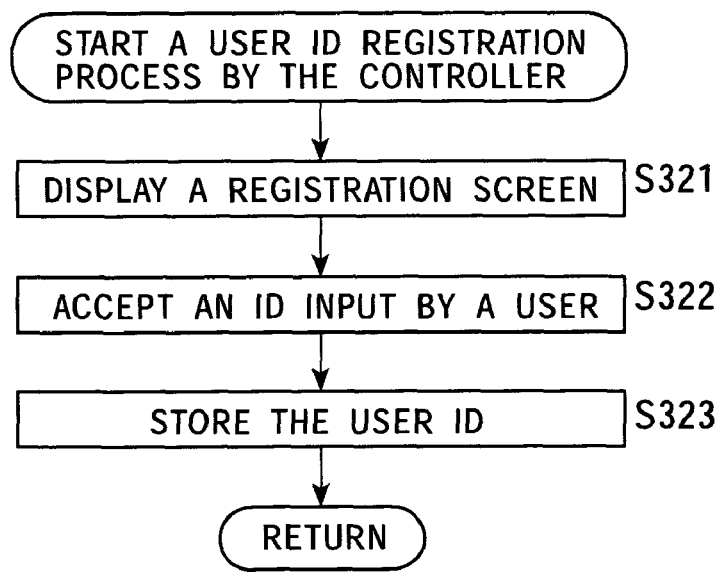
FIG. 30 is a flow chart showing the details of a user ID registration process performed in step S303 shown in FIG. 28.

Referring to a flow chart shown in FIG. 30, the details of the user ID registration process in step S303 in FIG. 28 are described below.

If the user selects the user ID registration mode on the mode selection screen, the controller 211 displays, in step S321, a registration screen on the display 214 to allow the user to input a user ID (identification information) consisting of a predetermined number of alphanumeric characters.

The user inputs the predetermined number of alphanumeric characters into an input field on the registration screen by operating the operation control unit 212. In the case in which a plurality of users use a single remote controller 202, each user inputs his/her own unique user ID.

If a user ID is input by the user, the controller 211 accepts, in step S322, the input user ID. In step S323, the controller 211 stores the input user ID into the user ID storage area 241 in the board bay memory 216. Various kinds of information such as information associated with the operation history and information associated with the routine operations are stored in relation to the user ID set by the user.

Although in the embodiment described above, only the user ID is registered, a password may be registered in addition to the user ID.

Referring to a flow chart shown in FIG. 31, the details of the routine operation registration process in step S305 in FIG. 28 are described below.

In step S331, the controller 211 displays a user ID input screen on the display 214. In step S332, the controller 211 acquires a user ID input by a user (that is, the controller 211 acquires the user ID from the output from the operation control unit 212).

In step S333, the controller 211 determines whether the user ID is valid by checking whether the user ID input by the user is identical to that stored in the user ID storage area 241. If the controller 211 determines that the user ID is invalid, the controller 211 advances the process to step S334 to perform an error handling process. In the error handling process in step S334, for example, a message is displayed on the display 214 to inform the user that registration of a routine operation is not allowed.

On the other hand, if the controller 211 determines in step S333 that the input user ID is valid, the controller 211 advances the process to step S335. In step S335, the controller 211 displays a timing selection screen for allowing the user to specify the timing of performing a routine operation.

FIG. 32 is a diagram showing an example of the timing selection screen displayed in step S335 on the display 214.

In the example of the timing selection screen shown in FIG. 32, a message "select a timing of performing a routine operation" is displayed at the top of the screen, and, below that message, "date/time" is displayed as a first choice. Below that, a second choice "in commercial breaks", and a third choice "in a specific genre" are displayed.

The user selects a timing of executing a routine operation by moving a cursor 261 by operating the operation control unit 212. When the first choice "date/time" is selected, the user can further specify a desired date/time at which the routine operation is to be executed. When the second choice "in commercial breaks" is selected, a routine operation, which will be selected later, is set to be executed in commercial breaks.

When the third choice "in a specific genre" is selected, the user can further specify a genre of programs so that a specified routine operation is to be executed when a program of the specified genre is broadcast.

In addition to the timings described above, the choices may include other timings, such as when the power is turned on, when the power is turned off, when the channel is switched to a particular channel, or when a particular period has elapsed without performing any operation.

In step S336, the controller 211 accepts the routine operation execution timing selected on the screen shown in FIG. 32.

After completion of setting the routine operation execution timing, in step S337, the controller 211 displays a routine operation selection screen on the display 214 (to allow the user to specify an operation of controlling the television set 201).

FIG. 33 is a diagram showing an example of the routine operation selection screen displayed in step S337.

In the example of the selection screen shown in FIG. 33, a message "select a routine operation" is displayed at the top of the screen. Below this message, a first choice "switch the channel" is displayed. Furthermore, a second choice "turn on or off the power", and a third choice "zap" are displayed.

The user selects a routine operation to be executed when a timing condition selected on the screen shown in FIG. 32 is met, by moving cursor 271 by operating the operation control unit 212.

For example, when the first choice "switch the channel" is selected, the user can further specify a channel number to which the channel is to be switched. When the second choice "turn on or off the power" is selected, the power of the television set 201 is set to be turned on or off when the timing condition selected above is met.

When the third choice "zap" is selected, the user can further specify the order in which the channel is to be zapped. For example, the order may be specified as "channel 1", "channel 3", and then "channel 5".

In addition to the routine operations described above, the choices may include other routine operations such as volume adjustment, brightness adjustment, starting of recording, and skipping of a program.

In step S338, the controller 211 accepts the routine operation selected on the selection screen shown in FIG. 33. In step S339, the controller 211 stores information indicating the specified routine operation together with information indicating the timing of executing the routine operation and the user ID into the routine operation storage area 243.

For example, in the case in which 20:00 to 21:00 every Friday" is selected as the routine operation execution timing on the selection screen shown in FIG. 32, and "switch the channel to channel 8" is specified as the routine operation on the selection screen shown in FIG. 33, information (routine operation information) indicating the above selections is stored in relation to the user ID in the routine operation storage area 243.

In the case in which "in commercial breaks" is selected as the routine operation execution timing, and "zap the channel in the order of channels 1, 3, 4, and 6" is selected as the routine operation, information indicating the above selections is stored in relation to the user ID in the routine operation storage area 243.

In accordance with the stored routine operation information, the specified routine operation is executed when the specified timing condition is met.

Referring to a flow chart shown in FIG. 34, the details of the routine operation execution process in step S307 in FIG. 28 are described below.

This process is performed when the "routine operation execution mode" is selected on the selection screen shown in FIG. 29.

Figure 31:
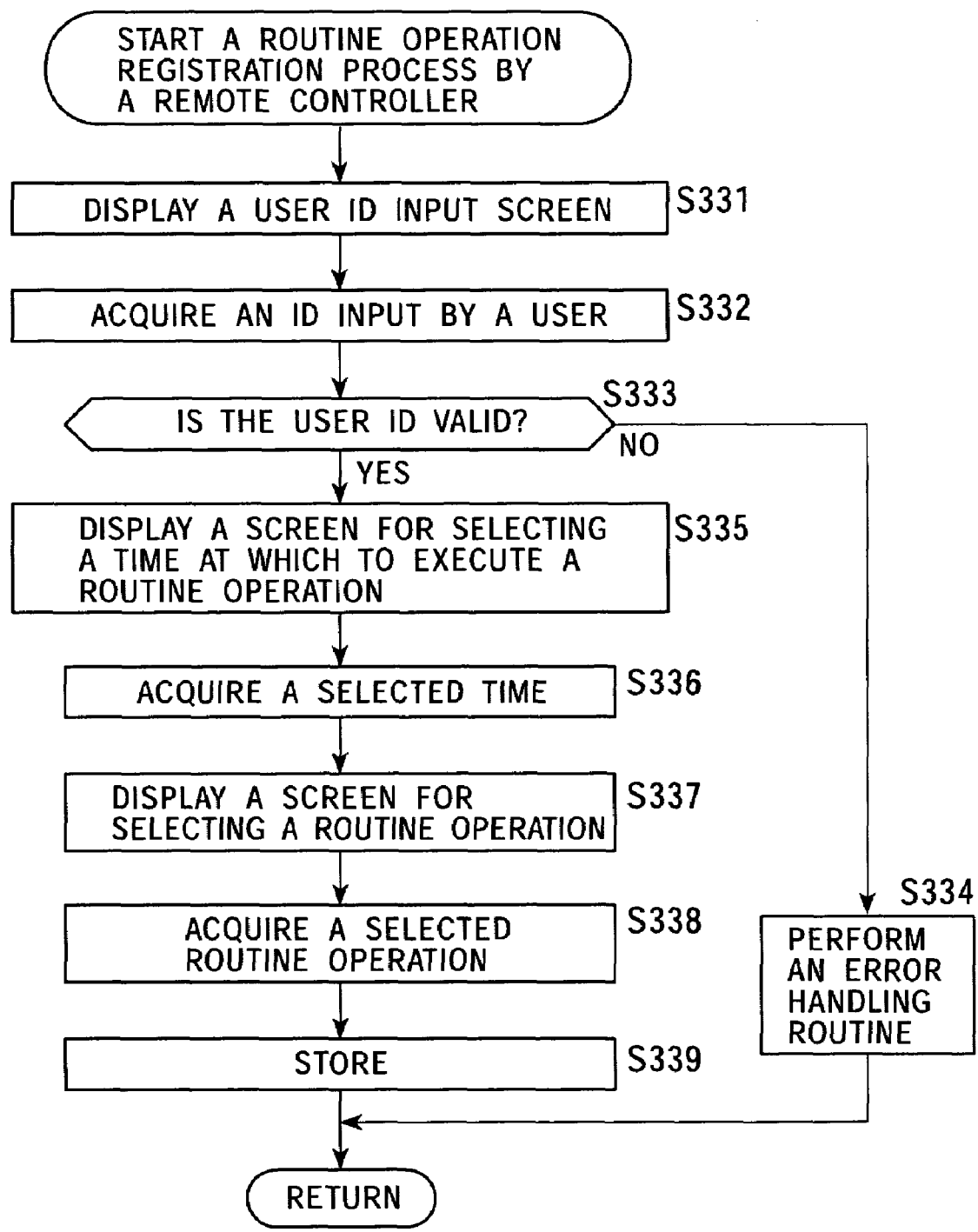
FIG. 31 is a flow chart showing the details of a routine operation registration process performed in step S305 shown in FIG. 28.

Steps S351 to 354 are similar to steps S331 to S334 shown in FIG. 31. That is, in step S351, the user ID input screen is displayed. In step S352, the controller 211 acquires a user ID input by a user. In step S353, the controller 211 determines whether the input user ID is valid. If the input user ID is valid, the process proceeds to step S355.

In step S355, the controller 211 reads routine operation information related to the input user ID from the routine operation storage area 243. In step S356, the controller 211 displays a routine operation selection screen on the display 214 in accordance with the routine operation information.

Figure 35:
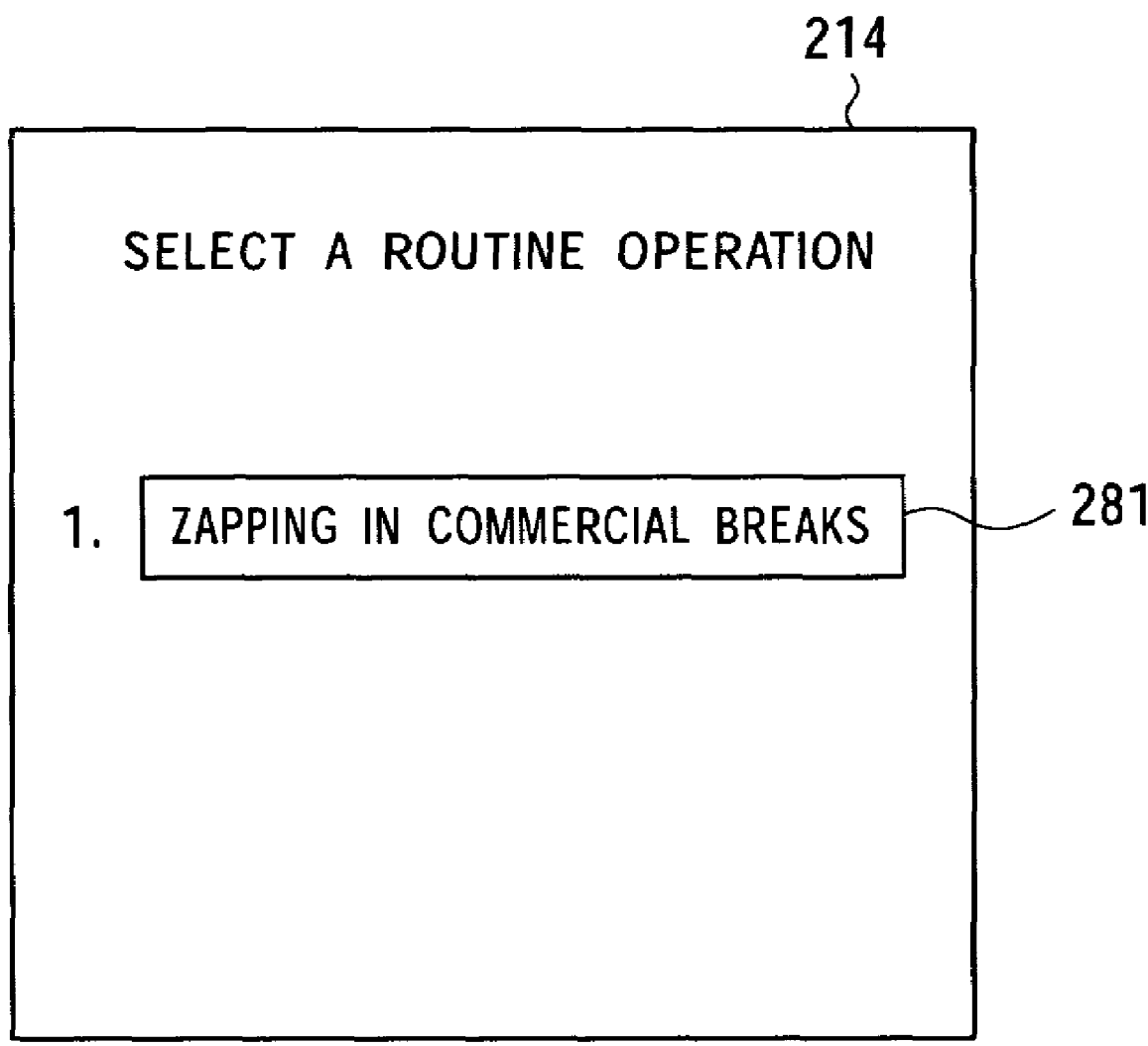
FIG. 35 is a diagram showing an example of a screen displayed in step S356 shown in FIG. 34.

FIG. 35 is a diagram showing an example of the selection screen displayed on the display 214 in step S356.

In the example of the selection screen shown in FIG. 35, a message "select a routine operation" is displayed at the top of the screen. Below this message, "zap in commercial breaks" is displayed. That is, in this specific example, in the registration process shown in FIG. 31, "in commercial breaks" was selected as the routine operation execution timing, and "zap" was selected as the routine operation.

If the user selects the routine operation by moving a cursor 281 on the selection screen shown in FIG. 35, the routine operation is executed when the registered timing condition is met.

That is, when a television program is viewed after "zap in commercial breaks" is selected on the screen shown in FIG. 35, if a commercial break occurs in the middle of the television program, zapping is automatically performed. In zapping, the channel is switched in the order specified in the registration process shown in FIG. 31.

In the case in which a plurality of routine operations are registered in relation to the same user ID, the plurality of routine operations are displayed on the selection screen.

Referring again to FIG. 34, in step S357, the controller 211 accepts the selection of the routine operation performed by the user on the selection screen displayed in step S356.

In step S358, the controller 211 determines whether it is a time to execute the routine operation selected by the user. If it is not a time to execute the routine operation, the controller 211 advances the process to step S359. In step S359, in accordance with an input given by the user via the operation control unit 212, the controller 211 outputs a command such as a channel switch command or a volume adjustment command to the television set 201 via an infrared ray. That is, after the user selects a routine operation, the user switches the channel by operating the remote controller 202 to view a desired broadcast program.

In step S361, the controller 211 determines whether the routine operation end command is issued. If the routine operation end command is not issued, the controller 211 returns the flow to step S358 to repeat step S358 and following steps.

If the controller 211 determines in step S358 that it is a time to execute the routine operation specified by the user, the controller 211 advances the process to step S360 to execute the routine operation.

For example, if, as in the previous example, "switch the channel to channel 8" is selected as the routine operation, and "20:00 to 21:00 every Friday" is selected as the timing of executing the routine operation, the controller 211 reads a command to switch the channel to channel 8 from the command storage area 244 at 20:00 on Friday and the controller 211 emits an infrared ray carrying the command from the IR transmitter/receiver 213.

By setting a particular routine operation to be executed at a particular time as described above, the user can view a desired program which starts at the particular time without failing to view the program.

If "zap the channel in the order of channels 1, 3, 4, and 6" is set to be executed "in commercial breaks", then a command is transmitted at predetermined intervals from the IR transmitter/receiver 213 to the television set 201 so that the channel is switched in the specified order when a commercial break occurs in the middle of a broadcast program.

Thus, only by registering the routine operation, the channel zapping is performed in the specified order each time a commercial break occurs, without requiring the user to operate the remote controller 202 to switch the channel.

After completion of executing the routine operation in step S360, the process proceeds to step S361. In step S361, it is determined whether the routine operation execution mode is cancelled, for example, as a result of selecting another mode. If the routine operation execution mode is cancelled, the process is ended.

As described above, by previously registering routine operations which are performed frequently or an operation of changing the setting of the television set 201 in accordance with the user's preference, it makes possible for the user to view a program under optimum conditions without having to perform a particular operation many times on the remote controller 202.

For example, if the volume and the brightness are set to be at specified levels when the power is turned on, the volume and the brightness are set to the specified levels when the power is turned on even if a previous user has changed the volume and/or the brightness of the television set 201. That is, in the case in which a single television set 201 is used by a plurality of users, each user can use the television set 201 in an environment optimized depending on the user.

Figure 36:
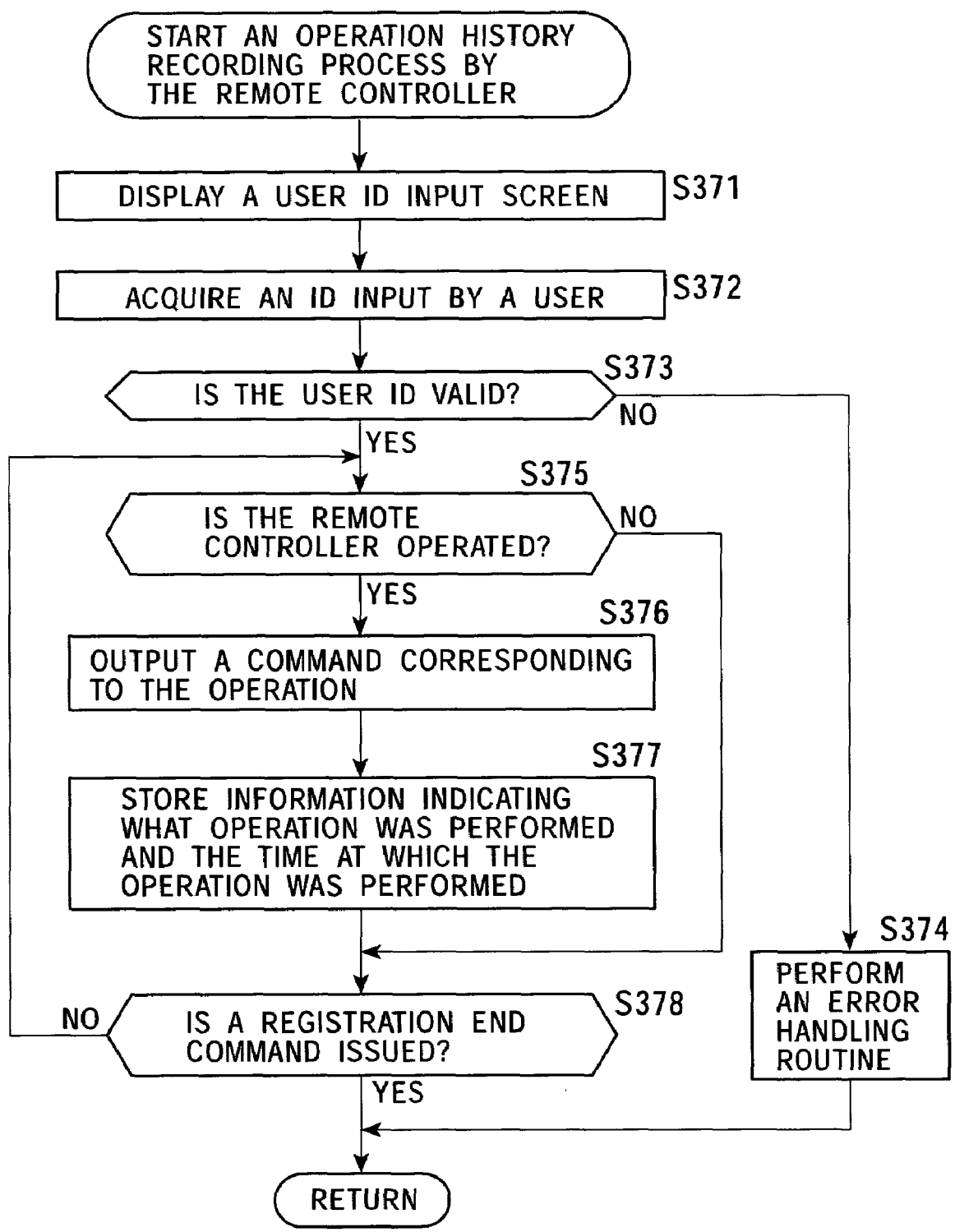
FIG. 36 is a flow chart showing the details of an operation history registration process performed in step S309 shown in FIG. 28.

Referring to a flow chart shown in FIG. 36, the details of the operation history registration process in step S309 in FIG. 28 are described below.

This process is performed when the "operation history registration mode" is selected on the selection screen shown in FIG. 29.

Steps S371 to S374 are similar to steps S331 to S334 shown in FIG. 31. That is, in step S371, the user ID input screen is displayed. In step S372, the controller 211 acquires a user ID input by a user. In step S373, the controller 211 determines whether the input user ID is valid. If the input user ID is valid, the process proceeds to step S375.

In step S375, on the basis of the output from the operation control unit 212, the controller 211 determines whether a command is issued by the user to control the television set 201. If no command is issued, steps S376 and S377 are skipped.

For example, a command such as a channel switch command, a volume adjustment command, or a program table display command is issued, the controller 211 determines in step S375 that a command has been issued, and the controller 211 advances the process to step S376. In step S376, the controller 211 reads a command corresponding to the operation performed by the user from the command storage area 244, and the controller 211 controls the IR transmitter/receiver 213 to transmit the command to the television set 201.

Figure 44:
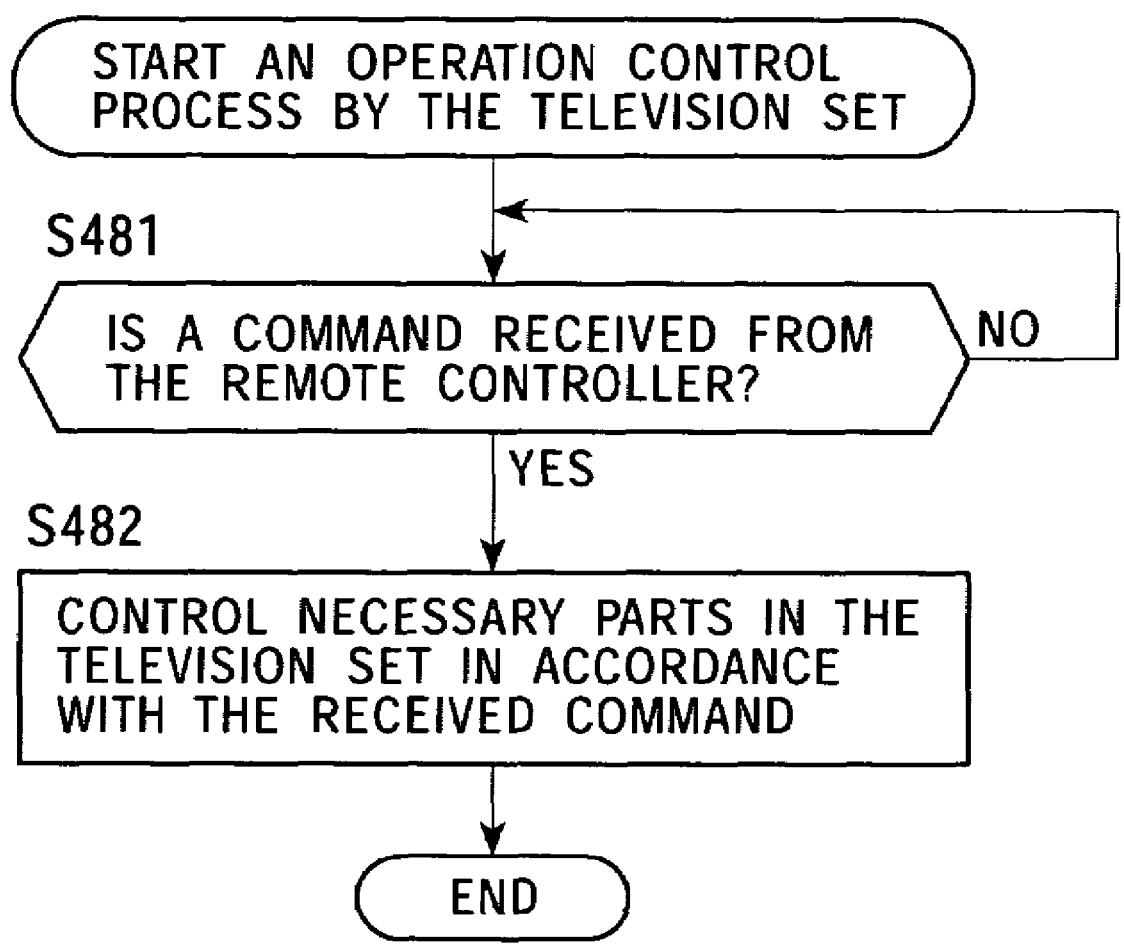
FIG. 44 is a flow chart showing a control process performed by the television set.

In response to receiving the command, the television set 201 performs the specified operation such as the changing of the channel or the volume adjustment (step S482 in FIG. 44).

In step S377, the controller 211 stores information indicating the operation performed by the user and the time at which the operation was performed, as the operation history, in relation to the user ID into the operation history storage area 242. Herein, information indicating other setting conditions of the television set 201, such as the brightness or the volume level, may also be stored in relation to the user ID.

In step S378, the controller 211 determines whether an operation history registration end command is issued. If the operation history registration end command is not issued, the controller 211 returns the flow to step S375 to repeat the process described above. Thus, information indicating operations performed by the user is stored as the operation history until the registration end command is issued.

If the controller 211 determines in step S378 that the operation history registration end command is issued, the controller 211 ends the operation history registration process.

Referring to a flow chart shown in FIG. 37, the details of the operation history usage process in step S311 in FIG. 28 are described below.

This process is performed when the "operation history usage mode" is selected on the selection screen shown in FIG. 29.

Steps S391 to 394 are similar to steps S331 to S334 shown in FIG. 31. That is, in step S391, the user ID input screen is displayed. In step S392, the controller 211 acquires a user ID input by a user. In step S393, the controller 211 determines whether the input user ID is valid. If the input user ID is valid, the process proceeds to step S395.

In step S395, the controller 211 reads operation history information related to the input user ID from the operation history storage area 242. In step S396, on the basis of the read operation history information, the controller 211 determines whether it is a time to execute an operation in accordance with the operation history (an operation similar to an operation performed in the past by the user). If it is determined that it is not a time to execute an operation, the process proceeds to step S397. In step S397, the controller 211 outputs a command in accordance with an operation performed by the user to control the television set 201.

In step S401, the controller 211 determines whether an operation history usage end command is issued. If the operation history usage end command is not issued, the controller 211 returns the process flow to step S396 to repeat step S396 and following steps.

On the other hand, if it is determined in step S396 that it is a time to execute an operation on the basis of the operation history, the controller 211 advances the process to step S398. In step S398, the controller 211 displays an operation selection screen on the display 214.

For example, in the operation history registration mode, if a user performs an operation such as zapping in a commercial break or turning down of the volume, information indicating the operation performed by the user is stored as the operation history information in the operation history storage area 242. In accordance with the stored operation history information, a selection screen such as that shown in FIG. 38 is displayed on the display 214 when a commercial break occurs during a broadcast program.

In the example of the selection screen shown in FIG. 38, a message "operations performed during commercial breaks in the past" is displayed at the top of the screen. Below this message, "zapping" and "reducing of volume" are displayed as operations performed in the past during commercial breaks.

If the user selects one of operations by moving a cursor 291 on the selection screen shown in FIG. 38, the same operation is set to be executed when the same timing condition is met (in commercial breaks in the example shown in FIG. 38).

When a commercial break occurs during a broadcast program, if the user wants to perform zapping, zapping can be started simply by selecting a first choice "zapping" using the cursor 291. In the case in which the user wants to reduce the volume, the volume is turned down simply by selecting a second choice "reducing of volume" using the cursor 291.

The zapping of channel is performed in accordance with the operation history information in the same order as that in which the channel was zapped in the past. In the case of the volume adjustment, the volume is changed to the same level as that to which the volume was changed in the past. That is, the same operation as that performed in the past is performed again when the user selects the operation on the selection screen.

In the case in which the operation history information includes information indicating that "channel 6 was selected" immediately after the power of the remote controller 202 was turned on, a selection screen is displayed immediately after the power is turned on to prompt the user to determine whether "channel 6" is displayed (by selecting a choice "display channel 6" on the selection screen").

A similar selection screen for prompting the user to select various operations of the television set 201 is displayed on the display 214 with the same timing as each operation was performed in the past.

When the operation history information includes information indicating the volume level or the brightness level employed in the past for the television set 201, if, when the power of the television set 201 is turned on, the setting of the volume or the brightness is different from that described in the operation history information, a selection screen is displayed immediately after selecting the operation history usage mode to prompt the user to determine whether the current volume level or the brightness level is changed to the level described in the operation history information.

Thus, simply by making a selection on the displayed selection screen, the television set 201 is set at the same volume level or the brightness level as that described in the operation history information (as that employed in the past).

Referring again to FIG. 37, in step S399, the controller 211 accepts the selection of the operation made on the selection screen shown in FIG. 38, and the controller 211 performs the operation in step S400. More specifically, the controller 211 reads a command corresponding to the operation selected by the user from the command storage area 244 and transmits the command from the IR transmitter/receiver 213.

In response, the television set 201 performs an operation corresponding to the command (step S482 in FIG. 44).

In step S401 after the transmission of the command corresponding to the operation selected by the user, the controller 211 determines whether an operation history usage end command is issued. If the end command is issued, the controller 211 ends the process.

As described above, by displaying a selection screen in accordance with the operation history information to prompt the user to determine whether to operate the television set 201 in a similar manner to that in which the television set 201 was operated in the past, it becomes possible for the user to operate the television set 201 in a similar manner to the manner in which the television set 201 was operated in the past without having to perform sequential steps of the operation.

In the embodiment described above, a list of operations performed in the past is displayed on the selection screen as shown in FIG. 38. In this case, an operation performed more frequently may be selected on the basis of the operation history information, and the selected operation may be displayed at an upper position in the list. For example, if the operation history information indicates that turning down of the volume was performed more frequently than zapping during commercial breaks, "turning down the volume" is displayed at an upper position than "zapping" in the list on the selection screen.

This allows the selection screen to be displayed depending on the tendency of the operation performed by the user (that is, depending on the preference of the user) thereby making it possible for the user to more quickly select a desired operation to be executed.

Instead of displaying all operations performed in the past at particular timings, only operations which were performed a greater number of times than a predetermined number may be displayed.

In the embodiment described above, when it is determined in step S396 that it is a time to perform an operation on the basis of the operation history information, a selection screen is displayed so as to allow a user to select an operation. Alternatively, when the operation history usage mode is selected, a selection screen may be displayed to prompt a user to select an operation to be executed.

In the embodiment described above, selection of a program to be recommended or to be recorded is performed depending on the preference of a user by the television receiver 1 (television set 201) shown in FIG. 1. Alternatively, selection of a program may be performed on the remote controller 202, and information associated with the selected program may be presented to a user.

In this case, selection of a program on the remote controller 202 is preformed on the basis of EPG data stored in the EPG data storage area 231 of the HDD 215.

Referring to a flow chart shown in FIG. 39, a process performed by the television set 201 (television receiver 1) to transmit EPG data to the remote controller 202 is described below.

In step S411, the controller 11 of the television receiver 1 determines whether it is a time to transmit EPG data to the remote controller 202. If it is not a time to transmit EPG data, the process waits in step S411 until it becomes a time to transmit EPG data.

As described earlier, the EPG data is extracted by the analog tuner 15 or the digital tuner 23 and stored on the HDD 32 under the control of controller 11. At predetermined intervals or each time the EPG data stored on the HDD 32 is updated, the controller 11 transmits the newest EPG data to the remote controller 202.

If the controller 11 determines in step S411 that it is a time to transmit EPG data, the controller 11 advances the process to step S412. In step S412, the controller 11 reads the EPG data (the newest EPG data) stored on the HDD 32.

In step S413, after completion of reading the EPG data from the HDD 32, the controller 11 controls the IR transmitter/receiver 12B so as to transmit the EPG data to the remote controller 202. The transmitted EPG data is stored on the HDD by the remote controller 202 (in step S423 in FIG. 40).

Figure 39:
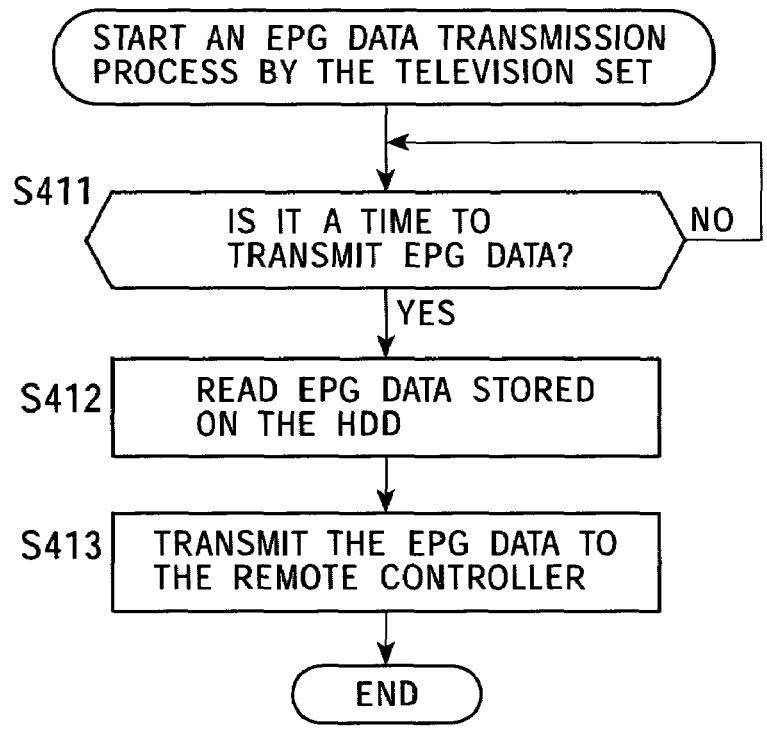
FIG. 39 is a flow chart showing an EPG data transmission process performed by a television set.
Figure 40:
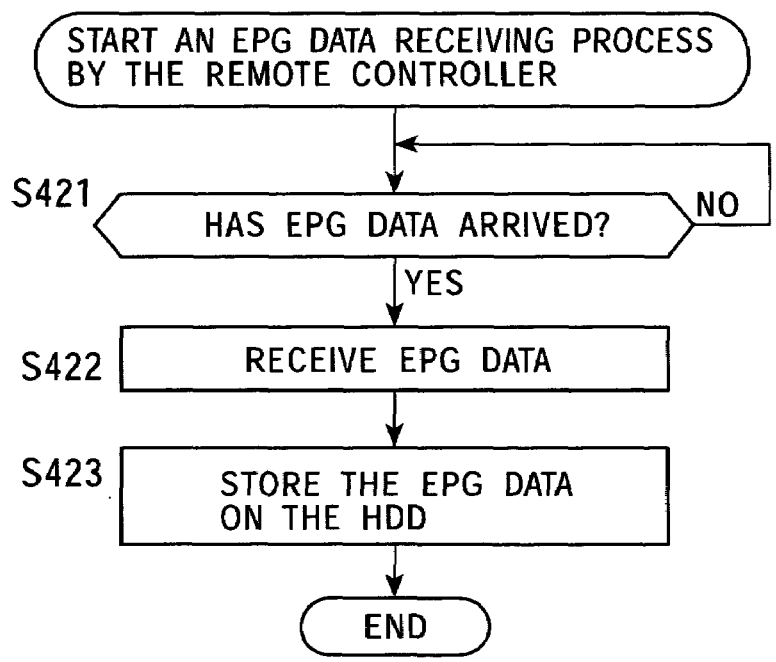
FIG. 40 is a flow chart showing an EPG data reception process performed by the controller.

Referring to a flow chart shown in FIG. 40, a process performed by the remote controller 202 to receive the EPG data transmitted in step S413 in FIG. 39 is described below.

In step S421, on the basis of the output from the IR transmitter/receiver 213, the controller 211 determines whether EPG data transmitted from the television receiver 1 has arrived. If EPG data has not arrived, the process waits in step S421 until EPG data has arrived.

If the controller 211 determines in step S421 that the EPG data transmitted from the television receiver 1 has arrived, the controller 211 advances the process to step S422 to receive the EPG data. In step S423, the controller 211 supplies the received EPG data to the HDD 215. The HDD 215 stores the supplied EPG data in the EPG data storage area 231.

By performing the above-described processes (shown in FIGS. 39 and 40) repeatedly, the remote controller 202 acquires the newest EPG data.

Referring to a flow chart shown in FIG. 41, a process performed by the controller 211 to select a program on the basis of the operation history information (preference information) is described below. This process is executed, for example, when a command is issued by a user.

In step S431, the controller 211 reads the operation history information stored in the operation history storage area 242 and acquires program view history (channel numbers and broadcast times of viewed programs) or program record history (channel numbers and broadcast times of recorded programs).

In step S432, on the basis of the EPG data (program table) stored on the HDD 215 and the information read in step S431, the controller 211 identifies programs recorded or viewed by the user and acquires supplemental information (indicating the titles, names of performers, and genres of the programs) associated with the identified programs. That is, the EPG data includes information indicating the title, performer's name and genre of each program (recorded or viewed by the user).

When a program is selected in accordance with user's preference, supplemental information may be acquired from EPG data each time a program view command is issued, instead of acquiring supplemental information on the basis of the operation history and EPG data.

For example, the supplemental information is stored in relation to user IDs in the operation history storage area 242. In step S433, the controller 211 updates the occurrence count information associated with the supplemental information stored in the operation history storage area 242 on the basis of the supplemental information acquired in step S432.

More specifically, the controller 211 performs a process similar to that described earlier with reference to FIG. 9 thereby updating the occurrence count information associated with the supplemental information stored in the operation history storage area 242. In the updating of the occurrence count information, weighting is performed as described earlier with reference to FIGS. 10 to 12.

As a result of performing the process described above, the occurrence counts of respective items, such as those shown in FIG. 14, are stored in the operation history storage area 242.

In step S434, the controller 211 examines the EPG data and selects a program in accordance with the occurrence count information associated with the user by performing a process similar to that shown in FIG. 13. For example, on the basis of the occurrence count information stored in the operation history storage area 242, entries in terms of a program title, a name of a person appearing in a program, and a genre of a program having greatest occurrence counts (the number of times a program has been viewed or recorded) are extracted, and a program including the extracted entries in its supplemental information is selected from the programs described in the EPG data.

In step S435, the controller 211 presents the program selected in step S434 to the user and prompts the user to determine whether to set the selected program to be viewed or recorded in the programmed-recording mode.

Figure 42:
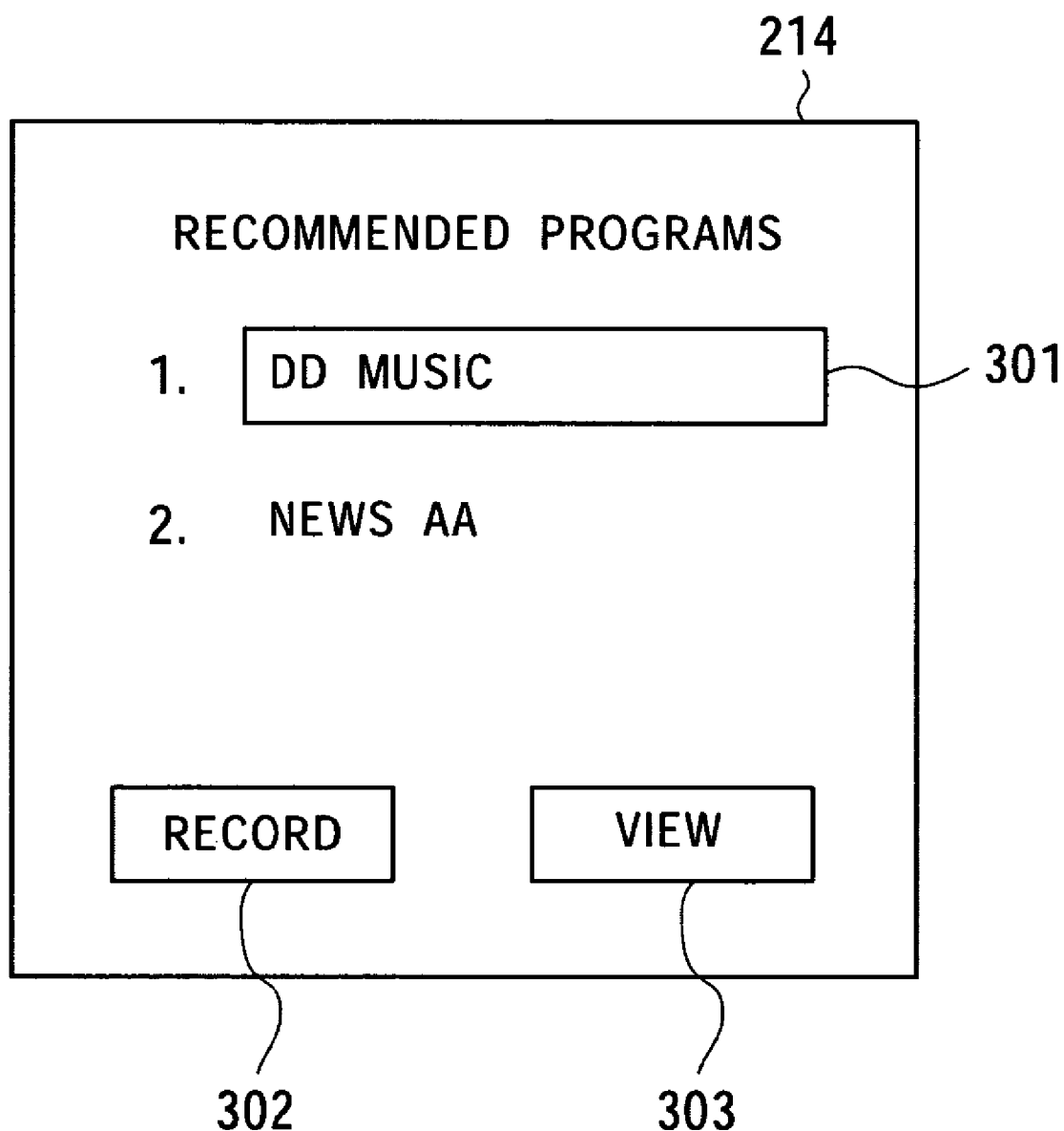
FIG. 42 is a diagram showing an example of a screen displayed in step S435 shown in FIG. 41.

FIG. 42 is a diagram showing an example of the screen displayed on the display 214 in step S435.

In the example shown in FIG. 42, a message "recommended programs" is displayed at the top of the screen. Below this message, DD music" and "news AA" are displayed as recommended programs which are very likely to be preferred by the user. The user can select either "DD music" or "news AA" by moving a cursor 301 by operating the operation control unit 212.

In the example shown in FIG. 42, a record button 302 used to set the program selected with the cursor 301 to be recorded in the programmed-recording mode and a view button 303 used to view the selected program are disposed at the bottom of the screen. If the user presses the record button 302 or the view button 303, the program selected using the cursor 301 is set to be recorded in the programmed-recording mode or received.

In step S436, on the basis of the output of the operation control unit 212, the controller 211 determines whether a command to set the program to be recorded is issued, that is, whether the record button 302 shown in FIG. 42 is pressed. If it is determined in step S436 that the record command is issued, the controller 211 advances the process to step S437 to set the program to be recorded in the programmed-recording mode.

More specifically, the broadcast start time and the broadcast channel number of the program selected by the user are extracted from the EPG data and stored in the memory 11B. When the broadcast start time is reached, a command to start recording the program is transmitted to the television set 201. In response to receiving the command, the television set 201 starts recording the program.

On the other hand, if it is determined in step S436 that the command to record the program is not issued (but a command to view the program is issued), the controller 211 advances the process to step S438 to set the program to be viewed.

If the program is set, in step S437, to be recorded in the programmed-recording mode or if the program is set, in step S 438, to be viewed, the process is ended.

In a case in which the recommended programs do not include a program preferred by the user and thus no program is set to be recorded or viewed, the process is ended.

Thus, the above process makes it possible for the user to select a program from the recommended programs and set the selected program to be recorded in the programmed-recording mode or viewed simply by specifying the program without having to select a program from the program table and set the recording/playback conditions.

Figure 41:
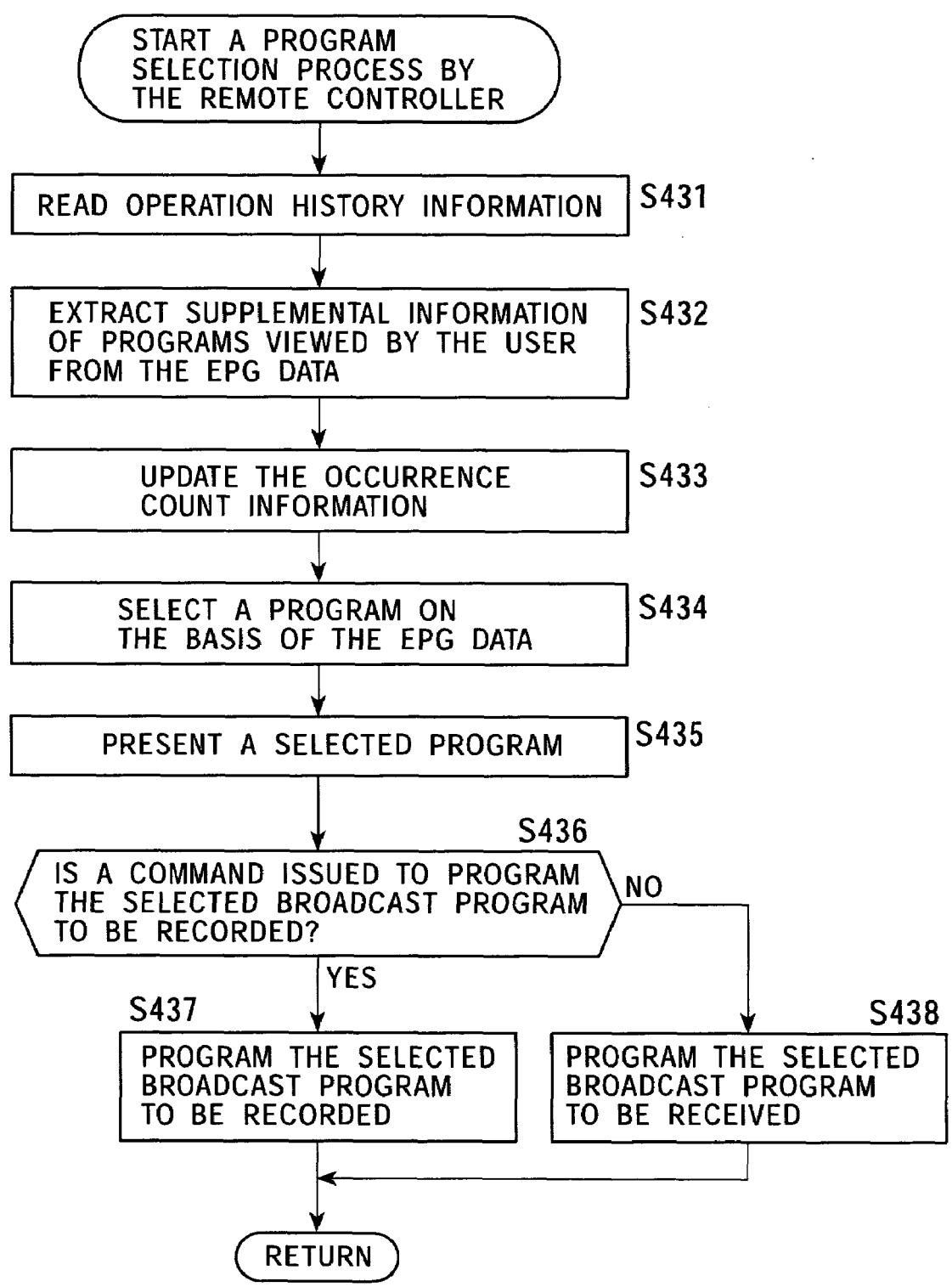
FIG. 41 is a flow chart showing a program selection process performed by the controller.

Referring to a flow chart shown in FIG. 43, a process performed by the controller 211 to control the television set 201 so as to record or receive the program specified in the process shown in FIG. 41 is described below.

In step S461, on the basis of the setting information stored in the memory 11C, the controller 211 determines whether the broadcast start time of the program to be recorded is reached. If the broadcast start time is reached, the controller.211 advances the process to step S462 to control the television set 201 to start recording the program. More specifically, the controller 211 reads a record start command from the command storage area 244 and transmits the command from the IR transmitter/receiver 213 to the television set 201.

In step S463, the controller 211 determines whether the broadcast end time of the program specified by the user to be recorded is reached. If the broadcast end time is not reached, the process waits in step S463 until the broadcast end time is reached.

If the controller 211 determines in step S463 that the broadcast end time of the program is reached, the controller 211 advances the process to step S464. In step S464, the controller 211 transmits a record end command from the IR transmitter/receiver 213 to the television set 201.

As a result, the program specified by the user is recorded by the television set 201, and the user can view the recorded program.

In the case in which it is determined in step S461 that the broadcast start time of the program set to be recorded is not reached, the controller 211 advances the process to step S465. In step S465, the controller 211 determines whether the broadcast start time of a program set to be viewed is reached. If it is determined in step S465 that the broadcast start time of the program to be viewed is not reached, the controller 211 returns the process to step S461 to repeat step S461 and following steps.

If it is determined in step S465 that the broadcast start time of the program to be viewed is reached, the controller 211 advances the process to step S466. In step S466, the controller 211 transmits a playback start command to the television set 201. In response, the television set 201 plays back the program. Thereafter, the process is ended.

Referring to a flow chart shown in FIG. 44, the routine operation execution process shown in FIG. 34 and the operation history usage process shown in FIG. 37 performed by the remote controller 202, and the process performed by the television set 201 (the controller 11 shown in FIG. 1) in response to the routine operation execution process shown in FIG. 34, the operation history usage process shown in FIG. 37, and the process shown in FIG. 43, performed by the remote controller 202, is descried below.

In step S481, on the basis of the output from the IR transmitter/receiver 12B, the controller 11 determines whether a command transmitted from the remote controller 202 is received. If the command is not received, the process waits in step S481 until the command is received.

If the controller 11 determines in step S481 that the command transmitted from the remote controller 202 is received, the controller 11 advances the process to step S482 to control necessary parts in accordance with the command.

Figure 34:
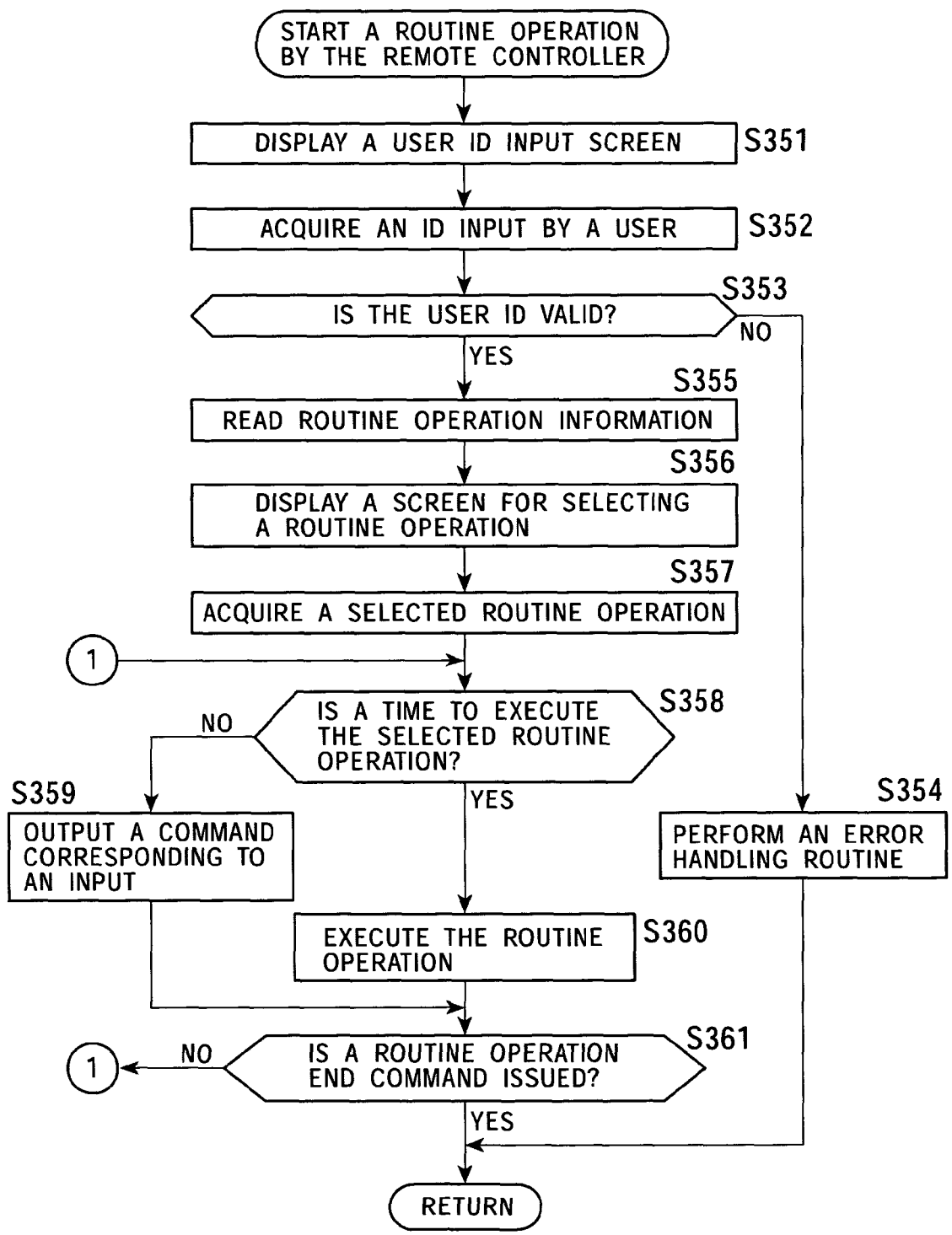
FIG. 34 is a flow chart showing the details of a routine operation execution process performed in step S307 shown in FIG. 28.
Figure 37:
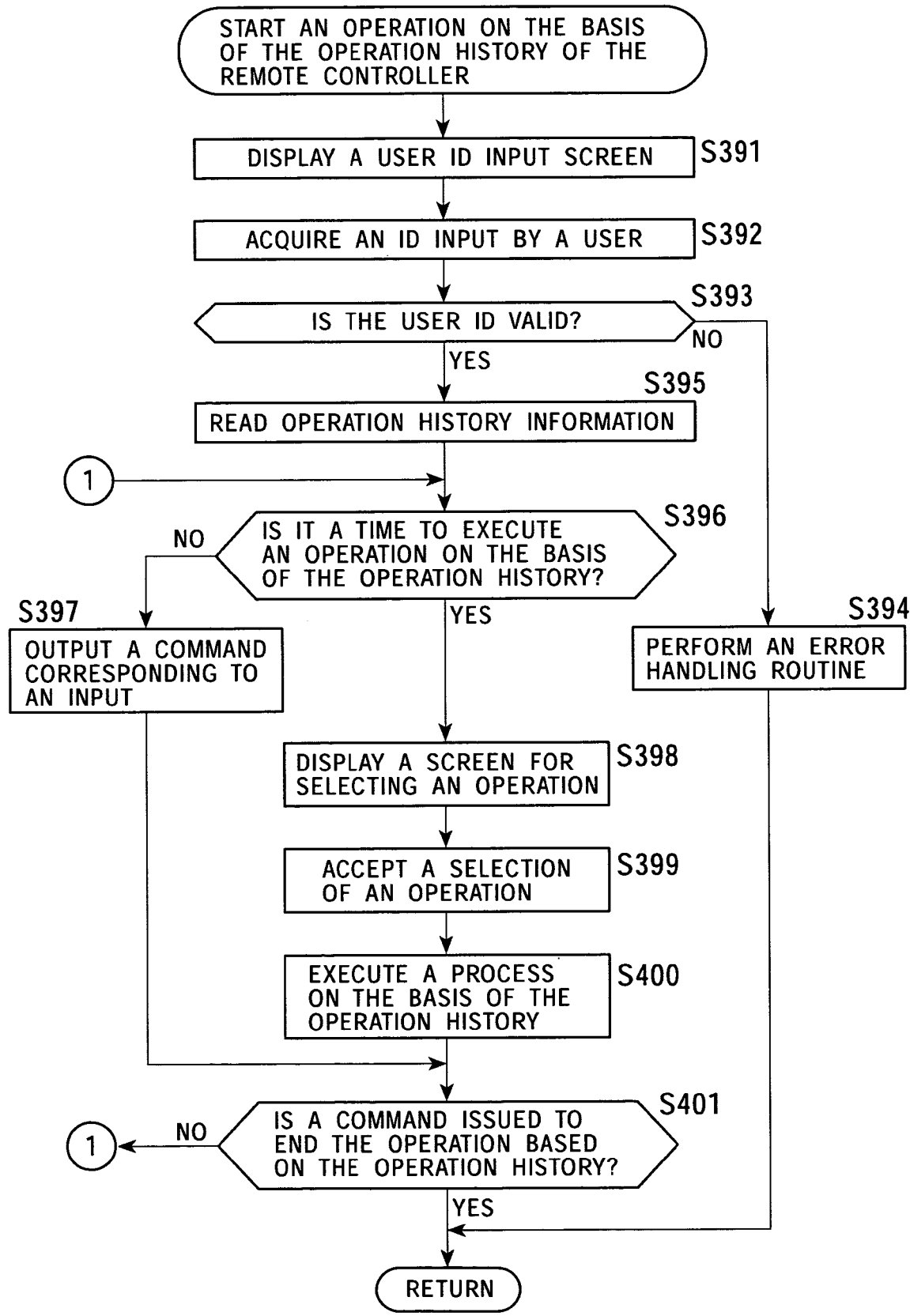
FIG. 37 is a flow chart showing the details of an operation history usage process performed in step S311 shown in FIG. 28.

For example, the channel switch command or the volume adjustment command issued in step S360 in FIG. 34 or step S400 in FIG. 37 is received, the controller 11 controls necessary parts so as to perform a process corresponding to the received command.

Figure 43:
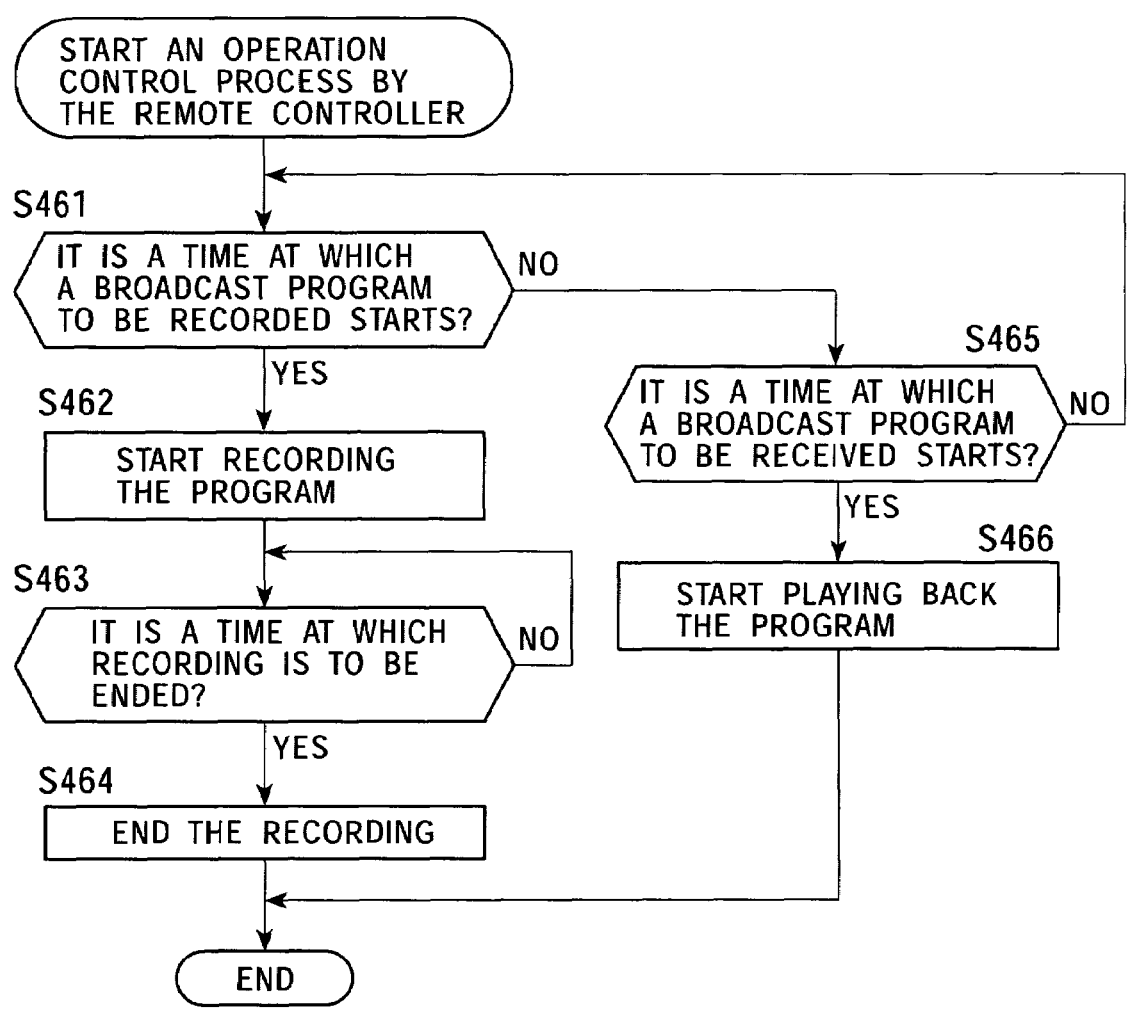
FIG. 43 is a flow chart showing a control process performed by the controller.

For example, if the record start command issued in step S462 in FIG. 43 is received, the controller 11 controls the analog tuner 15 or the digital tuner 23 to receive the broadcast program on the specified channel and controls the VTR 19 or the HDD 32 to store the received program.

Thus, the process described above makes it possible to record or view a program selected by the controller 211 of the remote controller 202 in accordance with the user's preference.

In the case in which the television set 201 is used by a plurality of users, if the view history information or the preference information is managed by the television set 201, the view history information or the preference information associated with different users is managed in a mixed or confused fashion, and it is difficult to select a program which is likely to be preferred by a particular user. In contrast, if the view history information or the preference information is managed separately by the remote controller 202 possessed by each user in the above-described manner, it is possible to select a program which is very likely to be preferred by each user in accordance with the view history information or the preference information.

In the control system shown in FIG. 26, the processes performed by the television set 201 may be performed by the remote controller 202. Conversely, the processes performed by the remote controller 202 may be performed by the television set 201.

For example, the management of user IDs (storage and authentication of user IDs) performed by the remote controller 202 may be performed by the television set 201. In this case, if a user ID is input by a user after a mode is selected, the user ID is transmitted from the remote controller 202 to the television set 201, and the television set 201 authenticates the user ID. The result of the authentication may be transmitted to the remote controller 202 and displayed on the display 214 or the result may be displayed on the television set 201.

The screens (shown in FIGS. 29, 32, 33, 35, 38, and 42) displayed on the display 214 of the remote controller 202 may be displayed on the television set 201.

Any device having the capability of communicating with the television set 201 may be employed as the remote controller 202. For example, a portable terminal such as a PDA (personal Digital Assistants) device or a portable telephone may be used to perform the above-described processes.

The communication between the remote controller 202 or the portable terminal for controlling the television set 201 and the television set 201 is not limited to that using an infrared ray, but another communication technique such as a wireless LAN (Local Area Network) according to the IEEE (Institute of Electronical and Electronics Engineers) standards 802.11a, 11b, or 11g or a Bluetooth technique may also be employed.

The processing sequence described above may be executed by hardware or software.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media usable for the above purpose include, as shown in FIG. 27, a magnetic disk 218 (such as a floppy disk), an optical disk 219 (such as a CD-ROM (Compact Disk-Read Only Memory) and a DVD (Digital Versatile Disk)), a magnetooptical disk 220 (such as a MD (Mini-Disc) (registered trademark), and a semiconductor memory 221, in the form of a package medium including a program stored thereon which is supplied to a user separately from a computer. A program may also be supplied to a user together with a computer including a built-in ROM, the HDD 215 or the like, in which the program has been preinstalled.

In the present description, the steps described in the program stored in the storage medium may be performed either in time sequence in accordance with the order described in the program or in a parallel or separate fashion.

In the present description, the term "system" is used to represent an entire set of apparatuses.

As described above, the present invention makes it possible for each user to view a television program in an environment optimized depending on the user.

Furthermore, the present invention makes it possible to select a program depending on the operation history information indicating the operations performed by a user in the past or the preference information.

Furthermore, the present invention makes it possible to easily and quickly set a desired program to be recorded in the programmed-recording mode.

What is claimed is:

1. A control system comprising a control apparatus and an information processing apparatus,
   wherein the control apparatus comprises:
      receiving means for receiving electronic program guide information transmitted from the information processing apparatus;
      storage means for storing the electronic program guide information received by the receiving means;
      acquisition means for, on the basis of the electronic program guide information stored in the storage means, acquiring supplemental information which is associated with a program processed by the information processing apparatus and which indicates a feature of the program;
      calculation means for calculating an occurrence count of each item in the supplemental information as a function of a weighting factor of each item,
      wherein the weighting factor is dependent upon a timing of user actions;
      selection means for selecting a particular program on the basis of the supplemental information and the occurrence count of each item in the supplemental information;
      management means for managing the occurrence count of each item in the supplemental information,
      wherein the selection means selects a program regarded by the management means as having a high occurrence count; and
      control means for controlling the information processing apparatus so as to record or play back the program selected by the selection means; and
   the information processing apparatus comprises:
      transmission means for transmitting the electronic program guide information to the control apparatus; and
      record/playback means for recording or playing back the program under the control of the control apparatus.

2. A control apparatus for controlling an information processing apparatus, comprising:
   receiving means for receiving electronic program guide information transmitted from the information processing apparatus;
   storage means for storing the electronic program guide information received by the receiving means;
   acquisition means for, on the basis of the electronic program guide information stored in the storage means, acquiring supplemental information which is associated with a program processed by the information processing apparatus and which indicates a feature of the program;
   calculation means for calculating an occurrence count of each item in the supplemental information as a function of a weighting factor of each item,
   wherein the weighting factor is dependent upon a timing of user actions;
   selection means for selecting a particular program on the basis of the supplemental information and the occurrence count of each item in the supplemental information;
   management means for managing the occurrence count of item in the supplemental information,
   wherein the selection means selects a program regarded by the management means as having a high occurrence count; and
   control means for controlling the information processing apparatus so as to record or play back the program selected by the selection means.

3. A control apparatus according to claim 2, wherein the acquisition means acquires, as the supplemental information associated with a program processed by the information processing apparatus, supplemental information associated with a program recorded or played back by the information processing apparatus.

4. A control apparatus according to claim 2, wherein in the management of the occurrence count of each item in the supplemental information, the management means weights an occurrence count depending on a process performed by the information processing apparatus.

5. A method for a control apparatus to control an information processing apparatus, comprising the steps of:
   receiving electronic program guide information transmitted from the information processing apparatus;
   storing the electronic program guide information received in the receiving step;

acquiring supplemental information, on the basis of the electronic program guide information stored in the storage step, which is associated with a program processed by the information processing apparatus and which indicates a feature of the program;

calculating an occurrence count of each item in the supplemental information as a function of a weighting factor of each item, wherein the weighting factor is dependent upon a timing of user actions;

selecting a particular program on the basis of the supplemental information and the occurrence count of each item in the supplemental information;

management means for managing the occurrence count of each item in the supplemental information, wherein the selection means selects a program regarded by the management means as having a high occurrence count; and controlling the information processing apparatus so as to record or play back the program selected in the selection step.

6. A computer-readable storage medium including a program stored thereon for use by a control apparatus to control an information processing apparatus, the program comprising a procedure of controlling a process including the steps of:

receiving electronic program guide information transmitted from the information processing apparatus;

storing the electronic program guide information received in the receiving step;

acquiring supplemental information, on the basis of the electronic program guide information stored in the storage step, which is associated with a program processed by the information processing apparatus and which indicates a feature of the program;

calculating an occurrence count of each item in the supplemental information as a function of a weighting factor of each item, wherein the weighting factor is dependent upon a timing of user actions;

selecting a particular program on the basis of the supplemental information and the occurrence count of each item in the supplemental information;

management means for managing the occurrence count of each item in the supplemental information, wherein the selection means selects a program regarded by the management means as having a high occurrence count; and controlling the information processing apparatus so as to record or play back the program selected in the selection step.

7. A program executed by a computer to control a control apparatus for controlling an information processing apparatus, the program comprising a procedure of controlling a process including the steps of:

receiving electronic program guide information transmitted from the information processing apparatus;

storing the electronic program guide information received in the receiving step;

acquiring supplemental information, on the basis of the electronic program guide information stored in the storage step, which is associated with a program processed by the information processing apparatus and which indicates a feature of the program;

calculating an occurrence count of each item in the supplemental information as a function of a weighting factor of each item, wherein the weighting factor is dependent upon a timing of user actions;

selecting a particular program on the basis of the supplemental information and the occurrence count of each item in the supplemental information;

management means for managing the occurrence count of each item in the supplemental information, wherein the selection means selects a program regarded by the management means as having a high occurrence count; and controlling the information processing apparatus so as to record or play back the program selected in the selection step.

8. A control apparatus for controlling an information processing apparatus, comprising:

selection means for allowing a specific user, with identification information, to select from a list of commands, a particular process, and from a list of occurrences, a timing of performing the particular process;

storage means for storing data indicating the timing of controlling the information processing apparatus to perform the particular process and data indicating the particular process to be performed, as a function of the identification information, wherein the identification information includes a weighting factor which is dependent upon a timing of user actions;

input acceptance means for accepting input of the identification information; and control means for controlling the information processing apparatus to perform the particular process when the timing condition stored in the storage means in relation to the identification information accepted by the input acceptance means is met.

9. A control apparatus according to claim 8, wherein the timing is when a specified date/time is reached, or when a commercial break occurs, or when a specified genre of a program is broadcast.

10. A control apparatus according to claim 8, wherein the content of the process is switching of a channel, turning on/off of power, or zapping.

11. A control apparatus according to claim 8, further comprising:

presentation means for presenting the timing and the content of the process stored in the storage means, when the input of the identification information is accepted by the input acceptance means, wherein the control means controls the information processing apparatus to perform a process selected from processes presented by the presentation means when a selected timing condition is met.

12. A control apparatus according to claim 8, further comprising:

setting acceptance means for accepting setting of a timing and a content of the process, wherein the storage means stores data indicating the timing and the content of the process accepted by the setting acceptance means.

13. A method for a control apparatus to control an information processing apparatus, comprising the steps of:

allowing a specific user, with identification information, to select from a list of commands, a particular process, and from a list of occurrences, a timing of performing the particular process;

storing data indicating the timing of controlling the information processing apparatus to perform the particular process and data indicating the particular process to be performed, as a function of the identification information, wherein the identification information includes a weighting factor which is dependent upon a timing of user actions;

accepting input of the identification information; and controlling the information processing apparatus to perform the process when the timing condition indicated by the data stored in the storage step in relation to the identification information accepted in the input acceptance step is met.

14. A computer-readable storage medium including a program stored thereon for use by a control apparatus to control an information processing apparatus, the program comprising a procedure of controlling a process including the steps of:

allowing a specific user, with identification information, to select from a list of commands, a particular process, and from a list of occurrences, a timing of performing the particular process;

storing data indicating the timing of controlling the information processing apparatus to perform the particular process and data indicating the particular process to be performed, as a function of the identification information, wherein the identification information includes a weighting factor which is dependent on a timing of user actions;

accepting input of the identification information; and controlling the information processing apparatus to perform the process when the timing condition indicated by the data stored in the storage step in relation to the identification information accepted in the input acceptance step is met.

15. A program executed by a computer to control a control apparatus for controlling an information processing apparatus, the program comprising a procedure of controlling a process including the steps of:

allowing a specific user, with identification information, to select from a list of commands, a particular process, and from a list of occurrences, a timing of performing the particular process;

storing data indicating the timing of controlling the information processing apparatus to perform the particular process and data indicating the particular process to be performed, as a function of the identification information, wherein the identification information includes a weighting factor which is dependent on a timing of user actions;

accepting input of the identification information; and controlling the information processing apparatus to perform the process when the timing condition indicated by the data stored in the storage step in relation to the identification information accepted in the input acceptance step is met.

16. A control apparatus for controlling an information processing apparatus, comprising:

storage means for storing operation history indicating an operation performed by controlling the information processing apparatus at a particular timing;

presentation means for presenting information to a user which allows the user to select whether the same process described in the operation history stored in the storage means is to be performed by the information processing apparatus when a timing condition described in the operation history is met; and control means for, in the case in which the process is selected to be performed on the basis of the information presented by the presentation means, controlling the information processing apparatus to perform the process at the particular timing, wherein the operation stored in the operation history is dependent on a weighting factor which is dependent on a timing of user actions.

17. A control apparatus according to claim 16, wherein the operation history is history of viewing programs or history of recording programs.

18. A control apparatus according to claim 16, wherein the storage means stores the operation history in relation to identification information; the control apparatus further comprises input acceptance means for accepting input of the identification information; and the presentation means presents the information when the timing condition, described in the operation history stored in relation to the identification information accepted by the input acceptance means, is met.

19. A control apparatus according to claim 16, wherein when an operation history registration mode is selected, the storage means stores, as the operation history, data indicating a process performed by the information processing apparatus and a timing of the process.

20. A method for a control apparatus to control an information processing apparatus, comprising the steps of:

storing operation history indicating an operation performed by controlling the information processing apparatus at a particular timing;

presenting information to a user which allows the user to select whether the same process described in the operation history stored in the storage step is to be performed by the information processing apparatus when a timing condition described in the operation history is met; and in the case in which the process is selected to be performed on the basis of the information presented in the presentation step, controlling the information processing apparatus to perform the process at the particular timing, wherein the operation stored in the operation history is dependent on a weighting factor which is dependent on a timing of user actions.

21. A computer-readable storage medium including a program stored thereon for use by a control apparatus to control an information processing apparatus, the program comprising a procedure of controlling a process including the steps of:

storing operation history indicating an operation performed by controlling the information processing apparatus at a particular timing;

presenting information to a user which allows the user to select whether the same process described in the operation history stored in the storage step is to be performed by the information processing apparatus when a timing condition described in the operation history is met; and in the case in which the process is selected to be performed on the basis of the information presented in the presentation step, controlling the information processing apparatus to perform the process at the particular timing, wherein the operation stored in the operation history is dependent on a weighting factor which is dependent on a timing of user actions.

22. A program executed by a computer to control a control apparatus for controlling an information processing apparatus, the program comprising a procedure of controlling a process including the steps of:

storing operation history indicating an operation performed by controlling the information processing apparatus at a particular timing;

presenting information to a user which allows the user to select whether the same process described in the operation history stored in the storage step is to be performed by the information processing apparatus when a timing condition described in the operation history is met; and in the case in which the process is selected to be performed on the basis of the information presented in the presentation step, controlling the information processing apparatus to perform the process at the particular timing, wherein the operation stored in the operation history is dependent on a weighting factor which is dependent on a timing of user actions.

* * * * *